US012744196B2

(12) United States Patent
McEwen et al.

(10) Patent No.: US 12,744,196 B2
(45) Date of Patent: Sep. 22, 2026

(54) VACUUM CHAMBER ASSEMBLY WITH MULTIPLE FUNCTIONS TO MAXIMIZE UNIVERSALITY AND PERFORMANCE

(71) Applicant: MSTM, LLC, Newark, DE (US)

(72) Inventors: Charles N. McEwen, Newark, DE (US); Milan Pophristic, Princeton, NJ (US)

(73) Assignee: MSTM, LLC, Newark, DE (US)

( * ) Notice: Subject to any disclaimer, the term of this patent is extended or adjusted under 35 U.S.C. 154(b) by 320 days.

(21) Appl. No.: 18/628,049

(22) Filed: Apr. 5, 2024

(65) Prior Publication Data

US 2025/0069878 A1 Feb. 27, 2025

Related U.S. Application Data

(60) Provisional application No. 63/470,989, filed on Jun. 5, 2023, provisional application No. 63/456,564, filed on Apr. 3, 2023.

(51) Int. Cl.
*H01J 49/24* (2006.01)
*H01J 49/04* (2006.01)

(52) U.S. Cl.
CPC .......... *H01J 49/24* (2013.01); *H01J 49/0495* (2013.01)

(58) Field of Classification Search
CPC .............................. H01J 49/24; H01J 49/0495
See application file for complete search history.

(56) References Cited

U.S. PATENT DOCUMENTS

| | | | | |
|---|---|---|---|---|
| 8,389,930 | B2 * | 3/2013 | Ugarov | H01J 49/067 250/281 |
| 8,461,549 | B2 * | 6/2013 | Makarov | H01J 49/0018 250/288 |
| 2011/0147576 | A1 * | 6/2011 | Wouters | H01J 49/167 250/288 |
| 2014/0291507 | A1 * | 10/2014 | Brown | H01J 49/10 250/288 |

* cited by examiner

*Primary Examiner* — Sean Luck
(74) *Attorney, Agent, or Firm* — Fox Rothschild LLP

(57) ABSTRACT

The disclosed invention relates to mass spectrometry (MS) and related instruments ('analyzer device'). More specifically, the disclosed description relates to an improved apparatus, herein termed a vacuum chamber assembly device configured to enable a multitude of functions to enhance ionization and analyte ion transfer through the application of a plurality of Ports. The Ports being designed to provide on a single analyzer device capabilities of atmospheric pressure ionization, inlet ionization, and vacuum ionization rapidly available in order to maximize information obtained from a sample in a timely manner. Ports may also have auxiliary functions which expand and improve the available ionization methods as well as provide functions not commonly available.

20 Claims, 33 Drawing Sheets

FIG. 8

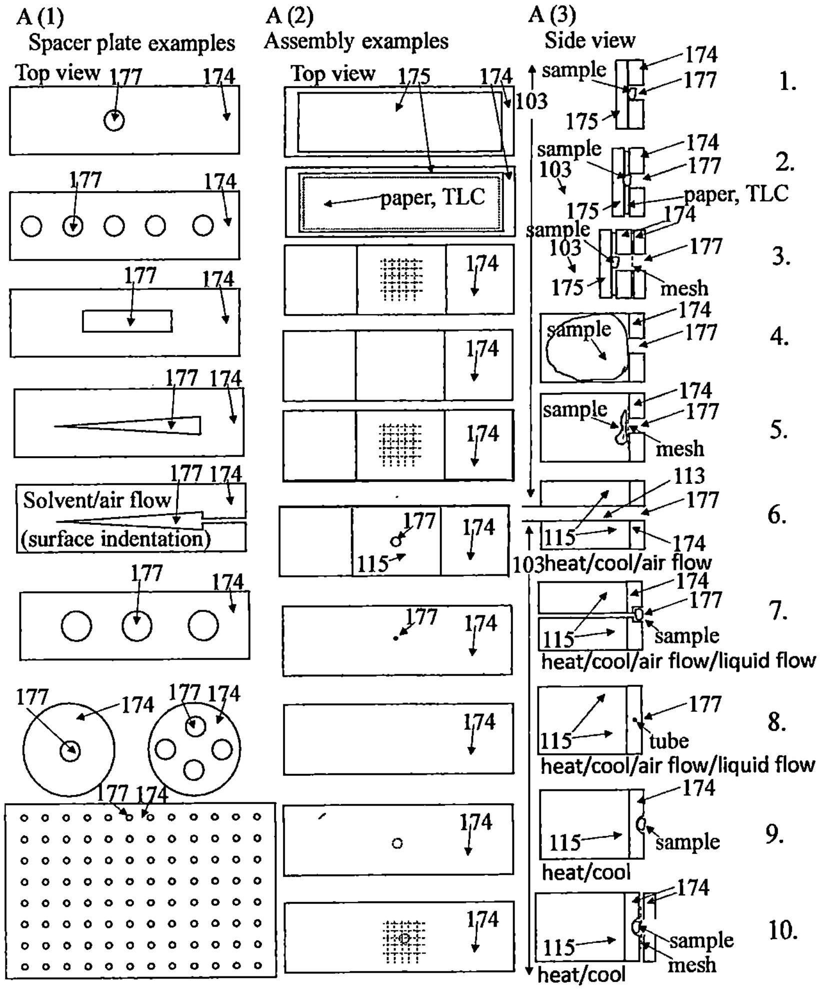

1. Typical assembly
2. sandwiched
Objects (paper, TLC, blood spots, swaps, etc.)
3. sandwiched
objects
mesh (lower pressure side)
4. Enclosure
3D objects (gels, food items, specimens, etc.)
5. Enclosure
3D objects (gels, food items, specimens, etc.)
mesh (higher pressure side)
6. API plate (LC, remote, touch/dipping, etc.)
short/extended channel
7. Gas/solvent flow
8. Solvent/gas flow
9. Objects with indentations (well plates, glass plates etc.)
10. Objects with indentations (well plates etc.)
mesh

B

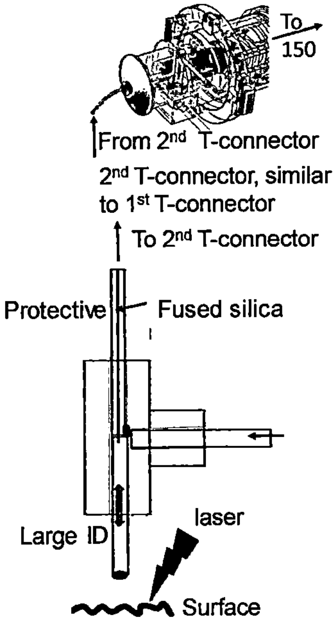

FIG. 9
A
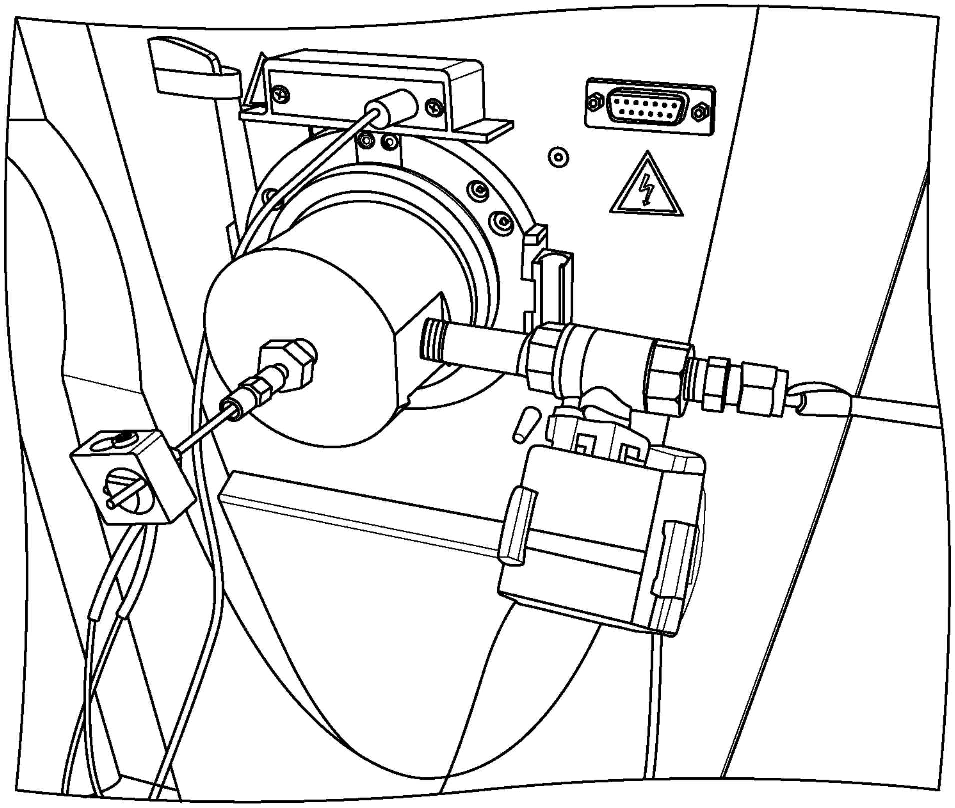
B
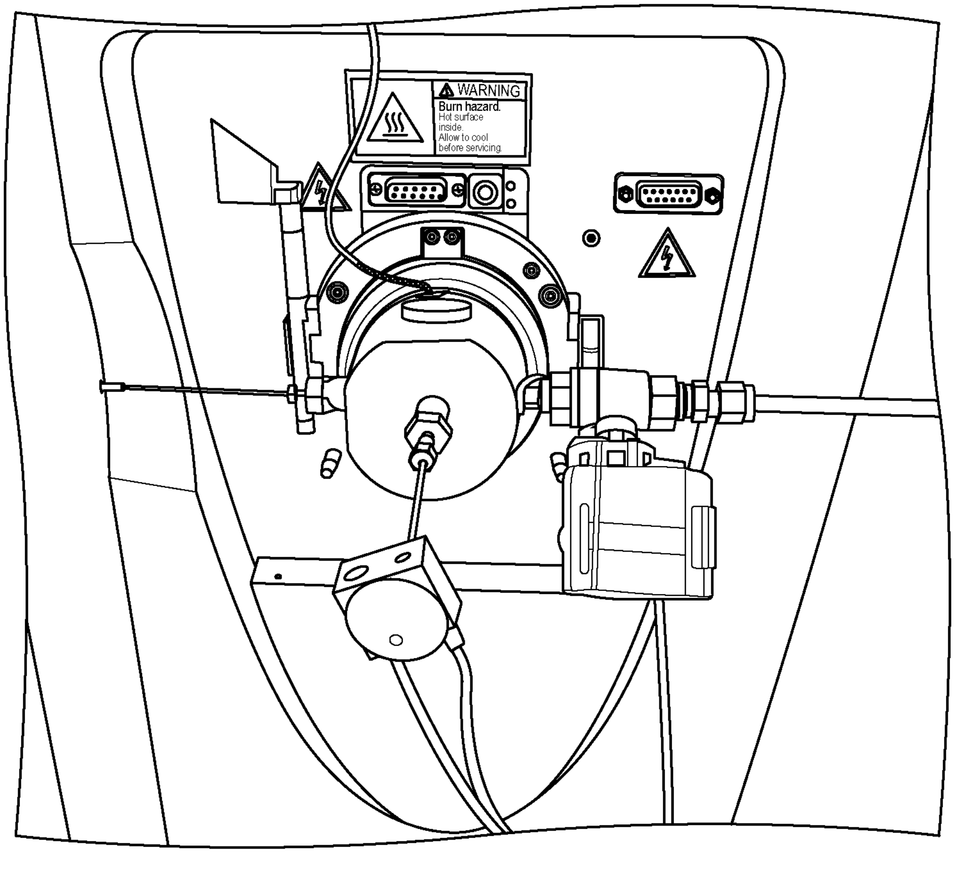

VACUUM CHAMBER ASSEMBLY WITH MULTIPLE FUNCTIONS TO MAXIMIZE UNIVERSALITY AND PERFORMANCE

CROSS-REFERENCES TO RELATED APPLICATION

This application claims the benefit of the filing date of U.S. Ser. No. 63/456,564 which was filed on Apr. 3, 2023 and U.S. Ser. No. 63/470,989, which was filed on Jun. 5, 2023. The content of these applications are incorporated by reference herein in its entirety.

STATEMENT OF FEDERALLY SPONSORED RESEARCH OR DEVELOPMENT

This invention was made with U.S. government support under NSF SBIR Phase I 1913787 and NIH SBIR Phase I (NIH 1 R43 AI172667-01A1) to MSTM, LLC. The government has certain rights in the invention.

FIELD OF DISCLOSURE

Background on the Invention

Words/expressions/meanings used in the disclosure of this invention which may in some circumstances be used interchangeably include: (1) Port: Passageway, inlet, dock, hole, entrance, entry, opening, access, doorway, ingress, admission (site), conduit, channel, shaft, tube, trough, sluice, as available options to describe the area between the interior (sub-atmospheric pressure region) and the exterior region of the vacuum chamber assembly, and have in common that they will vent the analyzer device if not configured for limiting the gas flow by use of valve, restriction such as inlet tube, skimmer, pinhole, valve, valve plate, or other options known to those practiced in the art. Additional vacuum pumps may be added but this is not necessary but may broaden even further ionization source/sampling devices/methods combinations. Multiple Ports referred to as a plurality or multiport be used interchangeably. These combinations are flexible but may be permanent fixtures. Also, an analyzer device can be configured around the vacuum chamber assembly and not just retrofitted to existing analyzer devices. (2) Ions: Gaseous analyte molecules with n charge, either positive of negative. (3) Charged particles: Sometimes referred to charged clusters or charged droplets or non-ions or charged agglomerations. The charged particle may be comprised of solvent or solid compound, referred to as a matrix and analyte. Loss of molecules comprising the charged particle may be referred to "other molecules" or a matrix and may result in bare singly or multiply charged ions of the gas phase analyte molecules. For the simplicity of this text, in the following a particle is typically referred to as comprising a matrix although it is generally understood that it may be any molecule surrounding the analyte. Under proper conditions charged particles are converted to gaseous ions. (4) Transfer: The ion transfer is increased when charged particles and possibly neutral particles are broken down to the gaseous ions. This improves the ion transmission and the sensitivity of an experiment. (5) Vacuum chamber assembly: We define conduit to mean the interior channel or passageway within the vacuum chamber assembly that, in use, is at sub-atmospheric pressure. Otherwise, we use terms such as "channel", passageway, tube, inlet, hole to have the meaning of a conduit but to distinguish these conduits from the principle conduit of the disclosed invention. All of which have in common gas flow and being in fluid communication with the analyzer device and that the sum of gas flows cannot exceed the vacuum/pumping capacity value associated/established for the analyzer device for a single use Port of, e.g., solely an API source.

Mass spectrometry (MS) is an analytical measurement technology providing a wealth of information with accuracy and specificity, doing so even from highly complex samples, often not readily obtainable with any other analytical technology. This technology and developed methods have the inherent advantage of requiring a minute amount of sample which can be studied directly or after clean-up. Biological, inorganic, and synthetic materials are examples of samples from which the analyte compositions and amounts may be identified using MS. Related technologies and methods are ion mobility spectrometry (IMS) and charge detector mass spectrometry (CDMS) and certain spectroscopy instruments. Liquid and gas separation methods are frequently used hyphenated with a mass spectrometer. Mass spectrometers and IMS are often hyphenated to provide nearly instantaneous separations by ion mobility and mass measurement of gas phase ions by MS. Both methods have in common measurement of gaseous ions, thereby providing information on the chemical/molecular compositions or structural information. Using the most suitable sampling, ionization source, and method and analyzer devices, gaseous ions of small, and large molecules (typically referred to as "analyte") are created and separated/detected (analyzed) from samples of interest and may constitute one or more or thousands of "components", also referred to as molecules, compounds, or analytes making up the 'chemical' and 'molecular' composition of a material, substance, fabric, biopsy, film, tissue, smear, bacteria, fungi, virus, biological matrix (saliva, blood, urine, feces, tears, sputum, etc.), chemical or biological reactions.

Data obtained may be indicative of certain disease(s) and/or disease state(s), or an environmental or security threat, warfare agents (chemical, biological, nuclear, etc.). The results from various ionization sources and methods complement each other, or in certain cases are exclusively applicable. However, the 'right' choice may require an entirely different mass spectrometer system in order to have available the 'right', or necessary condition, therefore increasing the need of user expertise and money, and to some degree trial and error and therefore time and loss in productivity or prevention of immediate knowledge of a health, environmental, or security threat.

A key to MS analyses is converting compounds, salts, or elements into gaseous ions. Direct analysis, without use of expensive and time-consuming hyphenated separation methods is gaining popularity in MS analyses; however, biological fluids and other 'dirty' or 'salty' samples are problematic because of resulting suppression of analyte ionization, or carryover, and ionization source (sometimes referred to "ion source") or instrument contamination. In electrospray ionization (ESI) and matrix-assisted laser desorption/ionization (MALDI), matrices (sometimes referred to as "matrixes"), solvents (ESI) or solids (MALDI), additives, and matrix combinations are frequently used. Certain forms of sample preparation may cause sample degradation prior to analyses and some ionization sources and methods are known to undesirably fragment the molecule, sometimes already in solution (e.g., acid labile functionalities) or its related molecular ion during the ionization process, and historically referred to as "harsh" or "hard" ionization. This is as especially prevalent with electron ionization (EI) of small molecule analyses. Atmospheric solids analysis probe (ASAP) and direct analysis in real time (DART) provide direct access from atmospheric pressure (AP) through one of the well-established atmospheric pressure ionization (API) source configurations for use in MS, with minimal sample preparation, to volatile and semi-volatile compounds from liquids and solids offering ionization 'soft' enough to prevent excessive fragmentation and straightforward means of mass analyses and data interpretation. Both methods have the intrinsic advantage of being capable of potentially analyzing gases but are not suitable for nonvolatile compounds. Other direct ionization methods such as vacuum matrix assisted ionization (vMAI) and desorption-ESI (DESI), as examples, are effective in ionizing large nonvolatile compounds. MS technologies are, in comparison to other technologies, high performing but expensive in their initial cost (e.g., laser, high-voltage supply, operator), heavy and bulky, use of consumables (e.g., high pressure gases, specialized hardware), and upkeep costs including instrument maintenance and operator expertise (e.g., training, safety).

An inherent necessity in MS is the separation achieved under vacuum in and by the mass analyzer or ion mobility analyzer (in the following also referred to in the general form of 'analyzer device') with detection of gaseous ions by various detector devices. The gaseous ions are formed in an ionization region, often referred to as an ionization or ion source. Creating gaseous ions and effectively transferring them to and through the analyzer to the detector are functions of the ionization region as well as the analyzer device. High ionization efficiency needs to be accompanied with high ion transmission to the detector). In MS, ions are separated according to their mass-to-charge (m/z) values which occurs in sub-atmospheric pressure (sub-AP), referred to a vacuum, conditions. With some ionization sources/methods, charged droplets or solid matrix particles are initially formed by the ionization process and must shed 'desolvate' the matrix molecules to release the bare ion for analysis. The bare ions may be in various charge states, either negatively or positively charged. The polarity of extraction lens and ion guides within the mass analyses determines if positive or negatively charged ions are detected.

Within the first vacuum stage region, various ion optics devices have been established such as the ion funnel, S-lens, stacked-ring ion guide, Einzel lens, tube lens, as well as ion guides such as quadrupole, hexapole, and octapole, some of which are also used as collision or reaction cells as known by the practitioner of the art. Also, devices to keep the instrument from getting too dirty to quickly such as jet disrupters, obstructions, off axis alignments are included as known by the practitioner of the art. This is also accomplished through the various source geometries (IonMax inlet tube, Z-spray skimmer cone, as examples). Extraction lenses or repulsive electric fields might be included to accelerate charged particles by exposure to voltages in a desired direction.

Prominent examples of ionization sources/methods are ESI, MALDI, matrix-assisted ionization (MAI), solvent-assisted ionization (SAI), DESI, atmospheric solids analysis probe (ASAP), direct analysis in real time (DART), electron ionization (EI), and numerous others. Ionization methods can be categorized into those where ionization occurs at or near AP (e.g., ESI, AP-MALDI, DESI, DART, ASAP); those where the sampling process is initiated at AP, but ionization occurs after the material enters sub-AP conditions as it is being transferred through the inlet and referred to as inlet ionization (e.g., MAI, SAI, laserspray ionization (LSI), and laser ablation (LA) SAI); or by vacuum ionization where the material being analyzed is inserted on a substrate (e.g., a probe or plate) from AP directly into vacuum (sub-AP) where ionization occurs (e.g., vacuum (v) MALDI, vMAI, vLSI, field desorption (FD), solid probe introduction chemical ionization (CI) and EI). Note, vMALDI is not a typical term in literature but used here for consistency of this text. Also, e.g., vMAI and MAI, may use the same matrix but the introduction to the system where ionization commences is different and does not mean a different ionization process.

Typically, mass spectrometers are dedicated to either API, or vacuum ionization, and within vacuum ionization, instruments are dedicated to either EI/CI for low-mass and volatile compounds, or vMALDI, a direct ionization method used primarily for high-mass and nonvolatile compounds, and less frequently, methods such as FD. Inlet ionization uses an inlet tube, frequently heated, in which ions are created within the pressure differential traversing from higher pressure to lower pressure and no matrix is required although matrix may be used for specific applications, as detailed below. Inlet ionization may be performed in some limited instances and on certain API inlets configured for API methods of, e.g., ESI, DESI, ASAP, and DART. In some cases, API mass spectrometers need to be retrofitted with an inlet tube for inlet ionization in order to achieve good ion abundance. A few mass spectrometer manufacturers have made it possible to physically switch between API sources/methods and MALDI (called intermediate pressure MALDI, herein vMALDI, to distinguish it from high vacuum MALDI time-of-flight (ToF) mass spectrometers) with certain upgraded mass spectrometers. Having this option is expensive and switching between methods time consuming as it requires venting and pumping down the instrument with each switchover. Bruker sells mass spectrometers which has API and vacuum (v) MALDI available without physical switching over or venting the instrument, but it is only available for specific Bruker mass spectrometers which are in the upper price range. The installation is permanent, limiting flexibility and maximum utility. The plurality of ionization sources/methods and approaches (sometimes referred to techniques) in MS, and IMS, and related instruments is because no ionization source, method, or sampling device works for all samples. This is made worse because only a limited number of ionization sources/methods, or more precisely categories (API, inlet ionization, and vacuum ionization) are operational on the same mass spectrometer. This limits analyses capabilities and the breadth and depth of any one analyses, ensures inflexibility, and unnecessary expenses. While there are a number of positive attributes relative to API and inlet ionization sources and methods for use with a mass spectrometer, the need for high pumping capacity is a disadvantage and addressed through ever better pumping systems or through vacuum ionization methods.

Efficient ion transfer or transmission is frequently achieved using ion optics, where electric fields are used to guide and focus gaseous ions and charged particles, but frequently in a mass dependent manner. Gas flow may also be used to carry ions, charged particles, and neutral molecules and neutral particles. The efficacy of gas flow in the transmission of ions and particles is related to the structure of the passageway, and in particular the inner diameter. Frequently, both methods are combined. MSTM's invention of the vacuum chamber assembly democratizes the issue, as detailed below.

Commercial mass spectrometers are often designed for ESI, and employ desolvation methods such as a heated inlet to release the bare ions from charged droplets. but also use means to prevent any particles from entering the mass analyzer rather than employ methods to desolvate these charged particles to gain analyte ion abundance. Improved desolvation of charged particles is a means for increasing sensitivity, while removing neutral particles keeps the ion optic elements cleaner for longer. Charged particles and droplets are crucial with the more recent inventions of inlet ionization and vacuum ionization, in addition to ESI. While some commercial sources can be used with these newer sources/methods, they may not perform optimally, so there is room for improvements and need for ion and (charged) particle transfer to maximize and optimize ion transmission into the analyzer device.

The present invention provides a simple, low-cost, compact, and relatively light weight vacuum chamber assembly device which can be configured with Ports providing a multifunctional assembly for, in principle, interfacing almost immediate access to and use of API, inlet ionization, and vacuum ionization sources and methods to any API mass spectrometer and ion mobility and related instruments. Additional functionalities may be incorporated to enhance ion/charged particle transfer, and therewith ionization or more precisely improve ionization efficiency through improvements in transfer/transmission, desolvation, fragmentation, if desired, and induce reactions with gases, and more. A Port may be used to seal the vacuum within the analyzer device, such as a mass spectrometer, from the pressure within the vacuum chamber conduit allowing Ports on the high-pressure side of the valve assembly to be open to AP without venting the analyzer device. A probe can be configured for this purpose allowing simple opening and closing of the passageway leading from the vacuum assembly into the analyzer device.

Common to API inlets, a variety of API sources/methods may be interfaced to a single Port or have a separate Port for a preferred ionization source, sampling device, and method. The present invention allows either option, and also allows nearly instant access to the vacuum ionization methods of vMALDI and vMAI with exceptional sensitivity and robustness to contamination using additional Ports on the same vacuum chamber assembly device, ensuring that the mass analyzer need not be vented circumventing complexity and pump down time. The invention constitutes an ion/(charged) particle transfer region in fluid communication with an analyzer device, and having multiple Ports configured to interface with either API, inlet ionization, or vacuum ionization sources/sampling devices allowing multiple methods to be used in rapid succession. The vacuum chamber assembly may be configured to receive the commercial ion sources available with the instrument being modified by inserting between the ion source and the analyzer device as an add-on giving additional functionality, and vacuum ionization capabilities. The Ports are in fluid communication with the vacuum chamber assembly conduit region and ready to receive and transmit at least one ion, as well as at least one particle or charged particle to the vacuum region where desolvation converts the charged particles to bare ions, which along with any remaining charged or neutral particles, are transmitted into the ion optics of the analyzer device. A Port may be used to aid desolvation of particles and charged particles by placing an obstruction in passageway leading to the mass analyzer from the conduit. The obstruction designed to transmit bare ions and very low mass charged particles while mostly deflecting neutral molecules, neutral particles, and remaining large particles out of the ion path leading to the detector. Ports are available for gaseous ion/(charged) particle transfer/transmission enhancements and may be operated to achieve the desired ionization for specific or more complete sample analysis obtaining chemical, nuclear, and/or biological molecular information. Thus, the disclosed invention allows the user to select the best ionization sources/sampling devices/methods (sometimes also referred to as “approaches”) rapidly and conveniently for the sample (material) at hand.

More detailed information relative to the background of the invention is provided in the following with emphasis on ‘sources’/‘sampling devices’/‘methods’, although ionization sources, sampling devices, and methods are not part of this invention, but are important for describing the significance of the multitude of Ports vacuum chamber assembly able to receive a multitude of ionization sources and therefore sampling devices and methods that, more particularly, comprise sample preparation, sample transfer, ionization, and transfer of ions and charged and neutral particles. The importance of a simple and nearly universal approach using a vacuum assembly with multiple Ports capable of docking API, inlet ionization, and/or vacuum ionization sources simultaneously or in short succession from each other will be made apparent.

Technically, the vacuum assembly uses a combination of a low gas flow and electrical elements (ion optics) to aid transfer of ions and charged particles into the analyzer device. The vacuum assembly is therefore ideally suited in implementing or using, essentially seamlessly, a specific function and/or enhancing specific functions as needed or desired. Other Ports (or docking systems) referred to as auxiliary device(s) may be interfaced to enhance or cause certain effects within the vacuum chamber assembly or at certain other Port(s). Heat and collisions may be used to enhance the ionization process such as in, e.g., ESI or SAL. This can be accomplished with an API inlet (Chait patent) or an inlet ionization inlet tube (McEwen patents), as examples, or additionally within the vacuum assembly conduit through one of the additional Ports (e.g., heated gas flow). Shutters or valves within the assembly or inserted through one or more auxiliary Port may be used to block gas flow in order to remove parts of the assembly for replacement or cleaning without having to vent the instrument as described above. Similarly, fluid communication restrictions (e.g., small, <1 mm inner diameter (ID)) inlet tubes may be used to exchange a Ports' ionization source/sampling device, or a valve assembly (e.g., ball valve) may be used to maintain the instrument vacuum when inserting a probe from AP to the vacuum within the vacuum chamber assembly. Relative positions of the individual Ports within the assembly and relative to each other also play a role (e.g., increase gas flow when and where needed or enhance use of a laser aligned in reflection geometry for producing and transferring ions and charged particles).

Sampling devices can be categorized broadly and in a variety of ways but have in common that they are associated with certain ionization sources for conversion of materials (samples) to at least one gaseous ion or charged particle. One reason for a sampling device is to provide a cleaning or separation step prior to sample introduction and ionization as in chromatography (1-dimensional (1D) or 2-D), including liquid (LC), gas (GC), gel permeation (GPC), and paper chromatography, plates (thin layer (TLC)), gels (1D- and 2D- (sodium dodecyl sulfate-polyacrylamide gel electrophoresis (SDS-PAGE)), slab gels, Western Blot, as examples. These none-MS separation approaches typically serve to increase the specificity and sensitivity of the experiment, but at additional expense and time; some may be readily hyphenated with MS such as LC and GC. Another reason for sampling devices, complementary to the first reason, is for a sampling device to avoid or reduce sample treatment by using direct mass analyses which decreases the need for highly trained personnel and the cost, especially if interfaced with computer approaches for data interpretation such as machine learning and artificial intelligence. MS is superbly accurate and with direct ionization approaches also very fast. To further improve the specificity for, e.g., identifying a drug or protein, intentional fragmentation (MS/MS) can be included with minimal additional time. Examples of sampling devices for direct analyses include, but are not limited to, ASAP, DART, MAI, SAI, and more specifically surface SAI without and with the use of a laser. Sampling devices also serve flexible and distant operations relative to the ionization source. Sampling devices (in certain cases also referred to as remote sampling or sampling from a distance) may be used with surface SAI, laser ablation SAI, and including transformative sampling-transfer-ionization technology to read the chemical composition from surfaces from a distance (e.g., "The Surface Reader"). Recent names described in literature (a number of papers are included into the reference list), with sometimes rather limited information provided, include and are not limited to REIMS ranging from "iKnife" to "LA-REIMS", "zero volt paper spray", "droplet assisted ionization inlet" ("DAII") (or "DAI"), "vibrating sharp-edge spray ionization" (VSSI)", a "MasSpec Pen", "Spidermass"/"water assisted laser desorption/ionization" ("WALDI"), as examples. Yet another reason for sampling devices and their operations is to use robotics where the human is replaced for convenience or safety.

A brief synopsis of ionization methods include API methods such as "ambient ionization" (e.g., DESI), AP chemical ionization (APCI), AP photoionization (APPI), ESI and associated methods (e.g., nanoESI), nano-DESI, DART, electrospray-assisted laser desorption ionization (ELDI), laser ablation ESI (LAESI), laser desorption/ionization (LDI), liquid extraction surface analyses (LESA) including other liquid extraction and liquid junction approaches, MALDI, ESI (MALDESI), paper spray and variations thereof, surface acoustic wave nebulization (SAWN), and others known to the practitioner of the art. Alternatively, inlet ionization sources and methods are in many respects even simpler and more direct than ambient ionization. The category of inlet ionization (Trimpin papers) includes LSI, (previously described as laserspray ionization inlet (LSII)), MAI (previously described as matrix-assisted ionization inlet (MAII)), SAI (previously described as matrix assisted ionization inlet (SAII)), laser ablation (LA) MAI, LA-SAI, voltage SAI (VSAI) (also referred to as ESI inlet, ESII), DAI (Johnston paper), zero volt paper spray, VSSI and variations thereof, as examples. Yet another alternative category, vacuum ionization sources/methods have in common that the step leading to the analyte ionization occurs under sub-AP and are therefore generally more sensitive than API methods. However, the mechanism to introduce the sample to vacuum to perform vacuum ionization is typically slow with the exception of some newer inventions (Pophristic pending patent). Vacuum ionization methods include chemical ionization (CI), EI, fast atom bombardment (FAB), sub-AP ESI (Smith patents), LDI, vMAI, vMALDI, vLSI, FD, secondary ionization MS (SIMS), and others well-known to the practitioner of the art.

ESI-based methods form multiply charged ions and MALDI methods predominantly singly charged ions; APCI based ions are also singly charged. Advantages of singly charged ions include the relative ease in data interpretation. Advantages of multiply charged ions, even of large proteins and protein complexes, are the ability to mass measure high mass compounds on mass range limited mass spectrometers because mass spectrometers measure m/z rather than mass which can be mathematically calculated, as long as the z of the detected ion is sufficiently clearly delineated. For example, a compound of molecular weight (MW) 10,000 with 10 charges (10,010 assuming protons are the charge carrier) will appear at m/z 1001 whereas with 1 charge, at m/z 10,001. Alternatively, if the z of an ion at m/z 1001 is 1 and ion received its charge through protonation (proton charge charrier), the MW of the molecule is about 1000 whereas if the charge is 10 the MW is about 10,000. These mathematical examples demonstrate the important aspect of the charge z in identifying the MW. Other more common charge carriers are sodium, potassium, and ammonium cations. Chloride adductions or deprotonation (abstraction of a proton) can lead to negative ions. Electron attachment or removal are yet other means of ionization of the molecule, although this frequently leads to a higher degree of fragmentation of the molecular ions, unlike other ionization means. Because of multiply charging, API high performance mass spectrometers, intrinsically limited in mass range, are readily applicable to high mass compounds with well-known advantages such as mass accuracy, mass resolution and precision, as well as other advanced measurement technologies such as ion activation for structural details and specificity (e.g., collision induced dissociation (CID), electron capture dissociation (ECD), electron detachment dissociation (EDD), electron transfer dissociation (ETD), in source decay (ISD), negative ETD (NETD), surface induced dissociation (SID), sustained off-resonance irradiation collision-induced dissociation (SORI-CID) and others known to the practitioners of the art) for complementary (or only) MS/MS or $MS^n$ fragmentation capabilities of the respective ions formed. Low chemical background allows ready detection of small and large molecules, some difficult or impossible by MALDI because of the typical large chemical background in the low mass range associated with the use of a less volatile solid matrix. Significant signal width in the higher mass range is associated with metal cation and matrix adductions as well as the highly restrictive mass range on API mass spectrometers because of the singly charged ions that are formed by AP-MALDI.

As samples become increasingly complex (e.g., tissue, bacteria/fungus smears, films of natural or synthetic origin), high performance mass spectrometers, become more critical, as does advanced data analyses for accurate and fast analyses. Programs are used to assign the charge state, readily extractable from the isotopic distribution of the mass spectral data. Deconvolution programs are typically used to provide the mass (MW) representation of the data resulting from multiply charged ions. Statistical methods such as principal component analysis (PCA), machine learning, and artificial intelligence, and others known to the practitioners of the art, are recently being utilized more heavily in order to quickly evaluate (interpret) the sample composition without the need for specific interpretations of a single analyte (as in, e.g., conventional MS/MS) but the sample composition as a whole, frequently supported through an extensive database using match/mismatch (positive/negative, go/no-go) decisions which enables interpretation of complex sample compositions on the fly (nearly instantaneously) and independent of the degree of the training of the end user. Open Mass Fingerprinting Framework (OMFF) used for classification studies is a software platform for processing, storage, and used to query fingerprint reference data obtained from mass analyses. Other software may include amongst other utilities IMS and/or chromatography data to enhance (e.g., improve and/or speed up) the data interpretation as well known by the practitioner of the art.

APCI is a method for ionizing molecules in the gas phase at AP, typically by protonation in positive ion and deprotonation in negative ion, or by cation or anion adduction. Ions are formed using an electric discharge. ASAP (McEwen patent), is a technique in which a sample is introduced to an APCI vented enclosure and vaporized by a hot gas stream for ionization by APCI. A safety enclosure is used as fumes associated with vaporized materials may be harmful. Only small molecules that can be vaporized are amenable to either APCI or ASAP. DART (Cody patents) is a similar method producing nearly identical results.

ESI produces through application of high voltages (typically 2-5 kV) high and low-mass ions regardless of volatility through production of charged liquid droplets when a solution flowing through a capillary tube experiences a high voltage gradient upon exiting the tube at AP. Various solvent ("matrices), solvent combination and additives such as acids and bases may be used to improve the results. In ESI, effective means for desolvation of the liquid droplets are provided (counter gas flow, jet disrupter are examples, Smith patents) to prevent the solvent from freezing. Desolvation of the charged gas phase droplets results in bare gas phase ions with little or no fragmentations of the analyte. ESI is frequently hyphenated with LC to deal with suppression effects and improve utility of the approach. nanoESI uses nanoflow liquid flow employing nano-emitters improving sensitivity at the expense of expertise, cost, and time.

SAI (McEwen patents) uses solvent (liquid matrices) similar to ESI, but rather than form charged droplets at AP, the sample in solution is introduced into a tube that links AP and the first vacuum stage of the mass spectrometer and no voltage is required. With, e.g., methanol as solvent good sensitivity can be achieved at room temperature, but with less volatile solvents such as water, ion abundance and sensitivity is increased by heating the inlet tube. Both positive and negative ions are formed similar to ESI, but at inlet tube temperature exceeding 400 degree Celsius, singly charged ions typically dominate, but without significant fragmentation. In related DAI, droplets are introduced and significant heat employed (UP TO 900 degree Celsius) (Johnson paper).

vMALDI is a popular ionization method for MS, most commonly performed on high vacuum ToF mass spectrometers, where, typically, the co-crystallized matrix:analyte samples on a MALDI plate is introduced mechanically (ca. 2 minutes) to the vacuum of the ion source region. A laser is used to ablate the sample, consisting of analyte associated with a small molecule compound called a matrix (which may consist of binary matrix combinations and additives). The sample preparation may also be important, e.g., "dried droplet" and "thin layer". The matrix is present in large excess in order to produce gas phase ions of the analyte(s). Typically, the laser beam traverses from the laser housed at AP through a window that seals the vacuum of the mass spectrometer from AP and using lenses and mirrors strike the sample on the sample plate in, typically, reflection geometry laser alignment and in a relatively focused spot, typically <100 microns diameter. Higher spatial resolution is achievable through a number of different ways and of them is, e.g., using the laser alignment in transmission geometry; this arrangement has the intrinsic advantage of one shot one mass spectrum, hence, the ability to be fast while employing an affordable laser with relatively low repetition rates. MALDI has also been demonstrated on API mass spectrometers, but is generally accepted to be less sensitive than vMALDI which is typically performed on Tof mass spectrometers (e.g., Bruker, Shimadzu, and previously Thermo, Waters/Micromass, and Sciex) and less common from intermediate pressure associated with quadrupole-Tof (QTof) mass spectrometers (Waters/Micromass and previously Thermo). A notable disadvantage is the chemical background associated with MALDI. Another stark disadvantage is that singly charged ions are predominantly formed in MALDI which limits MALDI on API mass spectrometers (e.g., Fourier Transform (FT) instruments such as Orbitraps, as well as QTof's) because of the inherent mass range limitations of API mass spectrometers. Yet, another limitation of MALDI (as in MALDI-ToF) is that with increasing mass (MW) the signal width becomes broad (because of a combination of cation and matrix adduction(s) as well as potentially fragmentation) making the interpretation of masses above 100 kDa differing by ca. 10 kDa a challenge to achieve. While MALDI-Tof may be routinely employed and for complex samples of moderate sizes, once a satisfactory sample preparation and acquisition method has been established, limitations include chemical background (typical operation is with a mass range above m/z 800 limiting low mass applications such as drugs), undesired fragmentation (limiting applications to fragile compounds such as posttranslational modifications (PTM's), and chemical modifications), matrix and variable metal cation adductions, and "hot spot" phenomenon (limiting reproducibility and quantification). Ionization sources operational from intermediate pressure may help with AP issues relative to sensitivity of the measurements but the mass range limitations remain. Although the introduction of the sample plate into the (high) vacuum region of the mass spectrometer complicates and slows down the overall speed of analyses, fast analyses are achieved with MALDI-Tof-MS by using expensive high repetition lasers.

Matrices may be at room temperature. Matrices in MS are widely used and may be in pure or mixed forms and may include additives and salts depending on the need for the analyte to gain a type of charge. The "matrix" is particularly important for ionizing nonvolatile compounds such as used in ESI, MALDI, their variations (e.g., MALDESI, (nano) DESI, LAESI), as well as SAI, MAI, LSI, and their variations (e.g., LA-SAI), and more recently in other methods such as in sonic spray as example. Relatively low volumes can be handled, e.g., <1 μl sample solution and <1 μl matrix solution mixed together and <1 μl of the mixed solution dried on the sample plate ('dried droplet method'). Instruments are available which can automate the matrix:analyte sample preparation. In APCI methods such as ASAP and DART, no matrix is required (McEwen patent, Cody patents).

Common matrices used in MALDI are optimized for stability under vacuum and "sufficient" absorption at the laser wavelength employed. Typical examples of "MALDI matrices" include alpha-cyano-4-hydroxycinnamic acid (CHCA), anthranilic acid, 6-aza-2-thiothymine, caffeic acid, 2,5-dihydroxyacetophenone (2,5-DHAP), 2,6-dihydroxyacetophenone (2,6-DHAP), 2,5-dihydroxybenzoic acid (2,5-DHB), 2,6-dihydroxybenzoic acid (2,6-DHB), dithranol, 3-hydroxypicolinic acid, nicotinic acid, 4-nitroaniline, salicylamide, sinapinic acid (SA), 2,4,6-trihydroxyacetophenone, and tetracyanoquinodimethane (TCNQ), among numerous others compounds that are used to assist in analyte ionization by a MALDI process; combination of matrices (or so-called binary matrices) have been used, e.g., "super- DHB"). ESI and SAI use various solvents, sometimes with additives such as ammonium tartrate for matrices.

Another laser-based source/method is LSI (Trimpin patents) which appears softer than MALDI and produces ESI-like multiply charged ions directly from surfaces, in some cases even using a matrix that may be used for MALDI (e.g., 2,5-DHAP, 2,5-DHB, CHCA, SA), producing significantly less chemical background than, e.g., MALDI and is less prone to metal cation attachments contrary to both ESI- and MALDI-based methods. LSI from AP typically requires a heated inlet tube, and with some matrices substantially heated (≥450 degree Celsius, e.g., CHCA, SA). Many compounds act as LSI matrices, but only a few at low inlet temperatures and in the absence of an "inlet tube", "channel" or "conduit", as is the case with vacuum LSI (vLSI), e.g., 2-nitrophloroglucinol (2-NPG) matrix. LSI is operational from AP, intermediate pressure to high vacuum relative to the source chamber pressure.

Still another newer ionization source/method is vMAI (Trimpin patents), and like LSI and MALDI uses a solid matrix, but unlike LSI and MALDI does not require a laser; a laser can be used and one typical effects is faster removal of the matrix:analyte sample from the surface from where the sampling occurs. Adding heat is not necessary, depending on the matrix used. Certain volatile matrices sublime/evaporate spontaneously, to degrees specific to a specific matrix or matrix combination, and, importantly, converts compounds contained in the sample to "bare" gas phase ions, with reasonable certainty, through charged matrix particles. vMAI also produces multiply charged ions, but similar to LSI, conditions imparting energy (e.g., voltage, higher laser energy) into the ionized species reduces the charge states observed. A number of specific matrices for vMAI have been discovered, including but not limited to 3-nitrobenzonitrile (3-NBN or NBN), 2H-chromen-2-one (or also known as coumarin), 1,2-dicyanobenzene, 2-methyl-2-nitropropan-1,3-diol, 2-bromo-2-nitro-1,3-propanediol (also known as bronopol), isopropyl N-phenylcarbamate (or also known as propham), and methyl-2-methyl-3-nitrobenzoate, among others. Matrix combinations (e.g., different MAI matrices, MAI/MALDI matrices (e.g., 3-NBN/CHCA although no laser is required to be used), and MAI matrices with compounds that are not "matrices") and matrix(es)/additive combinations including solvent (as in SAI, as example) may be utilized to enhance the effectiveness of analyte ionization providing more specificity or breadth and depth analyzing samples. Matrices for use with (v)MAI have in common high volatility, more so than (v)LSI and contrary to MALDI matrices. Some of these matrices are deemed safe and even eatable (coumarin, bronopol, ice). Depending on the matrix used and the inlet conditions employed (v)MAI is applicable from below ambient temperature to high heat applications (>positive 450 degree Celsius and higher). vMAI has been shown to ionize proteins as large as bovine serum albumin (66 kDa) using an intermediate pressure MALDI source of a QTof without need of laser ablation. It is expected that higher masses will be readily applicable under the appropriate conditions, as is the case with MALDI, LSI, SAI, and ESI. Examples of biomedical and clinical relevance include, as representative examples, drugs of abuse, specific metabolites, gangliosides, cardiolipins (e.g., associated with Barth Syndrome), carbohydrate-based vaccine candidates, Ebola related proteins, membrane proteins such as bacteriorhodopsin, various toxins, bacteria, fungi, and microbe colonies, among other biological samples using, e.g., vMAI. Yet others include synthetic materials such as monolayers, synthetic polymers, dendrimers, molecular ions of salts including but not limited to lanthanides and actinides such as uranium salts.

Combined with IMS and the formation of multiply charged ions, the direct ionization approach is especially useful for highly complex samples and for cases where LC applications are difficult or nearly impossible to employ (e.g., in the field or for imaging applications). Mass spectra from a wide variety of compounds and materials (including, as examples, urine, tissue, whole blood, and samples with high concentrations of salt(s) or detergent(s)) produce analyte ions with good sensitivity, even with the inlet at ambient temperature using certain MAI or SAI matrices. In some cases, introducing MAI/SAI/LSI matrix:analyte samples to the inlet of an AP mass spectrometer in some cases may have some drawbacks, principle among these are carryover (prolonged observation of ions from introduction of a sample), and common with other direct ionization methods (e.g., ESI, AP-MALDI). inlet contamination over time when using highly contaminated or high concentration samples. Carryover limits control and the speed with which samples can be sequentially analyzed without ions from prior samples being observed. The robustness to inlet contamination is expected to be also over time problematic with sample introduction from AP but much less so when introduced from vacuum. More specifically, 3-NBN ionizes under vacuum conditions drugs, peptides, and proteins, monolayers of inorganic complexes in the positive detection mode whereas uranyl salts ionize using a matrix (Wellons paper) in the presence of nitric acid in the negative ion mode. The matrix 1,2-dicyanobenzene ionizes preferably lipids (e.g., gangliosides, cardiolipins), potential synthetic magnetic resonance imaging agents while bronopol matrix readily ionizes carbohydrate-based vaccine candidates. SAI ionizes compound classes that are less effectively ionized by, e.g., (v)MAI, such as the general class of carbohydrates and other less basic compounds. Unlike other matrices used in MS (e.g., CHCA in MALDI, acetonitrile or methanol in ESI), some of the SAI (e.g., pure water or ethanol) and MAI matrices are safe and even edible (coumarin) or used in consumer products such as bronopol making even in vivo applications and temporal resolution measurements possible such as from living species. While the vMAI source/method is highly sensitive, only a minute amount of nonvolatile material is removed during the ionization process. Thus, carryover between subsequent samples as well as instrument contamination for dirty and high concentration samples is essentially eliminated. While probe introduction (Trimpin papers) has a number of positive attributes, it is not at the level of high throughput or easily automated. The vacuum vMAI plate source (Pophristic pending patent), however, offers an expansive repertoire of additional measurement capabilities (high throughput, automation, robotics, unmanned, field-operation, are examples); although a laser is not necessary, a laser can be used (laser ablation (v)MAI) or switching matrices to perform vMALDI and/or vLSI.

Various improvements in ionization have been implemented for the various sampling devices, sources, and methods operational from AP. These include use of gases at AP along with heat, voltages, collisions, as well as other means to reduce/remove the matrix from the charged particle to increase bare analyte ions. Ionization under vacuum conditions allows large apertures that do not restrict ion/(charged) particle transfer/transmission, and rim losses (Willoughby patent) do not occur but requires a mechanical means for introducing the sample (materials) into the vacuum in fluid communication with the analyzer region. Thus, improved sensitivity is achieved with vacuum ionization source/methods as has been demonstrated with MALDI-Tof mass spectrometers relative to AP-MALDI and other API methods; the most typical use of MALDI is with Tof mass spectrometers operating at high vacuum. A method termed Super-AP MS has been implemented for increasing the sensitivity in ESI (Hiraoka paper). Other means are the use of collisions (e.g., jet disrupters, gases, voltages, heat) for increasing sensitivity and applicability in traditional ESI methods (e.g., Smith papers). Collisions within the inlet tube, or prior to, and after the tube region have been employed for inlet and vacuum ionization (e.g., Trimpin patents, McEwen patents, Trimpin papers).

Many of the deficiencies of API approaches are cured by introducing the liquid or solid sample directly into the vacuum of the mass spectrometer near the inlet to the analyzer device (e.g., Trimpin patents, McEwen patents, Trimpin papers). The vMAI sample may be introduced directly to sub-AP using a probe such that the sample experiences a limited gas flow when the volume into which the sample is inserted is evacuated. The matrix sublimes from the probe surface leaving any nonvolatile compounds (including, as one example, salts contained in samples) which are not ionized remaining on the probe to be removed from the instrument when the analysis is complete. The result from inserting the matrix:analyte sample on a probe tip directly into the sub-AP close to the ion transfer optics is a steady emission of gaseous analyte ions over a period of time. The time of ionization is determined by the rate of sublimation of the matrix and the amount of matrix placed on the probe. Conditions, which accelerate sublimation increase the ion abundance and shorten the overall time ions are produced and may include conductive and radiative heat. Conditions that slow the sublimation (e.g., cooling, lower pressure/less gas flow), cause ion formation to occur with less momentary ion abundance, but over a longer period of time (beneficial for, e.g., MS/MS). All matrices of this spontaneous ionization method sublime in vacuum near room temperature. In other inlet and vacuum ionization methods evaporation has to play a role; whether sublimation or evaporation, the process described is to remove (desolvate) matrix, solid, or liquid, from charged and neutral particles to transport the analyte into the gas phase as bare ions for analysis by MS or IMS or others. It has been shown that vMAI is applicable on a broad range of instruments from (ultra) high performance to portable and from small to large molecules, and directly from their natural environment.

By moving, or rastering, the sample through, e.g., a laser beam, a solvent stream or gas stream in a coherent manner and collecting mass spectra denoted by sample (plate) position, an image of the surface (or 2-D array) can be reconstructed for any m/z ratio mass analyzed and detected by the analyzer and detector devices and displayed in, e.g., the mass spectra (typically thousands per surface, e.g., mouse brain tissue section. This type of highly systematic measurement is referred to as imaging MS or MS imaging.

A sampling line of variable diameter, length and material, can be used to implement remote analyses from a distance, overcoming physical limitations and safety aspects (Trimpin patents, McEwen patents, Trimpin papers). A matrix, solid or liquid, may be added to the surface to be analyzed and the transfer line, if desired. A laser or other means may be used to remove material (sample) into the gas phase such as the inlet ionization source or into a transfer line first. Mass spectra are collected from the surface of the sample by typically summing several laser shots to produce more representative chemical information contained in the obtained mass spectra with acceptable signal-to-noise (S/N). In more recent years "imaging by MS" and "surface analyses" have been adapted with a variety of different ionization methods including but not limited to DESI, MALDESI, LAESI, LSI, SAI, and vMAI from API, inlet or vacuum ionization, respectively. Various lasers (Trimpin patents, McEwen patents, Trimpin papers) can be used (deep UV to far IR, ultra-fast and low repetition lasers, high and low power lasers, etc.). As understood by the practitioner of the art, in the newer inventions of inlet ionization and vacuum ionization methods, the laser is not directly involved in the sample (analyte) ionization but assists in dislodging the sample content into the gas phase for transport through a variable line toward the analyzer device where ionization occurs on the fly by conditions described for inlet ionization. As is also understood by the practitioner of the art, charged particles are converted to bare gaseous analyte ions under sub-AP conditions. Conditions for transfer of ions (e.g., created by ESI) versus those created by (e.g., SAI) are expected to optimize under different source and method conditions, even though they may use the sane matrix (solvent).

Some form of sample cleanup is generally utilized with MS methods, especially with ESI and APCI-based ionization sources and methods, which increase time, cost of analysis, and risk to the operator if the samples are too dangerous to be handled (e.g., toxic, contagious, or deadly such as bacterial, viral, fungi, or radioactive compounds, biological and/or chemical warfare agents contained in certain materials; several of these analytical challenges have been accomplished in a straightforward and safe manner (note ionization in both inlet ionization and vacuum ionization occurs under vacuum) using the newer ionization inventions (Trimpin patents, McEwen patents, Trimpin papers). Liquid chromatography (LC) may be used for separating complex samples prior to MS analyses. RapidFire from Agilent includes a form of quick LC separation but suffers from robustness of the setup and experiments requiring significant user expertise in running, operating and maintaining the instrument and methods. The ionization is based on ESI and achievable speed is at ca. 6 seconds per sample.

Liquid extraction methods have had a long history (Das/Bhatia paper; Brodbelt/Eberlin paper) and have been more recently combined with MS in a more direct fashion such as DESI, LESA, and MasSpec Pen, e.g., Eberlin papers). In common is that a solvent is used to extract the analyte(s) from a surface that are than ionized either by applying a voltage as in ESI or a pressure differential and preferably heat as in inlet ionization (specifically SAI or VSAI).

Removing sample content from, e.g., tissue and other 2- or 3-dimensional surfaces (e.g., fruits, meats, and other consumer products), other than by liquid extraction methods, also has a long history and have been in more recent years also coupled with mass spectrometers and related instruments. In common is that a force is used to remove the analyte(s) from a surface (volatilize the sample into the gas phase) that are than ionized (sometimes also referred to post-ionized) either by applying a voltage as in ESI or a pressure differential and collisions as in inlet ionization. A common limitation is that the analyses are physically limited to one sampling device, source and certain methods, and some analytes ionize (in some cases significantly) better with another source and method or are exclusively applicable by one or another sampling device, ionization source, or method. Inlet ionization (e.g., LSI, MAI, SAI, LA-MAI, LA-SAI, surface SAI based on liquid extraction or LA methods, LC, to name a few) and more recently DAI, as one of a number of examples of "new" ionization processes offering a variety of methods and devices to expand the utility of analytical, medical, security, biological, chemical, environmental, forensics, nuclear (and others) measurements.

Multi-ionization source capabilities (patents, papers) were initially introduced as a combination of ESI and APCI, which had previously required separate ion sources. Sources are still exchanged or modified to switch from ESI, to nanoESI, APCI, ASAP, DESI, nanoDESI, DART, AP-MALDI, photoionization and glow discharge ionization. among others that are commonly available from mass spectrometer vendors or homebuilt employing API mass spectrometers. For some of these "individual" ionization sources and methods, patent protection has been successfully sought. One example is that the interchangeable ionization sources offer the intrinsic advantage of tailoring the "right" ionization method (e.g., small molecule by APCI versus large molecules by ESI) to be used on the same mass spectrometer introducing less initial purchasing cost, footprint, and upkeep of more than one mass spectrometer, among other advantages such as a more comprehensive chemical analyses. AP-MALDI (TransMIT, Germany; MassTech, USA), paper spray (Thermo), DESI (Prosolia, now Micromass/Waters), LAESI, ELDI, ASAP (M&M), DART (IonSense, now Bruker), UniSpray (Micromass/Waters), iKnife (Medimass KFT, now Micromass/Waters), MasSpec Pen, SpiderMass, Unispray, WALDI, Echo (Sciex) are typical examples for sources (sampling devices, sometimes also referred to as add-on's) and methods which are frequently 'standalone' but are commonly, but not always, interchangeable on the same mass spectrometer, but may include venting the mass spectrometer (breaking vacuum). AP-MALDI, DART, ASAP, Unispray, iKnife, and MasSpec Pen have not been shown to be effective for larger molecules, either because of general ionization limitations or because of the mass range restrictions of API mass spectrometers for singly charged ions. DART and ASAP are applicable to volatile and semivolatile compounds producing singly charged ions. The exchange of sources, or when cleaning an API source inlet, can require minutes or hours (e.g., overnight baking), depending on the mass spectrometer and inlet geometry, adding to cost and downtime. Intermediate pressure MALDI sources are available (Waters) which can be replaced against an API source (e.g., ESI/APCI) but the vacuum needs to be broken. Breaking the vacuum (venting) the instrument is a significant issue in terms of time, expertise, and component use/wear and tear, as examples. This may be necessary for interchanging sources/sampling devices/methods or cleaning a source, such as, e.g., vMALDI, or exchanging with other ionization sources such as ESI. Intermediate pressure MALDI sources, however, under certain conditions may be used with LSI-MS on the same vacuum source of commercially available mass spectrometers (Trimpin patents and papers). The exchange of sources, sampling devices, methods without breaking the vacuum of the mass spectrometer is from a practical standpoint notably more desirable than having to deal with the aftermath of having to vent the instrument.

The Bruker dual ionization source capabilities include an API source and vacuum MALDI which are in a permanent location, expensive, and only on a select series of a high-performance mass spectrometers. A related patent is included (Linden patent), but to our knowledge was never commercialized. Select series of Waters mass spectrometers offer the exchange of API and intermediate pressure MALDI sources; patent coverage is not obvious, instead a paper is included (Trimpin papers). In even more limited instances, Thermo offered a vacuum MALDI or API ionization configuration on select mass spectrometers; for the exchange of the ionization sources, the mass spectrometer was required to be shipped back to the manufacturer. These examples give a principle feel of the general utility but also the significant technical difficulties of exchanging vacuum ionization source.

No ionization source, sampling device, or method, 'can do it all', meaning ionize every possible molecular composition. All ionization sources, sampling devices, and methods thereof have unique capabilities as well as downsides towards their respective applicability to small and large, hydrophobic and hydrophilic, and volatile and nonvolatile components within a mixture. Additionally, "soft" and "hard" ionization leads to desired and undesired fragmentation, different background ions, and mixed ionization of, e.g., protonation, deprotanation and cation, anion adduction, respectively, thus complicating interpretation of the results. Interchangeable ionization sources, sampling devices, and methods, where ionization is initiated to address shortcomings of any one approach, have been introduced in the past to, in part, alleviate the problems (limitations) and maximize the utility of a specific API or intermediate pressure ionization mass spectrometer and maximize the utility to some degree of the more expensive component, the analyzer device itself. This, however, has traditionally been accomplished in a manner which is both time-intensive, limited, expertise demanding, and impractical, especially when the instrument needs to be vented to switch between atmospheric and intermediate pressure ionization sources, sampling devices, and methods. Likely, the most common exchanges of ionization sources and methods are related to API sources (numerous patents and papers included to reference list) in which the ion entrance remains the same, but the source housing with the respective ion generation means is associated with the source housing such as high voltages, desolvation gas, etc., leading to capabilities of ESI, APCI (ASAP, DART), DESI, MALDESI, LAESI, nanoESI, as examples, for which the switchover does not require breaking the vacuum of the mass spectrometer (switchovers are in the order of minutes for the majority of these examples). In these cases, the ionization occurs at AP and gaseous ions, and to some degree charged particles (droplets) enter the sub-AP of the mass spectrometer.

Desolvation gases, voltages, and ionization source geometries help guide and focus the gaseous ions toward the mass spectrometer and help remove the (charged) particles (droplets) by either desolvation or 'removal', e.g., onto surfaces and if volatile into the rough pump. This helps keep the mass spectrometer cleaner for longer. Such API source/device/methods exchanges may include ESI, DESI, APCI including ASAP and DART (e.g., Prosolia, now Waters; M&M Mass Spec, and Advion Interchim; IonSense, now Bruker). A number of patents on this basic idea have been listed (more specifically, e.g., U.S. Pat. Nos. 3,886,365A, 4,037,108A, EP0423454A2, US20040079881A1, GB2394830A, GB2406705A) indicating the importance of such principle capabilities in exchange of an ionization source.

More recently, Waters received patent protection for a multi SAI inlet (Brown, U.S. Pat. No. 9,761,428B2) in which one inlet is used for calibration purposes. It also assumes that one inlet can be used with ESI/APCI. Data was not presented in this patent so it cannot be determined if the device was ever constructed or tested. Similarly, Waters received patent protection for a vacuum ionization configuration (Brown, U.S. Ser. No. 10/319,575B2). Again, no data was presented in this patent so accessing any form of analytical validity is not possible from the patent. MSTM recently introduced a plate-based vacuum source (Pophristic pending patent) that allows straightforward execution of vMAI and vMALDI methods through the same 'Port' and plate by simply without (e.g., vMAI) and with the use of an appropriate laser (e.g., vMALDI,). ESI capabilities were also retrofitted onto the plate-based vacuum ionization source, as a convenient way for, e.g., instrument calibration and other basic applications. This plate-based vacuum source is a specific type of multi-ionization capabilities, which, uses a single. This plate-based vacuum ionization source invention for directly introducing samples (e.g., vMAI) or gaseous ions (e.g., ESI) to vacuum constitutes a significant advantage over previous ionization sources. These examples give a feel of the general utility and opportunities of the new ionization processes, which proceed through stages of charged particles at sub-AP versus traditional ionization processes which are largely associated with bare gaseous ions under vacuum conditions. For AP methods such as ESI, the charged droplets were desolvated into bare ions before reaching the vacuum ion transfer region, or discarded early in the process of transfer/transmission, and in vacuum MALDI, only bare ions needed to be considered. The new ionization processes of SAI, MAI, vMAI, and LSI, produce charged matrix:analyte particles which, for optimum sensitivity must be transmitted, along with bare ion, well into the analyzer device, because, due to the volatility of the matrix, desolvation of the charged particles, and production of the desired bare ions continues throughout the lifetime of these charged particles. It is also possible, but not proven, that neutral gas phase matrix: analyte particles may produce charged particles similar to what happens at the matrix:analyte surface to initiate ionization. Thus, optimum transmission of ions in a multi-ionization device which includes SAI, MAI, vMAI, LSI or vLSI needs to take this into consideration. Importantly, even the likely most sophisticated of these newer inlet and vacuum ionization sources, the plate-based ionization source, also does not address to the sometimes rather contradictive needs associated with ion/(charged) particle transfer/transmission of API, inlet ionization, and vacuum ionization sources/methods, and while being more flexible than other ionization sources and methods, ion transfer/transmission under vacuum is not fully yet optimized. The multiPort vacuum chamber assembly of the invention presented herein provides Ports capable of aiding optimization of transmission of ions and charged particles when needed. Thus, this is an enabling technology for an exceptionally wide range of MS ionization methods and in a compact, relatively light weight, and low-cost add-on device.

Low-cost to manufacture and operate are especially important for measurements such as those desired or required during physician visits, airport screening, mobile response clinics, or health crisis such as emergency and operating rooms, as well as epidemics and pandemics, and monitoring cancer progression, fungal, bacterial or viral infection(s), the substance use disorder (SUD) epidemics including but not limited to opioid use disorder (OUD) (e.g., fentanyl) and stimulant use disorder (StUD) (e.g., cocaine) as well as prescription drugs (e.g., ketamine), safe and timely drug developments, homeland security, including energy and serosurveilance (e.g., uranium, bacterial, or viral detection/monitoring), as wide-ranging examples, because of the present invention's unique abilities to ionize small and large molecules for rapid and an unmatched breath of the measurement technology and its enabling sampling devices and, e.g., surface analyses (e.g., SAI, LA-SAI) methods. Similarly, simple sampling strategies including (filter) paper, meshes, needles, smears, and swabs, as well as other means known to practitioners may be directly applicable but may need enrichment (extraction and concentration) or even necessitate cell cultures and growing efforts (for some of the more difficult bacteria, as just one example). Filter paper has the intrinsic advantage of being able to add a brief separation/cleanup step, and even if it is as simple as exposing the opposite side to the vacuum to where the sample was applied. Other biological materials can be monitored rapidly and accurately for type and stages of cancers (blood, tissue including biopsies from organs), especially effective using a machine learning approach for fast and reliable interpretation including chemometric analysis. Surfaces may be wiped off or sampled using a stream of solvent, for which all that is required is to guide the solid or liquid into the sub-AP for ionization on the fly by (vMAI or SAI, as examples or with added complexity (e.g., use of a laser, MALDI, LA-SAI, LA-MAI, LSI, as examples). This is particularly true because of the robustness of the multiPort vacuum chamber assembly enabling the permanent or flexible use of ionization sources, sampling devices, methods, as well as auxiliaries afforded by the apparatus of this invention providing complementary ionization and chemical coverage of a material (sample) analyzed through traditional and orthogonal ionization methods that are well-known by the practitioner of the art. The outstanding sensitivity and chemical molecular information of small to large molecules achievable using the apparatus and methods of this invention are disclosed in more details in the following.

Not all Ports of multiPort vacuum chamber assembly need to be used. The device can be customized for specific use and the remaining Ports sealed for future use. Care must be exercised to prevent carryover by eliminating dead volumes (volumes without or with minimal gas flow), especially with MAI and vMAI. Use of filter paper with vMAI greatly reduces carryover while providing numerous other advantages. This invention supports an unprecedented number of sampling devices, unlike anything before developed in this scientific area. While the multiPort may sound complex, it is exceptional simple to operate, especially considering most users will employ a single Port for most analyses, with additional Ports only being employed when necessary to gather additional information to make or confirm an analysis. If physical exchange of sources/methods (approaches) is desired it may be accomplished without venting the vacuum of the instrument by blocking the vacuum chamber's fluid communication with the vacuum of the analyzer device. As mentioned above, it can be retrofitted on existing mass spectrometers or built as fit for purpose, and when the purpose changes, the ionization methods may be exchanged. No existing technology offer the ease or comprehensiveness of ionization sources, methods, and sampling devices, and especially at such a low cost to build.

BRIEF SUMMARY OF THE INVENTION

The invention disclosed herein is a vacuum chamber assembly device specifically related to a gaseous ion/charged particle transfer region for use with an 'analyzer device', which may be a mass spectrometer, ion mobility spectrometer, and combinations thereof, and where the term 'charged particles' encompass gas phase droplets, particles, or clusters of matrix molecules, solution or solid, as well as one or more analyte and one or more charges of one sign (positive or negative) exceeding that of the opposite sign. The term 'ion(s)' encompasses bare analyte molecule(s) in the gas phase having one or more charges of one sign (positive or negative) than the opposite sign. Analyte(s) are part of a sample and can be in the form of solid and/or liquid condensed phase, or in some instances in the gas phase. The vacuum chamber assembly device is preferably attached (interfaced) to the analyzer device at the first vacuum stage region of the analyzer device. The ion/(charged) particle transfer region is defined as a vacuum conduit which may have multiple Ports (multiPort) (or docks)) which link the interior of the conduit to the exterior of the vacuum chamber assembly; the exterior residing at or near atmospheric pressure (AP) with the exception of the portion docked to the analyzer device and residing in the sub-AP region of the analyzer device. The pressure within the vacuum chamber conduit is generally slightly higher than the pressure in the analyzer region of the analyzer device so that the flow of gas is in the direction from AP through the vacuum chamber conduit to the analyzer device and is important for transmission of ions and particles.

Typically, the vacuum chamber assembly may incorporate a minimum of three ports, but more typically four to eight Ports, but it should be understood that in some instances, more Ports may be desirable. The Ports may be at various angles extending from the exterior to the interior of the vacuum chamber. The Ports are in fluid communication with the sub-AP vacuum of the analyzer enabling transfer of ions and charged particles from AP or sub-AP into the first vacuum stage of an analyzer. The multiPorts are used for interfacing a variety of vacuum ionization, inlet ionization, and/or atmospheric pressure ionization (API) sources/sampling devices/methods used with MS or IMS, and combinations, as well as other auxiliary functionality to improve ion fragmentation, ion and charged particle generation and transfer into an analyzer devise; note, certain instruments contain more than one analyzer device, thus such instruments incorporating a mass or mobility analyzer are covered by this disclosure.

The multitude of Ports vacuum chamber assembly invention disclosed below can be used to assess, for example, biological, clinical, biomedical, forensic, environmental, agriculture related compounds, food and food products, authentication of samples, diet supplements, plant, spice, consumer products, drugs and drugs of abuse including but not limited to opioid use disorder (OUD) (e.g., fentanyl and its derivatives), stimulant use disorder (StUD) (e.g., cocaine and its derivatives), and prescription drugs (e.g., ketamines), pharmaceuticals, cannabis and cannabinoids, hallucinogens, and/or oil/petroleum samples, inorganic salts and complexes, molecular salts, nuclear compounds (e.g., uranyl nitrate), synthetic polymers, dendrimers, amongst others, as well as for identifying microbes as occurs in microbial infections, bacterial, fungal, and viral pathogens, cancers, and biomarkers for a variety of diseases ranging from small to large molecules. Tissue imaging, monolayer analyses, and single cell analyses are other examples in which the invention may provide detailed information from a sample of interest that relate to a specific disease and disease boundaries through in vitro and in vivo measurements. Depending on the application needs, this may be with or without a laser, or other energy inputs, with or without calibration or standards injections for calibration or quantitation purposes for improved measurement outcomes translating to faster answers, more precisely and accurately, for the end user (e.g., patient, health insurance). It should be understood that these uses are meant to be examples and not inclusive uses of the innovative, one of its kind ion/charged particle transmission vacuum chamber assembly based on the plentiful examples of traditional ionization processes and methods and complemented with inlet ionization and vacuum ionization processes and novel approaches, e.g., surface SAI and vMAI for gel separated proteins, and having access to inlet ionization and traditional ionization approaches, e.g., ESI, vMALDI, and ASAP, for chemical information obtained rapidly or even at the same time for small to large molecule analyses using best/most appropriate approaches at little additional time, efforts, expense, or expertise.

Practically up to 6 Ports are comfortably fitted on a reasonably sized vacuum chamber and the combinations of possibilities and solutions to numerous analytical challenges solvable using a single mass spectrometer or ion mobility spectrometer or combination instrument are unmatched. The advantages of this vacuum chamber assembly consisting of a multitude of Ports used with a variety of sources, sampling devices, and methods, as well as auxiliary functions for the analyses of a broad range of analytes fulfill the requirements of methods that include “biology”, “chemistry”, “human health”, “in the field”, “fit-to-purpose”, “point-of-need”, “point-of-care”, “bedside”, “doctors office”, “cancer”, “microbiome science” “integrative omics”, “food safety”, “forensics”, “remote”, “portable”, “analyses from a distance”, “environmental”, “environmental molecular sciences”, “earth system science”, “ecosystem science” “materials science”, “homeland security”, “law enforcement”, “chemical warfare”, “biological warfare”, “nuclear proliferation”, “scientific discovery”, etc. made possible by using the most fitting approach(es) for speed of analysis, cost effectiveness, simplicity of operation, and robustness to carryover and contamination and also at point-of-interest/need (in the field) measurements. The exceptional flexibility makes this multiPort assembly radically different from current mass spectrometer ionization sources, sampling devices, methods and applications. Further the invention is readily adaptable to how a sample is presented to the analyzer device, e.g., glass plate, filter paper, membrane, mesh, a tip (e.g., Qtip, toothpick), metal plate, thin layer chromatography (TLC) plates (1-dimensional (1D) or 2-D), gels (1D- and 2D-(sodium dodecyl sulfate-polyacrylamide gel electrophoresis (SDS-PAGE)), swabs, and parts of leaf, hair, fruit, vegetable, or meat, as well as plastic and polymers including films, sections biological tissue, and gases. LC and other liquid clean up steps are applicable online (e.g., (nano)ESI, (nano)SAI, APCI), or offline (e.g., MAI, MALDI).

Quantification is rapidly achieved through the standard addition methods, internal standards method, and through relative quantification. Easy, rapid, and accurate detection on-demand and at high speed and sensitivity represent significant improvements in many analyses, and especially healthcare outcomes and costs. Forensics are readily executed by, e.g., rubbing one of a filter paper over a surface potentially exposed to harmful chemical(s).

The Ports provide an easily accessible interface from AP to the vacuum of the analyzer device, and provide for sequential or simultaneous transfer of bare ions and charged particles from multiple ionization sources configured for gas phase ion generation at or near AP, in the transfer region between AP and the sub-AP of the vacuum conduit, or directly in the sub-AP of the conduit within the vacuum chamber assembly. Ions and charged particles are transferred through the vacuum chamber conduit into the ion optics of the analyzer device by the flow of gas and/or, alternatively, with the aid of voltages applied to lens elements through one or more Ports. The invention relates to a device and methods for converting mass spectrometers designed for AP ionization (API) to being capable of rapid, seamless switching between multiple API, inlet ionization, and vacuum ionization methods without need of instrument venting, and including insertion of certain functionality (auxiliary functions) for collision induced fragmentation if desired, improved vacuum ionization, and improved ion/charged particle transfer, among others, at a reasonable cost while increasing breadth and depths of analyses capabilities.

Ionization may be initiated with and without a laser, without and with high voltages, and with or without a matrix added, with or without heating or cooling, from the general categories of (1) API, (2) inlet ionization, and (3) vacuum ionization, while the commercial abilities of existing mass spectrometers are not sacrificed. Additionally, we disclose auxiliary Ports which serve the flexibility and specificity of adding additional function or improving certain existing functions associated with the ionization sources, sampling devices and methods (1) to (3). The invention is not limited to retrofitting to existing instruments but also to design, construction of innovative new instrumentation in the general field of mass spectrometry, IMS, and combination instruments. A Port may have both ionization and auxiliary functions.

The multiPort vacuum chamber assembly may have walls which separate the environment within the vacuum chamber from the environment exterior to the vacuum chamber assembly. The vacuum chamber assembly may be as simple as the geometry of a tube (referred to herein also as a conduit), although other configurations, such as, but not limited to, an oval, rectangle, or spherical may be used. Considering a conduit, the two ends may be in fluid communication with each other and with the sub-AP (vacuum) of the analyzer device. The conduit may have Ports branching off and in fluid communication with the sub-AP within the conduit, and the sub-AP of the analyzer device. Ports may reside at the end of the conduit opposite the end that is docked to the analyzer device, or directly across the conduit from one another or in other positions along the length of the conduit and at 90 degrees to the conduit or at other angles such as, e.g., 60 (or 120) degrees.

After installation of the vacuum chamber assembly on an analyzer device, the gas flow is optimized for the desired configuration. In most configurations there are only two Ports that transmit air from AP to the sub-AP of the vacuum chamber assembly and one is used in conjunction with the vacuum ionization Port and is set for a small gas flow by the inner diameter of the tubing used which is typically <0.4 mm. The other Port transmitting gas (e.g., air, nitrogen, or others) and used for AP and inlet ionization has the gas flow optimized by selecting an inlet tube with length and inner diameter that produces the minimum gas flow and pressure within the conduit for optimum results. Other inlet tubes can be fitted on other Ports, but are typically blocked except for the one in use. As an example, there may be inlet tubes in two Ports, one for ESI/APCI and one for SAL. A cap is typically placed over one to block gas flow while the other is operational. Switching caps allows the other to be operational with optimal gas flow. If it is desired to have both operate simultaneously, it is necessary to compromise relative to optimum sensitivity in order to maintain operational pressure by using smaller inner diameter or longer tubes. An important feature is the ability to remove and replace inlet tubes without venting the by having a probe substantially block the flow of gas out of the conduit or operate a shutter device which can be opened or closed by manipulation from AP. Inlets with low gas flow may be used in some cases to enhance ionization in another Port such as a Port used for vacuum ionization.

The multiPort vacuum chamber assembly provides simplicity for production at relatively low cost, size and weight. The vacuum chamber provides flexibility for a cost-effective means of achieving maximum utility of an instrument both in terms of breadth and depth of analysis. It no longer requires selecting the instrument based on the ionization source/sampling devices because most currently known ionization methods can be retrofitted easily and cost effectively. By limiting the number of Ports which are deployed, the invention may provide enhanced portability of the instrument for fit for purpose, point of need, and fieldable instruments.

The multiPort vacuum chamber assembly is designed to be interfaced with API mass spectrometers and related instrumentation from various manufacturers and provide a cost-effective means of having rapid or simultaneous access to API, inlet ionization, and vacuum ionization sources/sampling devices/methods. Thus, a single mass spectrometer or ion mobility spectrometer, for the first time, provides, through the multiPort vacuum chamber assembly device invention, the capability to access at least one of the categories of (1) API such as electrospray ionization (ESI), AP chemical ionization (APCI), desorption ESI (DESI) direct analysis in real time (DART), atmospheric solids probe (ASAP), AP matrix-assisted laser desorption/ionization (MALDI), and others known to the practitioner of the art; (2) inlet ionization such as matrix-assisted ionization (MAI), solvent-assisted ionization (SAI), voltage SAI (VSAI), and sub-variants (laser ablation (LA) MAI and LA-SAI, droplet assisted ionization (DAI), laserspray ionization (LSI), as examples), and others known to the practitioner of the art; (3) vacuum ionization such as vMALDI, vacuum laser desorption/ionization (vLDI), vacuum laserspray ionization (vLSI), vacuum MAI (vMAI), and others known to the practitioner of the art. The practitioner in the art will know the many combinations that the limited number of sources/sampling devices/methods noted above offers for a multiPort vacuum chamber assembly ion/charged particle transfer chamber in which one Port interfaces the vacuum chamber conduit to the analyzer device and its related ion optics. The use of the other Ports may be simultaneous or sequentially accessed in the order of seconds for installed approaches selected from the categories of API, inlet ionization, vacuum ionization, and auxiliary functions and approaches which frequently may be simply and seamlessly assessed through a software mouse click. In these cases, the interchange between approaches does not require changing physical components, although this is an option to maximize the completeness of the functionalities of the vacuum chamber assembly as disclosed herein.

A Port may be a tube having walls encasing a channel or passageway with an inner diameter between >0.1 mm and <30 mm, and preferably between >0.3 mm and <7 mm. The Port may have a variety of lengths and shapes and may be open and transmitting air from AP or near AP into the interior of the vacuum chamber assembly, or sealed so that air does not pass through the Port. If the Port is open to AP or near AP, the opening must be sufficiently small so that the analyzer device maintains an operational pressure. Typically, the opening will be between 0.3 mm and 1.0 mm, but, as would be understood by someone practiced in the art, may under some circumstances be smaller or larger such as <0.1 mm and >1.5 mm. The opening may be a channel through a tube and defined by its inner diameter. Some Ports may be both sealed and open, as for example inserting a probe device into the vacuum chamber through the Port will use a means to seal the probe using, e.g., 'O' ring or ferrule seals, and have an opening on the sub-atmospheric pressure (sub-AP) side of the seal to provide a gas flow to aid sublimation, ion/charged particle transfer, or gas phase reactions, so long as the operating pressure of the analyzer device is maintained. A Port having a first end and a second end such that the first end is fitted to the vacuum chamber assembly and open to the interior of the conduit with a vacuum tight flange or fitting, and the second end in fluid contact with the first end except when a valve device is placed between the two ends and in a closed position. Ports may have different inner diameters, and in some instances it is preferential for one end of a Port to be larger than the other end depending on the application needs. The gas flow through all Ports simultaneously is important and must achieve a pressure within the vacuum chamber conduit that produces acceptable results. The desired pressure varies with the analyzer device, the conduit's internal diameter, ionization sources/sampling devices/methods being used and the analyze device's pumping capacity. Typically, pressure ranges are between 10 mbar and $e^{-2}$ mbar, or a pressure which allow optimum operation of the analyzer device. Because the multiPort vacuum chamber assembly can be retrofitted with existing mass spectrometers, different gas flows and positions may be selected to provide best conditions for achieving maximum ions as well as charged particle transfer (or transmission) to achieve desired results.

An important aspect of this invention is that the different Ports can be configured to support and enhance each other. This synergy is unique and achieved through the implementation of three or more Ports in which one Port provides communication between the multiPort vacuum chamber assembly and the sub-AP of the analyzer device. In one configuration, the multiPort vacuum chamber interfaces on one end or side with the analyzer device, and on another end or side with the API source of the instrument that is being converted for multiPort use. In other words, the multiPort vacuum chamber inserts between the analyzer device and, e.g., the commercial API source, so that both are in fluid communication with each other and facilitating the transfer of the at least one analyte ion and/or the at least one charged particle from the ion source(s) to the vacuum region of the analyzer device. The second end may have a Port interfaced preferably with the commercial ion source that is supplied with the instrument, an API/inlet ionization inlet, or a plate source inlet. Between the first end and second end may reside a number of Ports enabling devices where the totality of these devices must maintain the pressure within the multiPort vacuum chamber within acceptable ranges for operation of the analyzer device. At least one of the Ports enable vacuum ionization methods. Adding an additional Port in line-of-sight with the surface onto which a matrix: analyte sample is applied, allows reflection geometry MALDI to be achieved by passing a laser beam through the added Port to impact the sample on the surface of the probe or plate device supported by the vacuum ionization Port.

Other examples of Ports configured to support and enhance each other (auxiliary Ports), include a means for introducing a relatively low flow of gas (continuous or pulsed) for enhancing, e.g., the rate of ionization by vMAI and aiding transfer of ions, and charged matrix:analyte particles toward, and subsequently into, the ion optics of the analyzer device. A simple example is API or more particularly the very common "ESI", which can serve as an "ionization source" or as an auxiliary function for another Port (e.g., gas flow and temperature control). Some of the various functionalities of the Ports are: a laser beam for vacuum MALDI passing through the Port using optical focusing or fiber optics; a shutter that allows a neighboring Port, ionization source or auxiliary device, to be exchanged or cleaned without venting the instrument, and addition of gases such as reaction gas(es) to cause reactions to occur with the ions or charged particles formed from another Port and includes deuterium gas to enable H/D exchange. Other uses of Ports include but are not limited to a laser beam for "MALDI-2", a collision surface (cold or heated) for ionization, desolvation, or fragmentation purposes, a camera, or a manometer, as examples. A Port can be included to sufficiently block the flow of gas through the conduit from the higher pressure region to the lower pressure analyzer device. This can be achieved by using a probe device shaped to insert through an 'O' ring or ferrule, and insert into the conduit sufficiently tightly to provide the desired seal. The relative sizes of the vacuum chamber channel and that of this Port closely match each other.

With the exception of the "open" Port connecting the vacuum chamber conduit to the sub-AP of the analyzer device, all other Ports are configured to separate the sub-AP within the multiPort vacuum chamber from the higher pressure, typically AP, on the exterior of the vacuum chamber walls. These Ports may be fitted with valves, such as a ball valve to allow insertion of, e.g., a probe device from the higher-pressure region to be in fluid communication with the sub-AP of the multiPort vacuum chamber conduit in such a manner as to maintain the operating pressure (vacuum) at the analyzer device. The probe may be a device to expose analyte in a sample to sub-AP of the analyzer device, it may be a means to add a low gas flow in a specific region within the vacuum chamber, it may be a means to introduce a laser beam to a specific area of the vacuum chamber, among other uses. The Ports may also be fitted with a tube having a capillary inlet therethrough, or a skimmer cone with an opening therethrough to allow, e.g., gas flow, without the use of a valve, where the operating pressure of the analyzer device is maintained due to the small inner diameter of the tube or skimmer opening. Selection of one of the group of API, inlet ionization, vacuum ionization and auxiliary function maximizes utility through breadths depth, and simplicity, among other outstanding attributes. Excess Ports may be provided and capped for future use.

Two Ports may be used as API inlets, one for ESI and another for ASAP as examples; two Ports may be configured as inlet ionization inlets, such as SAI and MAI; and likewise two Ports can be dedicated to vacuum ionization inlets such as vMALDI and vMAI; or as is obvious to the practitioner of the art any other configuration or any other ionization source may be selected from the categories of API, inlet ionization and vacuum ionization not inclusively listed above. When so configured, it may be desirable that Ports not in use be sealed to prevent gas flow from AP into the vacuum chamber. Alternatively, as previously noted, one Port may serve multiple functions. In any case, the multiPort vacuum chamber assembly device may be configured so that changing ionization sources/methods and associated sampling devices, or other uses of the various possible Ports does not require venting the instrument and in most cases may be accomplished in minutes, if necessary. Alternatively, as disclosed below, additional Ports provide additional capabilities available for immediate use as well as to enhance the effectiveness of other ionization sources/sampling devices/methods on the multiPort vacuum chamber assembly. Auxiliary Ports are supporting functions other than that of a "traditional source". As disclosed below, a 'source' docked on a certain Port can serve also as an auxiliary device to enhance another source docked on another Port, as, e.g., the gas flow through the inlet tube for API or Inlet ionization methods can alternatively be applied to enhance ionization in vMAI, and gaseous ion/charged particle transfer for vMAI and vMALDI.

With the multiPort vacuum chamber assembly, gaseous ion/charged particle transfer from AP to the ion optics of the analyzer device can be as efficient as the ion transfer with the commercial ion source. Thus, API methods are as sensitive, easy to operate, and have features found on the commercial "API-only" sources. This also is the case for inlet ionization, as well as vacuum ionization sources/sampling devices/methods. The reason is that with the multiPort vacuum chamber assembly, ion and charge particle transfer from the multiPort vacuum chamber to the ion optics of the analyzer device can be made as efficient as the ion transfer with the commercial ionization source and its associated ion optics by using ion extraction, focusing lens, ion guides, and/or gas flow known to practitioners of the art.

The multiPort vacuum chamber assembly may be configured to interface with different high- and low-performance commercial instruments designed for API by insertion between the commercial API source and the analyzer device and serves therefore as a high-performance extension of an ion/charged particle transfer region. Likewise, inlet ionization and vacuum ionization sources/sampling devices/methods may be applied to various instruments designed for API operation. This extended, ion/charged particle transfer region with its multiple Ports can be retrofitted on existing and on dedicated analyzer devices, and may have exchangeable or permanent features and functionalities selected by the user. For ionization methods that produce charged particles, the vacuum chamber assembly provides for additional desolvation of the charged particles and increased sensitivity. This is typically done by adjusting gas flow, use of a laser, and/or providing collisional surfaces through one of the Ports.

The vacuum chamber may contain ion optic elements to produce electric fields for extracting and transferring ions and charged particles from the respective Ports into the ion optics of the analyzer device. Gas flow (e.g., preferably air for ease and cost in use and alternatively nitrogen, argon, helium, or reaction gases, or combinations to sustain certain impact or reactions on the gaseous sample content) directs, in particularly, charged particles from the point(s) of origination into the ion optics of the analyzer device; whereas with ions, voltages are well known to be used to define and manipulate the ion paths. Through a Port, controlled gas flow may also be introduced and used to aid in removal of matrix (liquid or solid) from charged particles to aid release of the bare analyte ions. A Port may also be used to aid loss of matrix from charged particles by providing a means for a laser beam to impinge the charged particles thereby providing the energy necessary to aid removal of the matrix. A Port may also be used to enhance ionization through increased rate of sublimation of the matrix by providing energy to the matrix:analyte sample through gas/solid collisions. Heaters may be employed with Ports to provide optimum performance for the respective ion sources/sampling devices/methods used with Port(s) either globally or with specific Ports.

While dozens of ionization sources/sampling devices/methods and respective combinations may be used with this invention, we discus below at least one example from each general category of API (e.g., ESI), inlet ionization (e.g., SAI, MAI), and vacuum ionization (e.g., vMAI, vMALDI) and how auxiliary Ports may be used to enhance performance of a respective source/sampling devices/method, or how Ports may be used to enhance other Ports functions. This invention is not limited to the few specific examples provided in this text but the included examples instead give a general sense of what can be done, even with prominent and well-established sources/sampling devices/methods such as ESI and vacuum MALDI, in addition to inlet ionization and vacuum ionization sources/sampling devices/methods.

Other Port functionalities (auxiliaries) may be envisioned, including a Port for setup of remote sampling using a long tube made of PEEK, fused silica, or metal, as well as fixed (permanent) Ports which are not subject to exchange. The multiPort vacuum chamber assembly of this invention does not imply the invention of an ionization source or method. In fact, some of the ionization methods used in commercial ion sources can be readily converted to operate with patented ionization processes such as ASAP, DESI, DART, MAI, SAI, and VSAI. This is also true with the multiPort vacuum chamber assembly of this invention, and will require a license if these ionization methods are selected to be used. In this regard, the invention provides docking of API including so-called ambient ionization sources and methods, inlet ionization, and/or vacuum ionization sources/sampling devices/methods to the various Ports of the multiPort vacuum chamber and conduit therein to allow ready access to the principle categories of known ionization approaches and their nearly instantaneous, sequential or simultaneous use on a variety of analyzer devices by providing controlled temperature and gas flow as well as voltages and collisions favorably transferring ions and charged particles alike. This is possible because the disclosed invention facilitates and enhances the ion/charged particle transfer, without and with laser ablation/desorption. It is expected that this invention will also improve ionization approaches that may be invented in the future and may be docked to one of the Ports as desired.

An example is provided of how the multiPort vacuum chamber assembly may be used with mass spectrometry (MS), ion mobility spectrometry (IMS), and advanced capabilities such as MS/MS. Other uses and designs will be apparent to those practiced in the art. The multiPort vacuum chamber may be designed to fasten to the flange on the analyzer device that holds the commercial ion source provided for that analyzer device using an 'O' ring, gasket, or other means known to those practiced in the art to provide a vacuum-tight seal. In other words, the flange device may be made to fasten to a specific manufacturer's mass spectrometer or ion mobility spectrometer by replacing the instrument's commercial ionization source while the instrument is vented. This operation is only required the first time this invention is physically to be installed on an existing MS, IMS, or combination instrument. The flange device provides a vacuum seal with the instrument in a similar manner as the commercial API source, thus allowing the instrument to be pumped to the operating pressure. The commercial API source has electrical inputs which may be used if the commercial ion source is to be used with the vacuum chamber assembly in order to operate the ion source in the same manner as designed by the instrument manufacturer. In this case, the second end of the vacuum chamber assembly will be connected to a flange operationally identical to the flange the first end of the vacuum chamber assembly is attached to, i.e., the analyzer device flange that the commercial ion source connects to before modification. The disadvantage of using the commercial API source is that there is a physical limitation to the number of assessable Ports on the vacuum chamber assembly without extending its length. Also, voltages supplied with the instrument to operate the commercial source will not be readily available for functions which may be required to operate the various functions interfaced with the vacuum chamber assembly through its Ports (e.g., heaters, high voltages). The following sections describe the 4 categories of Port configurations and usages and are not limited to these examples.

One Port of the multiPort vacuum chamber assembly may have a capillary tube inserted through the Port linking the higher-pressure region outside the vacuum chamber walls with the sub-AP region inside the walls. The capillary tube may have lengths sufficient to extend from the conduit walls inside the vacuum chamber to exterior to the vacuum chamber and ranging from <1 mm to >1 m and where the longer length tubes are typically used for remote sampling. The tubes have a channel therethrough may have inner diameter between 0.1 to 1.5 mm allowing a restricted gas to flow from the higher-pressure region exterior to the vacuum chamber assembly to the lower pressure region inside the conduit. The capillary tube may be made of metal, fused silica, PEEK, or other materials known to those practiced in the art, and may be heated. This tube may be used to transfer gas phase ions, neutrals and charged particles from at or near AP to the sub-AP of the multiPort vacuum chamber where they are transferred into the analyzer device with electrical extraction and/or focusing lens operational by application of voltages, and/or gas flow (heated or not heated). The gas is typically air but other gases known to the practitioners are also applicable (e.g., nitrogen, helium, argon gas) may be used. Alternatively, a skimmer cone device or a plate with an opening slightly smaller than the inner diameter of the capillary tube may replace the capillary tube. The inner diameter (ID) of the capillary tube or skimmer opening or related restrictions must be sufficiently small to at least maintain and preferably be configured to easily control the operating pressure of the analyzer device. The gas flow acts as a carrier to aid transfer of ions and charged particles produced in the higher-pressure region, typically AP, into the ion optics of the analyzer device. Importantly, this gas flow may also be used to aid transfer of ions and charged particles produced directly in the low-pressure region to the ion optics of the analyzer device. Alternatively, the gas flow may be shut off as desired by, for example, capping the inlet.

Multiple Ports may be used for various probe devices and may be aligned such that one Port may be used to enhance ionization, transfer of gas-phase ions and charged particles to the analyzer device, and/or provide energy through collisions and heat transfer to aid removal of matrix from charged matrix:analyte particles. Probes may also be used for physical reasons such as a valve to block the conduit in a manner to seal the high pressure of the conduit from the analyzer device so that maintenance of the vacuum chamber assembly or changing of Ports may occur without venting the instrument. Alternatively, Ports may be used to provide a movable collision surface for, e.g., aiding removal of matrix from charged gaseous matrix:analyte particles or to cause intentional fragmentation. Voltages and additional heat can be applied to the surface. Any Port of the multiPort vacuum chamber, except the Port interfaced with the analyzer device vacuum, may be used for multiple purposes.

A Port may have a ball valve attached and configured to allow a probe device to pass through the ball valve when open so that a part of the probe device experiences the sub-AP of the multiPort vacuum chamber. The end of the probe may be inserted to a desired position within the channel (passageway) of the Port through which the probe shaft passes carrying the analyte or matrix:analyte to the optimum position for ionization to occur. The Port in this configuration may be a first tube having a channel open to the sub-AP of the conduit of the multiPort vacuum chamber on the first end and connected to the ball valve on the second end so that when the ball valve is in the closed position, without probe, no gas flows through the tube. On the opposite side of the ball valve is a second channel within a tube which is connected to the ball valve at the first end which is in fluid communication with the second end that is connected to a connector (fitting) such as a Swagelok fitting through a ferrule. The second end of the connector has a ferrule or 'O' ring which the probe rod passes through to make an airtight seal. When the ball valve is in the open position, the first tube and second tube with fitting are in fluid communication with one another and with the interior of the conduit of the multiPort vacuum chamber and thus with the analyzer device. In order to maintain operation pressure of the analyzer device, the second end of the channel passing through the first tube, the ball, and connector (fitting) must be sealed when the ball valve is in the open position to prevent venting the instrument which is common with the use of probe devices with vacuum ionization methods. The connector residing in the higher-pressure region, typically AP, provides a vacuum seal with the probe device passing through it. The connector may use an 'O' ring or ferrule to allow the probe to slide while preventing gas flow between the probe and seal. With the ball valve closed, the probe device may be inserted through the fitting so as to displace most of the air within the second tube connected to the ball valve on the high-pressure side. In this configuration, the ball valve may be opened and the probe may be inserted through the ball valve to a desired position with minimal gas load on the vacuum system. No additional pumping is necessary to maintain the analyzer device operational. The inner diameter of the first and second tubes and the ball valve may be 1/16", 1/8", 3/16", 1/4", 5/16", 3/8", 1/4", as well as from <1 mm to >10 mm and other sizes which can interface with the multiPort vacuum chamber.

The probe device may be used to carry a sample containing analyte placed on the end that is inserted into the channel of the tube connecting the ball valve with the vacuum chamber assembly conduit or through the tube and into the conduit within the vacuum chamber assembly. Alternatively, the probe may contain a capillary within such as PEEK or fused silica tubing to be used to provide a gas flow to enhance ionization through sublimation of the matrix with vMAI, or to aid gas phase ion and particle transfer using vMAI or vMALDI. The probe may also have other uses such as the transmission of a laser beam from the higher-pressure region into the multiPort vacuum chamber conduit. Gas flow to enhance vMAI ionization and ion transfer in vMAI or vMALDI may be supplied into the first tube into which the probe is inserted using a tube having a small inner and outer diameter connected to the first tube so as to provide fluid communication between AP and the vacuum within the analyzer device. The second end of the vacuum chamber conduit may also have a Port to allow a low flow of gas for use in API sources/methods, or to provide gas flow over a probe inserted into the conduit downstream (towards the conduit interface to the analyzer device). If the probe end carries a vMAI matrix:analyte sample into or near the vacuum chamber conduit, the gas flow will enhance sublimation of the matrix and thus ionization of the analyte, as well as aid transfer of charged matrix:analyte particles and bare ions through the multiPort vacuum chamber conduit and to the analyzer device, as well as aiding loss of matrix (desolvation) from any charged particles to produce bare gas phase ions. The gas flow (or additional laser beam or obstructions, as examples) can also be used to enhance gaseous ion/(charged) particle loss of matrix molecules in vMALDI or vLSI, as well as by heating the gas.

One Port of the multiPort vacuum chamber assembly may be configured to interface the sub-AP of the vacuum chamber assembly with a plate device. In this case this Port of the multiPort vacuum chamber assembly is configured to have a flat surface on the high-pressure side of the Port with a channel linking the flat surface with the low-pressure region interior of the vacuum chamber conduit. By placing a flat plate over the flat surface of the Port, the lower pressure in the multiPort vacuum chamber is separated from the higher-pressure region by the plate, and gases from the higher pressure region are blocked from entering the conduit of the Port by the seal formed between two flat surfaces. With this arrangement, the plate can act as an ion source as described in Pophristic (pending patent). Briefly, in one arrangement, the plate may be a valve plate to block the flow of gas from the higher pressure into the sub-AP of the lower pressure in the vacuum chamber conduit by the seal formed by the contacting flat surfaces. The valve plate may fit into a groove to guide the plate along a path which goes over the open channel of the Port which is in fluid communication with the interior conduit of the multiPort vacuum chamber assembly. The valve plate typically have no channel or hole passing through it. The plate over the open channel leading to the interior of the conduit may also be a flat spacer plate, the spacer plate having a single or multiple channels (holes) or an adaptable grove cut therethrough. When the spacer plate covers the conduit of the Port, it acts as a valve blocking gas flow through the conduit so long as a channel or grove in the spacer plate is not aligned with the conduit opening. However, if a channel or groove is aligned with the conduit opening, the spacer plate must be covered on the high-pressure side to prevent excess air flow into the conduit. In this case, the spacer plate is sandwiched between the flat surface of the Port and a sample holder with no or limited gas flow therethrough. Thus, when the sample plate is placed in contact with the spacer plate so as to cover the channels in the spacer plate, no, or minimal, gas flows enter into the vacuum chamber as long as the spacer plate, sample plate, and Port surface are in contact and have flat surfaces to prevent or limit gas flow from the higher to the lower pressure regions. The spacer plate and sample plate make up a sample plate assembly which may slide over the flat Port surface without loss of the operating vacuum of the analyzer while sequentially exposing the channels in the spacer plate to the sub-AP of the vacuum chamber through the open conduit in the Port. By having flat edges, two sample assembly plates, a sample assembly plate and a valve plate, or two valve plates may slide with edges abutted to displace one another without loss of the operating vacuum of the analyzer device. One or both flat surfaces in contact with one another may use a polymeric material such as Teflon tape with a smooth surface adhered to the metallic or polymeric flat surface to enhance sliding the valve plate or sample plate assembly over the Teflon surface and maintain a vacuum seal.

With the plate device, matrix:analyte samples can be placed on a sample plate so as to align with the channels through the spacer plate. The sample plate assembly with the samples within the spacer plate channels is then placed in the grove in the Port device and by sliding along the flat face of the grove may displace the valve plate or other sample plate assembly and sequentially expose each sample in each spacer plate channel to the channel of the Port which leads to the interior conduit of the multiPort vacuum chamber assembly. With the spacer plate arrangement, samples on the sample plate do not come in direct contact with flat surface of the Port.

Alternatively, a paper substrate such as filter paper may be used to receive the vMAI samples from solution and the paper substrate with dried samples placed between the spacer plate, so that the samples align with the channels in the spacer plate, and an air impermeable membrane or plate. This plate in this configuration may be made of glass, metal, or polymeric material. By using a paper substrate, the ion signal from the analyte is stable and more reproducible. This is especially valuable with blood spotted on paper to show drugs, lipids, and even small proteins providing a quick method for blood spot analyses, as well as other biological materials such as urine. For example, MS/MS and IMS can be used to increase the specificity, sensitivity or add an additional separation dimension to an MS dimension. The number of samples which can be analyzed from a single sample plate, especially using filter paper substrate is flexible, typically ranging from 1 to 12. Continuous supply of sample spots can be envisioned (conveyer belt-like). Exposure of a single sample to vacuum and ionization, acquire a mass spectrum, and release the sample substrate requires as little as 5 sec in the current format. Eight or twelve samples may be spaced apart identical to linear rows of a 96-well microtiter plate. In this case, loading and removing the sample substrate requires 3 to 4 sec and each of the samples can be acquired every 4 sec by, e.g., vMAI, LA-vMAI, and less than 1 sec with vMALDI depending on the matrices or matrix combinations used (and with less volatile combinations a laser). Further, paper used with paper chromatography or thin layer chromatography (TLC) may be used and compounds in samples separated as is commonly done in paper chromatography or TLC. For this kind of analyses, a spacer plate with a grove therethrough is used. The groove must be configured to maintain the instrument vacuum in an operational range. Using TLC or paper chromatography, dirty or salty samples can be cleaned up without much effort and time before acquisition using vMAI. TLC plates with, for example, silica surface can also be used with this approach. Glass or plastic backed TLC plates may be used without the need of an air impermeable plate added separately. Likewise, backings for filter paper, such as a polymeric coating, can replace the need of a separate backing plate such as a glass microscope slide. Such a backing can be used to make the entire sample plate and backing disposable. Paper sample plates also allow bar codes for keeping track of samples, however, other sample supports can be used for the same purpose (e.g., glass, membranes). An important aspect of paper-based sample plates, besides providing smaller and more reproducible crystallization, is that they also provide a controlled limited flow of air over the sample. It is also an effective means to sampling surfaces by wiping over an area of concern, e.g., to investigate for fentanyl, and directly on-site as well as for collection/transport/shipping purposes to a more sophisticated lab for detailed high performance analyses (prescreening for samples worthy of detailed investigations) using the vacuum chamber assembly interfaced with a high-end high-performance instrument.

Selecting the paper and backing (e.g., polymer film) allows control of gas flow and crystallization, factors that have important consequences for reproducibility and quantification. Magnetic strips having a sticky side for adhering filter paper have also successfully been used as backing of filter paper. In addition, plastic having a sticky side and spaced holes can adhere to the filter paper and act as a spacer plate. In this case the paper sample substrate is sandwiches between two plastic sheets, preferentially stiff and clear. Polystyrene is good for this purpose because it lacks ionizable background. Such an arrangement may provide a sampling device for fit for purpose analyzer devices (e.g. illicit drug detection). Realistically, certain filter papers and membranes are made for best applications (see, e.g., Whatman product line) but in general filter papers have a wide range of applications as a sample holder in conjunction with this invention. Even printer paper can be used; good choices are materials that have gas flow and little chemical background when ionization occurs; if there is "too much gas flow", this can be limited by backing devices. In a few cases, it might be advisable to match the substrate used to hold the sample with a specific application, e.g., dilute nitric acid solvent may not be compatible with some filter papers. In any case, uranyl nitrate can be readily analyzed from glass plates using >2% nitric acid in acetone, water, or ethanol. Similarly, to obtain the highest sensitivity, reproducibility, and accuracy one can choose specific life science (e.g., protein) filter papers, although this is not necessary but an option for high end applications such as accurate mass detection/analyses of proteins by coupling gels (e.g., SDS-PAGE gels via, e.g., filter paper media) with MS of this invention. Any plate used to separate the sample from the flat face of the Port, is referred to herein as a spacer plate. The plate source is adaptable to. automation for, e.g., high throughput applications with e.g. barcodes as an option. In other words, there is significant flexibility to the user's specific needs.

With vMAI, the ionization event leading to gas phase analyte ions begins when the matrix:analyte sample, using a vMAI matrix, is exposed to sub-AP conditions. Alternatively, across the conduit of the multiPort vacuum chamber assembly there may be another Port through which a laser beam can pass and strike the sample applied using a plate source or probe source, in this case composed of a MALDI or LSI matrix and thus producing gas phase ions by reflection vacuum MALDI or LSI. In the MALDI mode the Port providing the laser beam can have an optical lens embedded in the Port to focus the beam on the matrix:analyte surface for ionization. Specific angles can be implements either through or relative to the Port. An aperture can be used without a lens element as long as the aperture is sufficiently small to not cause detriment to the vacuum, especially using fiber optics cable to transmit the laser beam. In this case a larger surface area is ablated using higher laser energy. In order to extend the area being sampled with both methods, a convenient means is to have the laser beam strike the sample surface off-center of the probe end allowing new surface to be accessed by simply rotating the probe, or with a plate, moving the plate. If the sample plate is made of material, such as a glass microscope slide which can transmit a laser beam, then transmission geometry laser ablation can be used in which frequently a single or a few laser shots are sufficient for good analyte ion abundance. In either case, the laser beam can be transmitted and focused using optical lens and mirrors where necessary, or using fiber optics. In either case, with sufficient laser power, ionization can also be accomplished without a matrix, as in laser desorption/ionization (LDI), or with a laserspray ionization (LSI) matrix. Any use of the plate source may be enhanced by gas flow or voltage. For example, simply placing a voltage, between about 20 V and 1000 V, and preferably between about 100 V and 600 V, on the sample plate or the spacer plate, if metal (positive for positive ions and negative for negative ions), increases the ion abundances observed. As examples, larger molecules, such as proteins, have increased ion abundances when voltage is placed on the substrate, or spacer plate, if metal, whereas with smaller molecules (e.g., drugs and molecular salts as examples, application of voltage can be used to cause in-source fragmentation, however the utility is somewhat limited to relative clean samples. For direct MS approaches, mass selected MS/MS is the better options to increase both the sensitivity and specificity of the analyses.

The multiPort vacuum chamber assembly may have means to provide focusing and/or ion extraction and/or repulsive fields to aid transfer of charged species into the ion optics of the analyzer device. Electrical feedthroughs for the ion optics may be permanently provided or by use of, e.g., a probe device, likewise, lens elements may be permanently mounted as part of the multiPort vacuum chamber assembly or in the case of providing repulsive or extraction fields, lens elements may be inserted by use of a probe device. Focusing lenses or ion guides as known to those practiced in the art may be used within the multiPort vacuum conduit, within the open Port interfacing the vacuum chamber conduit with the analyzer device, or just exterior to the vacuum chamber conduit in for example a Port channel, Typically, the most accessible Port will be used for the most used ionization method, and the most accessible Port is usually the one at the second end of the conduit directly opposite the entrance to the analyzer device. However, in some cases a Port is dependent on another Port for functionality. As an example, reflectron geometry vMALDI requires that a Port from which the laser beam is introduced is best positioned across from the vMALDI Port. Another advantage of this invention is that whatever configuration is selected, it can be easily adapted to another configuration if needs change. In addition by incorporating extra blank Ports, new configurations can be explored in the future.

The advantages of having mass spectrometers, ion mobility spectrometers, or combinations of these incorporate the multiPort vacuum chamber assembly is that the user has at their disposal, for relatively low costs, a wider variety of ionization methods and means of optimizing the analyses than is available with either API, inlet ionization, or vacuum ionization methods alone. For instruments purchased for a specific purpose, the multiPort arrangement more readily allows repurposing the instrument by selecting the most appropriate ionization source/sampling device/methods (approaches) for the new purpose whether API, inlet ionization or vacuum ionization, or all of them together or select combinations. Finally, the multiPort vacuum chamber of the current invention, provides the capability of using newer ionization technologies not currently available on commercial mass spectrometers. These include vMAI, MAI, SAI, VSAI, and vLSI providing ionization capabilities with exceptional sensitivity and simplicity for many compound classes. Simple, reliable, quick, and safe (avoiding exposure) operation for the professionals working with bodily fluids, trying to contain the problem (e.g., spill, forensic evidence), or trying to determine if uranyl nitrate or related compounds are present representing nuclear enrichment requires high sensitivity, specificity, reliability and accuracy, and prompt turnaround, enabled by this invention for this and other extremely important applications for which current approaches are more limited or fail. These requirements are fulfilled by this invention.

A summary of some of the advantages or the multiPort vacuum chamber assembly are: (1) The methods of this disclosure do not rely on an additional pumping stage in addition to pumping already available with API mass spectrometers, although someone trained in the art can readily retrofit such capabilities for certain configurations with expected higher pumping requirements; (2) The time required to expose a single sample to the sub-AP region of the mass spectrometer on a sample plate device is rapid, reducing the time from as much as minutes with some commercial systems which use vacuum locks, to as little as two to three seconds; (3) The disclosed inventions can be used to rapidly sequentially acquire mass spectra from different samples while manipulating from AP the substrate that holds the samples; (4) The device of the disclosed invention can be used with (retrofitted to) commonly available commercial mass spectrometers designed for API or with dedicated new mass spectrometer designs; (5) The disclosed systems and methods are robust in avoiding carryover and instrument contamination and the assembly is configured for easy access to cleaning without the necessity of venting the instrument; (6) The disclosed systems and methods are inherently simple and low cost; (7) The disclosed multitude of Ports assembly allows multi-mode vacuum ionization including matrix-based methods such as vMALDI, vMAI, and vLSI, as well as matrix-free methods such as LDI, as examples; (8) The multiPort assembly supports multi-mode ionization from AP including but not limited to APCI, APPI, ASAP, ESI, nanoESI, DESI, nanoDESI, MAI, MALDESI, MALDI, SAI and acoustic ionization methods as examples, without having to vent the instrument when switching between ionization-modes by as little as a software command; (9) In (v)MALDI and (v)LSI, laser ablation (LA), laser desorption/ionization (LDI) can be by transmission geometry where the laser beam ablates the sample from the backside of the sample (plate) for convenience, speed (even with, inexpensive low repetition lasers), and spatial resolution, or by reflection geometry laser alignment where ablation is frontside (on the side of gaseous ion/(charged) particle transmission) and potentially more readily assessable for in vivo applications and/or with weaker lasers (e.g., LA-SAI, LA-MAI).

Reflection geometry laser alignment is key for samples, conditions, and requirements where the laser cannot or should not have to penetrate through the sample support or the entire sample itself, e.g., metal, certain glass (wavelengths), thin layer chromatography plates, micro- and nanostructured surfaces, paper, filter paper, membranes, as a few examples other than in vivo applications such as skin cancer or other cancers such as breast, head, neck, prostate, uterus, or colon associated with surgeries in which high accuracy, precision, and nearly instantaneous feedback of results is of extreme advantage for improved patient outcome and mounting costs. In certain configurations (inlet ionization), remote sampling with and without the use of a laser (e.g., surface SAI, LA-SAI, LA-MAI) or other means of dislodging (e.g., by simple and safe extraction protocols) a sample into the sub-AP and ultimately into the inlet tube, preferably heated, which serves as a unique ion source as it ionizes "on the fly" molecules traversing this region from higher pressure to lower pressure. Adduction of metal cations for providing the charge to the compounds are induced with higher inlet tube temperatures using liquid matrices and with certain matrices (e.g., bronopol) the attachment of, e.g., sodium cation(s) is achieved also at low or no added heat (e.g., under vMAI conditions). 1,2-Dicyanobenzene matrix works well in ionizing molecules in the negative mode; associated voltages can well exceed >300 V. Selectable ionization sources, sampling devices, and methods are disclosed herein enabling the best choice(s) for deciphering the composition of a sample of interest or serving the many needs of multiple users on the same mass spectrometer in a time and cost-effective way as attractive benefits of this multiPort vacuum chamber assembly and its broad and in-depths applications at little additional cost time and expertise.

BRIEF DESCRIPTION OF THE VIEWS OF THE DRAWINGS

These and other features and advantages of the present systems will be more fully disclosed by the following detailed description of the preferred embodiments, which are to be considered together with the accompanying drawings wherein the numbers refer to like parts and features wherein:

FIG. 8 is a schematic representation depicting different spacer plate configurations and different sample assembly plates';

FIG. 9 is a photographic representation of multiport vacuum chamber assembly devices with 3-Ports and 4-Ports and with one Port based on a probe source device;

DETAILED DESCRIPTION OF THE INVENTION

This description of preferred embodiments is intended to be read in connection with the accompanying drawings, which are to be considered part of the entire written description. The drawings/figures are not necessarily to scale and certain features of the invention may be shown exaggerated in scale or in somewhat schematic form in the interest of clarity and conciseness. Terms concerning attachments, coupling, interface, and the like such as "connected", "interfaced", and "interconnected", refer to a relationship wherein structures are secured or attached to one another either directly or indirectly through intervening structures, as well as both movable and rigid attachments or relationships, unless expressly described otherwise. Unless otherwise defined, all technical and scientific terms used herein have the same meaning as commonly understood by one of ordinary skill in the art to which this invention belongs. Although methods and materials similar or equivalent to those described herein can be used in the practice or testing of the present invention, suitable methods and materials are described below. All publications, patent applications, patents, and other references mentioned herein are incorporated by reference in their entirety. In case of conflict, the present specification, including definitions, will control. In addition, the materials, methods, and examples are illustrative only and not intended to be limiting.

Unless otherwise stated, all percentages, parts, ratios, or the like are by weight. When an amount, concentration, or other value or parameter is given as either a range, preferred range, or a list of upper preferable values and lower preferable values, this is understood as specifically disclosing all ranges from any pair of any upper range limit or preferred value and any lower range limit or preferred value regardless of whether those ranges are explicitly disclosed.

Figure 1:
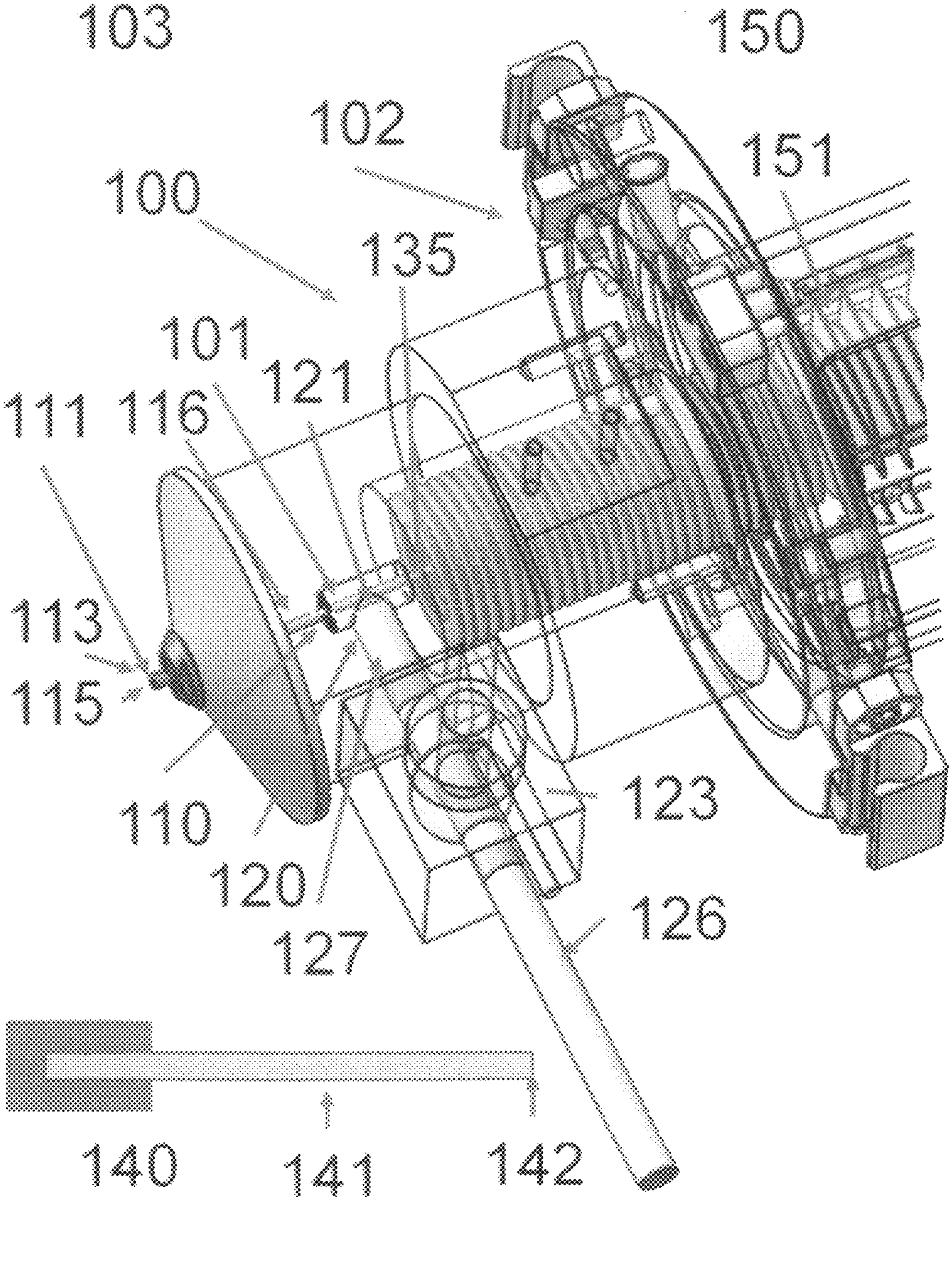
FIG. 1 is a schematic representation of multiport vacuum chamber assembly device with 3-Ports.

FIG. 1 is a graphic representation of one embodiment of a multiPort vacuum chamber assembly [100] having three Ports (3-Port) including [110], [120], each in fluid communication with the interior of a conduit [101] within [100], and one Port [135] in fluid communication with the sub-atmospheric pressure surrounding the ion optics [151] of the analyzer device [150]. Vacuum pumps are associated with the analyzer device creating the vacuum conditions of the entirety of the analyzer device [150] and of the multiPort vacuum chamber assembly [100]. No additional pumping capacity is needed with commonly used analyzer devices to incorporate the multiPort vacuum chamber assembly [100], although dedicated instruments are envisioned in which pumping may be altered. The 3-Port configuration displayed in FIG. 1 interfaces the multiPort vacuum chamber assembly [100] with the analyzer device [150] through flange [102], and maintain operating vacuum within [150]. There can be as few as 3-Ports or multiple Ports (multiPorts, n Ports, plurality of Ports) limited by physical constraints of relative sizes of the vacuum chamber conduit [101] and Ports and their respective ionization sources/methods, sampling, and auxiliary devices. For conciseness of this text, we focus on the description of 3- and 4-Ports to describe the innovation of the principal invention, rather than describing many possible (n) variations that can be placed on the various (n) Ports. As can be seen below, for each category of API, inlet ionization, vacuum ionization and auxiliary sources, sampling devices, and auxiliary device, at least one representative example is included.

Figure 2:
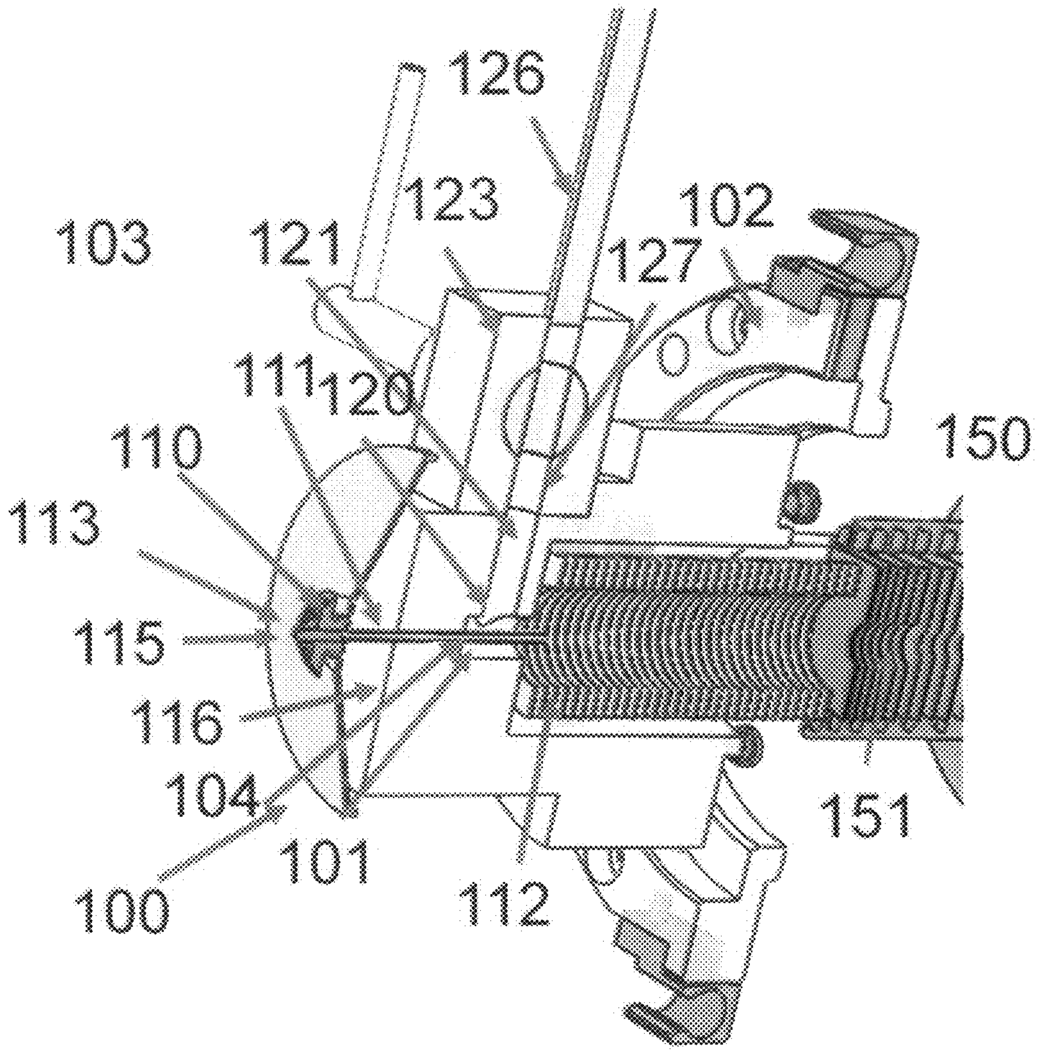
FIG. 2 is a more detailed schematic representation of FIG. 1.

The vacuum chamber assembly conduit [104] may have an interior [101] which may have the shape of a cylinder with one end providing fluid communication with the vacuum of the analyzer device [150], and the other end having a first Port [110] which may hold an inlet tube [113]. The conduit also has Port [120] which may serve as a means to introduce sample on a substrate into the sub-atmospheric pressure (sub-AP) existing in the conduit and the first tube [127] of [120] where ionization of the sample occurs. The Ports containing channel [111] and [121] provide fluid communication between [101] and a region of AP or near AP [103] on the exterior of the vacuum chamber assembly [100]. The Ports are configured to maintain operational and optimum pressure in [101] and analyzer device [150] through the use of gas flow restrictions as in [111] and valves [123] of [120], and additional Ports that may be interfaced with [101] to provide conditions that are synergistic with other Ports (gas flow, voltage, vacuum seal, collision, laser, and related means). Connected to Port [120] may be a ball valve [123] which in the closed position prevents gas flow from the higher pressure region [103] into the conduit [101] and when open provides fluid communication between the higher pressure region [103] and [101], which would vent the instrument unless the gas flow is blocked by inserting the probe rod [141] into connector [143] having ferrule or 'O' ring [144] shown in FIG. 4. The ball valve [123] may be automated so that the sample introduction occurs precisely into the same position and only allows the valve to be opened when the probe rod [141] is in position to be inserted, and likewise closed when the probe end [142] passes a certain point. When a probe device [140] with rod [141], typically made of metal, is inserted in a manner such that the rod [141] passes through an 'O' ring or ferule [144] within a connector fitting that is connected to the ball valve [123] to seal against gas (e.g., air) leaks from the high pressure region [103] to the vacuum conduit [101], the valve can be opened to allow insertion of the probe tip [142] into the Port [120] and into the sub-atmospheric pressure within [127] and [101]. When the ball valve [123] is in the open position, the rod [141] of probe [140]slides through the second tube [126] of [120] to a desired position. Once sealed, the ball valve can be opened without need of extra pumping capacity other than that available to the typical (e.g., commercial) mass spectrometer and related instruments. The end of rod [141] is generally flat (but does not need to be) and carries the sample through channel [121] of [127] and into or near the interior of [101]. A preferred arrangement is described in FIG. 5 that uses a plate source for vacuum ionization rather than the probe source. The plate source may also be placed in a different Port position so that in this configuration, the vacuum chamber assembly will be capable of accommodating plate and probe sources. In either configuration, the sample consisting of analyte(s) is mixed with a small molecule matrix compound prior to ionization, where the matrix has characteristics which promote formation of gas phase analyte ions either when ablated by a laser beam as in, e.g., MALDI (or LSI), or when exposed to sub-AP conditions as in vMAI, and where the matrix is in greater weight abundance than the sample. In the case of a vMAI matrix, ionization commences upon exposure to the vacuum without the requirement of energy input other than the energy naturally in the system and released to the sample when it is exposed to the vacuum, even if exposed to the vacuum at ambient temperature or below as described in patents by Trimpin, et al., FIG. 2 is a schematic representation of the three (3) Port vacuum chamber assembly device described in FIG. 1 presented for additional clarity. FIG. 2 is a schematic of a preferred arrangement of the 3-Port vacuum chamber assembly system interfaced through flange [102] to analyzer device [150] through the lens elements [151] of [150]. The first Port inlet tube [113] with inlet tube entrance [115] may be used for API sources/methods where ionization occurs at AP, as well as inlet ionization sources/methods where ionization occurs within channel [111] of [113]. A heater [116] is coupled to [113] to heat [113] and [111]. Port [120] supports vMAI and transmission geometry vacuum vMALDI, preferably when a plate source is installed as noted above. Heat is provided through resistive heating, or other means known to those practiced in the art and commonly used with API ('desolvation') and inlet ionization sources/methods. Tube [110] has a channel [111] linking AP or near AP [103] and the lower pressure of vacuum conduit [101], the channel having a sufficiently small inner diameter, typically, in the range of 0.1 to 1.5 mm, and more typically in the range of 0.4 to 0.9 mm to allow the analyzer device to operate at a desired sub-AP pressure ('vacuum'). Tube [113] of Port [110] may have multiple functions in the multiport vacuum chamber assembly device [100]. Tube [113] may be used to transfer ions, charged particles, or neutral particles from region [103] which is at or near AP into the vacuum region of the conduit [101] and analyzer device [150], similar to inlet tube sample introduction used with API sources of, e.g., Thermo Fisher mass spectrometer. Alternatively, a skimmer device can be used as is done with API sources of, e.g., Waters mass spectrometers. This allows the possibility to incorporate of a variety of ionization methods that occur at AP (API category) or operate from AP but ionization occurs under sub-AP (inlet ionization category) including AP-MALDI, electrospray ionization (ESI), MALDESI, sonic spray ionization (SSI), desorption ESI (DESI), direct analysis in real time (DART), atmospheric solids analysis probe (ASAP), laser ablation ESI (LAESI), AP chemical ionization (APCI), AP photoionization (APPI), and other methods familiar to those practiced in the art. With laserspray ionization (LSI), matrix-assisted ionization (MAI), solvent-assisted ionization (SAI), voltage (V) SAI, neutral particles enter the inlet tube and a charge separation process produces positive and negative charged matrix: analyte particles/droplets ('charged clusters' or 'charged particles') which desolvate to bare gaseous analyte ions. The process is aided by heat and pressure differential; voltages can be used and so can collisions, laser beams and other energy imparting devices. While a heated inlet tube can be used with inlet ionization, a skimmer cone arrangement used by some instrument manufacturers works rather poorly. The multiPort arrangement of this invention allows a second heated inlet tube to be incorporated so that one is optimized for one of the categories of API and the other well suited for the category of inlet ionization methods. The one Port not being used may be capped, or in certain circumstances, both may be capped with caps [112](with n Ports n caps can be envisioned). In this way, by simply capping one of the inlet tubes allows the other to be used in an optimized geometry. The multiPort vacuum chamber assembly becomes the first device capable of interfacing with an analyzer device such as a mass spectrometer and related instruments to give them nearly universal ionization capability.

Tube [113] with a restricted channel [111] can be used to retain the vacuum of the analyzer device while being open to [103] and used to supply a reactive gas (e.g., a gaseous composition that allows the molecules to react within the channel causing chemical alterations or aid fragmentation), supply a flow of gas (e.g., air, nitrogen, helium, argon) to aid transfer of ions, charged particles and neutral particles in, e.g., Port [120], and also aid sublimation of vMAI matrices which hastens the ionization of analyte for, e.g., more rapid analyses, or to hasten loss of matrix molecules ("desolvation", "declustering") from charged particles withing [101]. Alternatively, gas (e.g., reactive gas) can be employed to cause certain reactions. Additionally, with the configuration shown, a voltage may be placed on tube [113], provided [113] is not grounded, to repel ions and charged particles produced in Port [120] when they move into the conduit [101] of vacuum chamber conduit [104].

Figure 3:
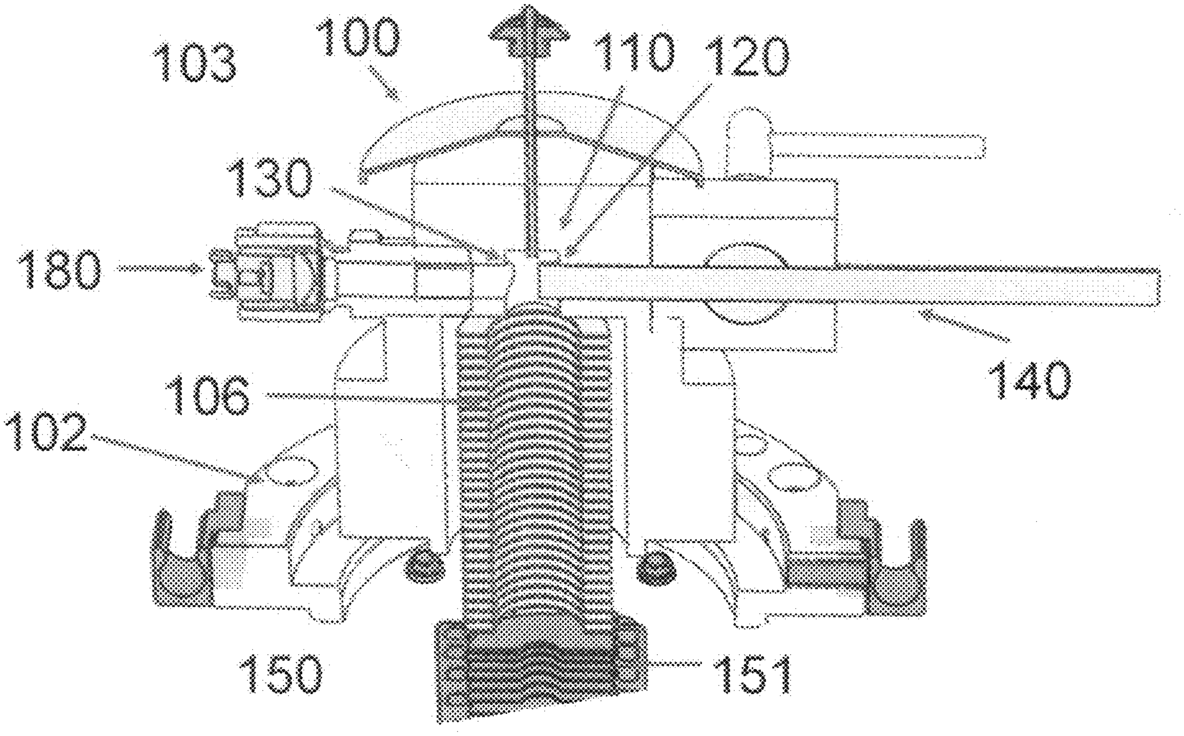
FIG. 3 is a schematic representation of multiport vacuum chamber assembly device with 4-Ports.

FIG. 3 is a schematic representation of another preferred embodiment of the multiPort vacuum chamber assembly device [100] as depicted in FIGS. 1 and 2, but with an additional Port [130] residing on the opposite side of the conduit [104] to Port [120]. Port [130], in the position shown, adds, e.g., additional analytical capabilities, and with, e.g., addition of a small gas flow through Port [130] the analyte ion abundance observed increases at the detector associated with the analyzer device [150]. By using Port [130], approximately 180 degrees across the conduit [104] from Port [120], a laser beam can be guided through Port [130] to impinge the sample on end [142] of rod [141] of probe device [140] inserted into Port [120]. A laser beam or other energy source may be guided by mirrors and optical lens elements attached to connector [180] through [130] to impinge a sample on a substrate introduced into [120]. Alternatively, fiber optics attached focusing connector [180] may be use for the same purpose. Using a MALDI matrix, vMALDI is provided at relatively low cost and ease of use. The laser beam as described here in reflection geometry may be transmitted using a quartz window in [180] used to seal Port [130] separating AP [103] from the low pressure in vacuum conduit [101] and the lens may also double as a focusing lens for the laser beam, or, preferably, fiber optics cable may be used to transmit the laser beam to the matrix: analyte sample held at sub-AP by placing the laser beam off-center so that it strikes the outer parameter of the probe tip. Probe [140] can be turned to expose new matrix:analyte sample to the laser beam in order to achieve optimum ionization through the MALDI process. Without use of a matrix, LDI can be achieved for small molecule analysis using this configuration. Thus, with Port [130] opposite Port [120] both vMAI and vMALDI can be readily achieved. Further, the gas flow through Port [110] aids transfer of ions produced by vacuum ionization using Ports [120] or [130] into the ion optics [151] of analyzer device [150]. Alternatively, other energy beams can be employed (e.g., commonly used in SIMS).

Additionally, Port [120] can be used to provide a small (regulated) gas flow that directly impinges the matrix: analyte sample on the tip of rod [121] of probe [140]. This gas flow increases the analyte ion abundance observed with vMAI and other methods and importantly allows good analyte ion abundance when the probe tip is at a distance from conduit [104], which is especially useful for the plate vacuum source described in FIG. 5. There is room in a ¼" inner diameter (ID) channel going into, e.g., Port [130] for transmission of a laser beam and addition of a gas flow provided the gas flow is through a fused-silica capillary tube. Typically, the gas flow tubing has an ID less than 0.2 mm. The gas flow can be one of directed or defuse, pulsed or continuous, and as discussed elsewhere.

Figure 4:
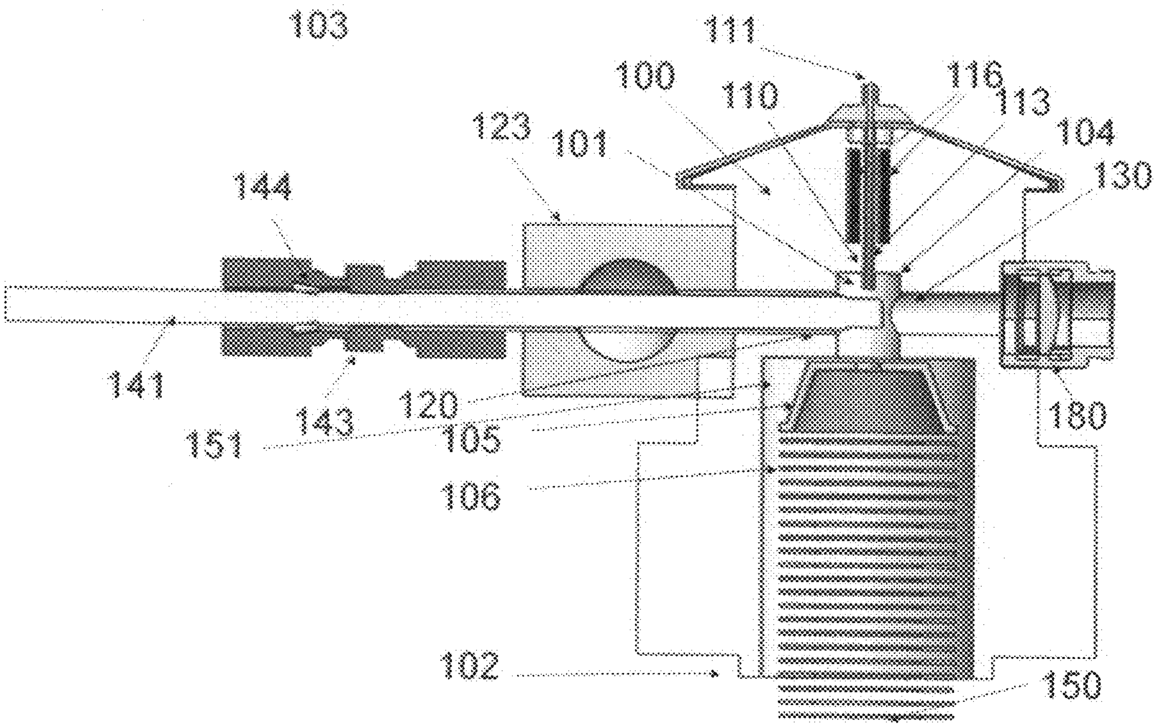
FIG. 4 is a more detailed schematic representation of FIG. 3.
Figure 6:
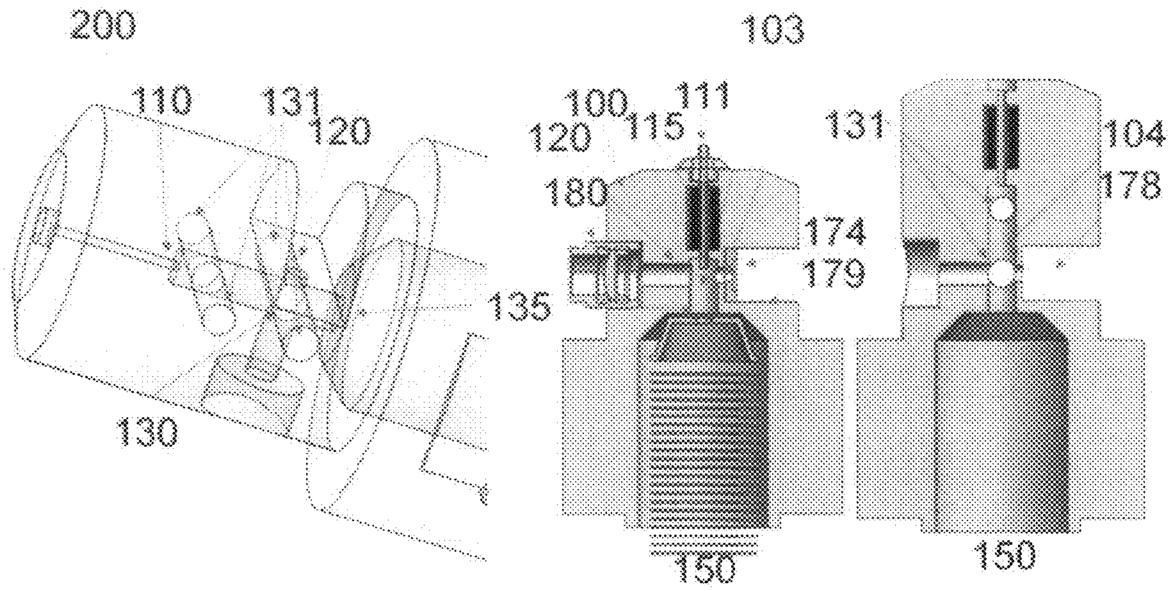
FIG. 6 is a schematic representation illustrating an example of an improved ionizing system based on 8-ports in comparison with a 4-port device.

FIG. 4, in more detail is a schematic representation of a preferred embodiment of the multiPort vacuum chamber assembly [100] shown in FIG. 3. However, relative to FIGS. 1 and 2, an additional Port [130] is added that is shown 180 degrees apart from Port [120], both of which intersect conduit [104], as shown at right angles to a line drawn through [104] and [151]. Other arrangements are also possible, as long as, for this representation, Ports [120] and [130] are in direct line of sight of one another, for the case where a laser beam or other energy source shall be used in reflection geometry, as is typical for commercial mass spectrometers. Anyone of API, inlet ionization, vacuum ionization and auxiliary source, sampling device, method, or other device can be used as long as the operational pressure of [150] is maintained. While with this representation, only four Ports (4-Port) are shown, others can be envisioned at, e.g., 90 degrees relative to Ports [120] and [130], or at other positions along the length of [104] as depicted in FIG. 6. It should be recognized that numerous arrangements of Ports can be envisioned with different numbers of Ports, relative dimension, angles to one another, and spaced along the conduit [104] of [100] at various distances and diameters. Besides introducing different ionization sources/methods, they may be used for measuring pressure within [101] of conduit [104] providing a camera, enabling gas flow, enabling electromagnetic radiation or other energy source into the conduit, providing radiative or conductive heat transfer within the conduit, enabling a physical obstruction, providing a means to block gas flow from one area of the conduit to another or provide a second laser (e.g., post-ionization and/or desolvation), among other functions and uses. The materials of construction may be polymeric materials, preferably heat tolerant such as polyetheretherketone (PEEK), or metal such as, but not limited to, stainless steel and aluminum. Further, the vacuum chamber does not need to be a cylindrical, but can be other shapes such as rectangular or rounded in shape. The relative shape may be, as an example, that of a folk with two or more channels in addition to the channel interfacing the conduit (base) with the Port docking to the analyzer device. Ports not in use can be sealed to preserve the vacuum of the system. This is illustrated with the end cap [112] for [115] of Port [110]. Alternatively, a probe device can be used to serve the function of a shutter to block the Port internally by insertion through the conduit [101] to achieve a restriction between higher pressure and the lower pressure of the analyzer device [150] when, e.g., a Port must be opened to AP for cleaning or exchange without venting the analyzer device. This is effectively achieved with two Ports substantially aligned in 180 degree (in line from each other). The probe device with some modifications or depending on the location within the conduit [101] can serve as a collision surface, application of voltages and heat to further enhance desolvation effects, among other functions and uses. As is known by the practitioner of the art, there are a number of other ways to achieve the same effects of converting charged clusters into gaseous ions or to remove them or neutral clusters. The capped extra Ports may then be available for future use at low cost and without need to purchase an additional multiPort vacuum chamber assembly device [100]. With an arrangement of a multitude of Ports, it also enables experimentation not possible on current mass spectrometers, such as application of voltages, multiple high energy light sources including lasers, and addition of various gases at different temperatures, as a few examples.

Figure 5:
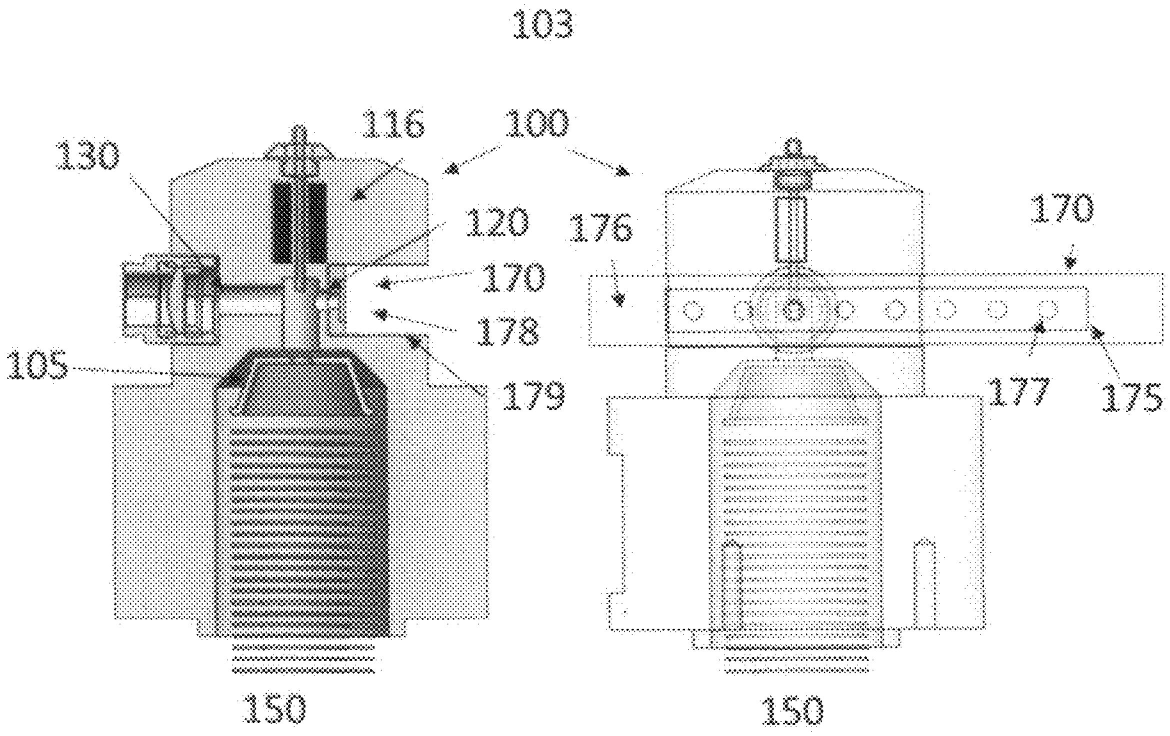
FIG. 5 is a schematic representation illustrating another example of an improved ionizing system showing two views of a 4-Port device.

Unlike in FIG. 1, a third Port [130] directly across, or in line of sight from Port [120] holding, e.g., a probe device adds additional functionality as is shown in FIGS. 4 and 5. Port [130] may be used to dock another source of choice, or transmit a laser beam from a laser located in the region of higher pressure [103] to impinge the sample which is placed on the end [142] of the probe device [140] in reflection geometry. Mirrors and lenses may be used to transfer a focused laser beam through Port [130] to impinge the sample on the probe tip [142] of probe [140] inserted into Port [120]. Fiber optics may also be used to guide the laser beam toward the sample. The fiber optic cable may be embedded into a probe device and inserted through a ball valve in Port [130] similar to the probe device [140] in Port [120]. If a MALDI matrix is used, ionization only occurs when a sufficiently energetic laser beam strikes and ablates the matrix:analyte sample. With MALDI, it is accepted that the laser beam is of a wavelength that is absorbed by the matrix being used. With vLSI, the same arrangement can be used to create multiply charged analyte ions by using a vLSI matrix. For small molecules, a sufficiently energetic laser pulse or inexpensive laser or other energy sources may be used to ablate the sample by, e.g., LDI producing gas phase ions. In addition, vMAI may be used without need of the laser. In addition to gas flow through Port [110], low gas flows through Ports [120] and [130] may be used to enhance transfer of gas phase ions and charged particles and neutral particles. vLSI can also be used with the probe to create multiply charged ions that extends the mass range of the mass spectrometer or related instrument, e.g., intact proteins can be analyzed/detected accurately and sensitively. Under certain vacuum ionization conditions typical for vMAI matrices (e.g., 3-NBN) and typical vLSI matrices (e.g., 2-nitrophloroglucinol, 2-NPG) can be made to produce singly charged ions, as shown below. In addition to gas flow (e.g., air, nitrogen, argon, or reactive gases), to some degree continuous or pulsed, through Ports [120] and [130] may be used to enhance both transfer of gas phase ions and charged particles and possibly neutral particles. Improving transmission of both gas phase ions and charged particles increases sensitivity of the experiment and in certain cases to a significant degree. Thus, with this multiPort arrangement, vacuum ionization methods of vMALDI, vMAI, and vLSI, as well as vLDI are made possible in addition to API sources/methods by use of, e.g., Port [110]. A laser may be used with vMAI, but the wavelength does not have to match the absorption of the matrix as long as heat is imparted to the sample directly or through the substrate it is deposited on to speed sublimation of the matrix and ionization of the analyte.

Just as Port [120] may be used for vMALDI, vLSI, or vMAI, the other Ports in a multiPort system may likewise have dual functions supporting each other synergistically and elevating the entire system to be greater than the sum of the individual parts. For example, Port [110] interfaced with an AP inlet tube [115](or other gas carrying extensions), that traditionally are configured to perform API or inlet ionization, may be used to supply gas to and through conduit [104] of the multiPort vacuum chamber assembly device [100] to direct ions and charged particles (and neutral particles) from the probe surface associated with Port [120] into optional extraction lens [105] and/or ion guide/focusing lens [106] of the multiPort vacuum chamber [100]. The sum of all gas flows must be adjusted to remain within the operational range of the analyzer device [150] and preferable at an optimum pressure for transfer and detection of gas phase analyte ions. A low voltage may be applied to inlet tube [113] in Port [110] to separate gaseous ions of opposite charge and repel gaseous ions of a desired charge into the ion optics, and to provide energetic collisions for charged particle loss of matrix (desolvation) and for analyte fragmentation when desired. Collisions of gaseous ions and charged particles with physical obstacles may also be employed to either enhance declustering and desolvation of charged particles and neutral particles or cause fragmentation of gaseous analyte ions. Likewise, extraction lens [105] may use voltages to attract gaseous ions and charged particles of opposite sign into the optional ion guide/focusing lens [106] of [100] and into [151] of analyzer device [150]. The attractive force is able to do all the aspects noted for the repulsive force. The two forces may be used simultaneously. Depending on the polarity, positively charged ions or negatively charged ions are detected at the detector associated with the analyzer device. The gas flow also aids sublimation of the vMAI matrix, thus enhancing the vMAI process of forming gaseous analyte ions. The gas flow can be controlled, allowing tuning for the highest analyte ion abundances. vLSI and vMALDI employ less volatile matrices so that the sublimation of the matrix and declustering of charged and neutral particles are more limited. Port [130] with the laser beam from laser [160] may in addition to transmitting a laser beam for reflection geometry laser ablation, also be used for gas flow directly towards the matrix:sample surface. With the proper design, Port [130] or [120] may be used to insert a probe [140] with a flexible end to allow conduit [104] to be sealed to gas flow from, e.g., the inlet tube [113] with channel [111] of Port [110] into the analyzer device [150]. Thus, in the multiPort design of this invention, each Port can have multiple uses, at least one of ionization source, method, sampling and auxiliary function, all readily accessible without venting the instrument or having to physically change hardware. A further distinct advantage of the multiPort design is that it may be made to interface with almost any API source/method of commercial analyzer devices in such a way as to insert [100] between the instruments API source and the analyzer device [150]. Inlet ionization sources/methods are also readily configured on such instruments. Additionally, at least some sub-AP vacuum ionization source/method operating with an intermediate pressure ionization source instruments can also be equipped with the multiPort front end to access API, inlet ionization, as well as vacuum ionization sources and respective sampling devices and methods on the same mass and/or ion mobility spectrometer and related instruments. Two of the same ionization sources/sampling devices/methods can be used on two different Ports to, e.g., improve measurements (quantification, mass accuracy, specificity, speed of analyses, sensitivity, as examples) or to minimize cleaning (avoiding switching between very different compound classes, e.g., polymer, drugs, proteomics versus lipidomics samples). Having two inlet tubes connected to [100] allows each to be used simultaneously or sequentially with automatic capping when momentarily not in use to improve throughput or for hyphenation with liquid chromatography or surface analyses devices without or with a laser. Remote sampling including imaging as well as portable applications are other applications also without or with a laser with or without the addition of a matrix (solid or liquid, or combinations) are enabled or improved through this invention.

A Port in certain configurations may be a "dock" and more precisely it can be a connector system that retains the vacuum within conduit [104] that is preferably created by the existing vacuum pump(s) of the analyzer device [150]. While the ionization sources and functionality (methods, sampling and auxiliary devices) associated with a Port or Ports may be regarded as permanent fixture(s)/choices, each Port may be used for different purposes as needs change, allowing flexible interchange even between API, inlet ionization, and vacuum ionization sources. This invention accomplishes this challenge because of conditions that enhance both gaseous analyte ion and charged particle transfer simultaneously minimize discrimination effects in current instrumentation. A key aspect of this invention is the supporting effect of Port(s) relative to each other's performance.

In FIG. 4, an optional extraction lens [105] and ion guide [106] may be used to more effectively transfer ions and charged particles produced in one or more Ports of the multiPort device into the ion optics [151] of the analyzer device [150]. Ion extraction lens and ion guides such as a hexapole ion guide or focusing lens such as an ion funnel may be used to aid gaseous ion/charged particle transfer in any of the multiPort configurations. Similar to FIG. 3, an AP inlet tube [115] which may be heated by heater [116] and may be used to provide one of a gas flow and a heated gas flow to enhance vacuum ionization sources/methods vMAI, vMALDI, vLDI, and vLSI, or for inlet ionization sources/methods of MAI, SAI, VSAI, and LSI, or for gaseous ion and charged particle transfer from API sources/methods including ESI, APCI, ASAP, DART, and DESI. Conductive or radiative heat transfer is commonly used, but other means are not excluded. The inlet tube is used for transferring gaseous ions, and desolvating charged particles produced by API sources/methods as well as for ionization which occurs in the sub-AP of an inlet (inlet ionization). Further, the inlet tube can be used to provide a flow of gas, typically air or nitrogen to aid matrix sublimation in vMAI, where the vMAI sample is introduced through a different Port directly to the vacuum of conduit [104], to enhance bare gaseous analyte ion production, or to aid transfer of gaseous analyte ions and charged particles into the ion optics [151] of analyzer device [150].

FIG. 5 is a schematic representation of another preferred embodiment of a 4-Port vacuum chamber assembly device [100] and is shown here with two different orientations (left and right schematic displays). For one Port, here as [120], instead of probe device [140] for vacuum ionization, plate assemblies [170] are used to expose multiple samples sequentially to the ionization region similar to a previous report in Pophristic (patent pending) which is solely based on a single inlet, as is typical in MS and related instruments. The invention herein described improves analytical utility through simplicity and flexibility of selecting traditional or newer sources/sampling devices, and methods such as the plate source as is described in more details below. A preferable number of samples applied to the sample plate assembly [170] are 8 or 12 samples based on the common 96 well microtiter plate format. Alternatively, analysis of a single sample per sample plate is another preferred format and based simplicity and use on portable analyzer devices by novice users as well as automation as in, e.g., point of care (POC) devices. In one embodiment of the ‘plate’ source, a Port [120] with a short channel [171] in fluid communication with the vacuum within conduit [104] of vacuum chamber [100] and a flat surface [172] of [100], which may have a flat plate covering [172] and having an opening [173], the opening [173] preferably >1.5 mm and <7 mm diameter, but slightly smaller or larger diameters are not excluded. Opening [173] is sealed from AP by a flat valve plate [174], thus covering channel [171]. When two flat plates, which may be made of a metal or a polymeric material are in contact, a seal is formed to restrict gas flow from the higher-pressure region [103] to the lower pressure within conduit [104]. The valve plate [174] may be part of a plate assembly [170] which contain a sample plate [175] and a spacer plate [176], or it may be a standalone disposable plate. The plate assembly [170] in this embodiment consists of a flat spacer plate [176] with multiple channels or a single groove [177] therethrough which may be covered by a flat sample plate holding matrix:analyte samples aligned to individually fit within the openings of the spacer plate channel(s). The flat sample plate may be any material or combination of materials (preferably porous to some degree) that preserve the vacuum of the analyzer device. Examples include but are not limited to microscope slides, metal plate, polymeric material (e.g., polystyrene), meshes, various filter paper including blood spot paper, materials such as paper that are chemically modified for certain applications, plastic films (preferably those that do not produce a significant degree of background ions) or other suitable sufficiently rigid material of larger than the diameter of the channels in the spacer plate or certain combinations of types and materials either serving as a sample holder or as the backing to limit the gas flow into the sub-AP of [101] and therewith [150]. The plate assembly can manually or be made to automatically slide over the flat face [172] of channel [171] to displace the valve plate [174] or another sample assembly plates [170], or use of other like means to exchange plates without venting the analyzer device. Flat edges on all plates allow one plate to replace another by abutting each other when over channel [171] with little introduction of gas (e.g., air) from AP to vacuum. By further sliding the sample assembly plate over channel [171] to the vacuum in conduit [104], samples on the sample plate [175] are sequentially exposed to vacuum initiating ionization by vMAI. Sample assembly plates [170] can rapidly be exchanged for other sample assembly plates allowing mass or ion mobility or related spectroscopy data to be acquired rapidly from multiple samples by sliding the [170] over opening [173]. A flat bottomed grove [178] with walls [179] may be used to guide the sample plate assembly [170] over opening [173] forcing the sample assembly plate to only move forward or backwards (x,y directions) in one plane. Ionization can be by vMAI using vMAI matrices known to those practiced in the art. All vMAI matrices sublime under the conditions of the experiment.

Alternatively, MALDI matrices can be used in conjunction with laser ablation to produce gaseous analyte ions by the MALDI process. Depending on the matrix, vLSI or no matrix, vLDI, may be performed. Port [130] may be used for features discussed above for the probe sample introduction, including passage of a laser beam. By using a glass or quartz sample plate such as a microscope slide, a laser beam may pass through the plate to strike the sample in so called transmission geometry. Thus, MALDI may be accomplished in transmission geometry as compared to reflection geometry, described above. At least parts of this assembly configuration can be automated and be further enhanced by robotics, as example. Certain gas flows from the same Port or adjacent (auxiliary) Port(s) can be used to improve the analyte ion abundance, speed of analyses, cleanliness of an experiment (no carryover), t name a few of the advantages enabled by invention [100].

The plate source does not need to be physically close to the vacuum conduit [104] for gaseous analyte ions and charged particles to reach conduit [104], but if at a distance, a low repulsive voltage or gas flow may be required or preferred to aid efficient gas phase ion and charged particle transfer. Alternatively, an extraction lens, such as [105] may be necessary to aid transfer of gaseous ions and charged particles into the vacuum of conduit [104]. It should be understood that ion transfer elements may also be incorporated such as a tube lens known to those practiced in the art, but may be less effective in transferring charged particles due to mass discrimination. Because gaseous ions and charged particles from any of the vacuum ionization sources/methods may enter the vacuum conduit [104] orthogonal to the direction between Port [110] and analyzer devices [150], gas flow and/or repulsive voltage from the inlet tube [113] and/or extraction voltage on the extraction lens [105] may be used to turn the gaseous ions/charged particles in the direction of the lens elements [151] leading to the mass or ion mobility analyzer device or related device [150]. It should be understood that with the plate source as with the probe source, other synergistic Ports may be incorporated and strategically employed to, for example, aid in desolvation of charged particles and thus improve ionization efficiency and sensitivity. Heater [116] may be used to heat the gas to aid this process. Ports and sampling devices/materials can also be used to aid this process. Some of the Ports may be made to be interchangeable, and others to be machined for purpose. Nevertheless, the simplicity of the design used here reduces the machining costs. As an example, for some applications, it may be desired to have the probe or plate source in the position shown in FIGS. 1-6. Alternatively, it may be desirable to have an AP inlet tube [113] in one of the positions [120] used for the probe or plate source, and the probe or plate source arranged in position [110]. This arrangement could be used when vMAI and transmission geometry vMALDI are the primary uses of the multiPort vacuum assembly device [100]. In this arrangement the primary extraction lens [105] will interact directly with the gaseous ions and charged particles emitted from the sample plate surface. API sources/methods would then be orthogonal to a line drawn between Port [110] and the analyzer device [150].

FIG. 6 has three schematic drawings depicting from left to right a 3-D representation of an 8-Port vacuum chamber assembly [200], a cross section of a 4-Port assembly, and a cross section depiction of an 8-port assembly shown in the 3-D depiction at the far left in this figure for comparison of a typical 4-Port and 8-Port system. The figure numbering is the same as used in FIGS. 1-6.

Figure 7:
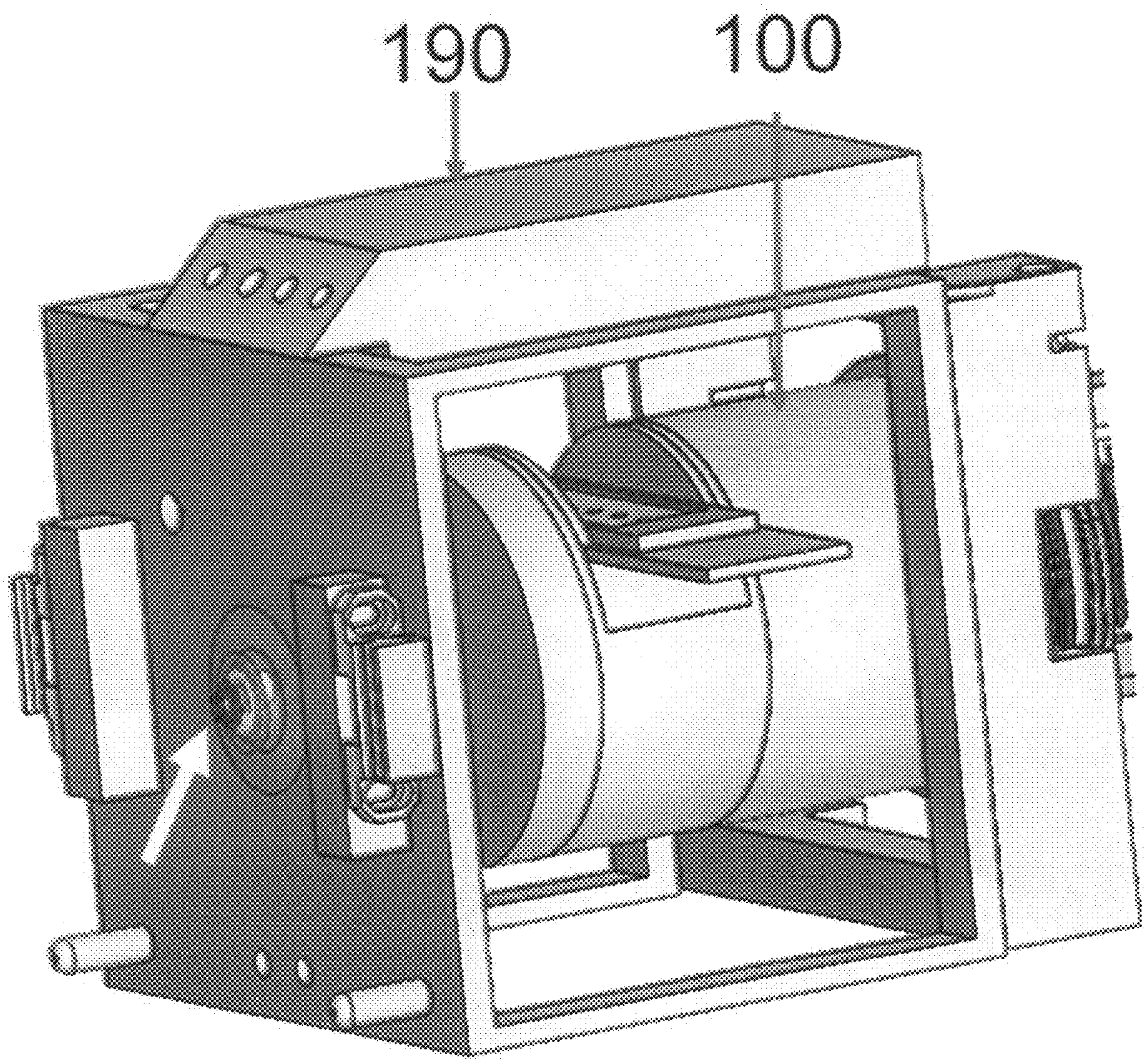
FIG. 7 is a schematic representation of a multPort vacuum assembly device within a housing.

FIG. 7 is yet another representation of a protype multiport vacuum chamber assembly [100] depicting a housing [190] capable of replacing the commercial source housing by attaching to the analyzer device in a similar fashion to the commercial source. The housing [190], at the end opposite the analyzer device, essentially duplicates the analyzer device's source connection for the commercial ionization source of a commercial analyzer device allowing the commercial source to be fitted to the vacuum chamber assembly [100].

FIG. 8 depicts one view of (A) different spacer plate configurations and two views of different sample assembly plate depictions used with the plate source, and also how the sample assembly plate including a spacer plate with discreet channels replaces a valve plate (right top) and (right bottom) use of a groove instead of discreet channels. The grove is useful for paper chromatography, TLC plates and electrophoresis gels in which proteins have been transferred to filter paper where discreet channels may miss some of the separated compounds. These depictions may be used with vMAI, vLSI or vMALDI but also ESI, SAI, VSAI, and are means and methods to control/regulate flow (gas and fluid or a combination of both) by, e.g., porous materials/substrates and certain configurations. FIG. 8 also depicts other sampling devices readily used with, e.g., (B) inlet ionization and more specifically SAI, and more specifically surface SAI with and without a laser; the laser can be arranged from various angles, can be hand held or and automated or used with robotics. Prompt analyses and imaging applications are two of the many applications enabled by this sampling device operational from a distance (remote). The composition of sampling devices may be various sizes, lengths, materials, and geometries. Importantly, the sampling device, source and method is configured with [100] to maintain the pressure to keep the analyzer [150] operational. The most readily available ionization source is that of inlet ionization and more specifically SAI and VSAI. Another more orderly sampling device and application is a LC system to clean up complex samples, whereas API (e.g., ESI, APCI) and inlet ionization (e.g., SAI, VSAI) sources and methods are used with at least one of the Ports of [100], so that the eluting composition after ionization is detected online. This means that the outlet of the LC can be positioned outside the inlet of the mass spectrometer, flush, or inside of the inlet. Different ionization methods may create different gaseous ions and therewith provide an improved understanding of the chemical composition of complex samples. Another common sampling system prior to MS is GC. For this, EI and CI are common vacuum ionization sources/methods, although AP/GC can also be configured.

FIG. 9 are photographs of prototypes of (A) 3-Port and (B) 4-Port vacuum chamber assembly devices installed on a Thermo Fisher Q-Exactive Fusion mass spectrometer both using a probe device. In (A) Port [110] is used for API and inlet ionization sources/methods, sampling and auxiliary devices and Port [120] for vMAI operation and auxiliary devices using a probe device [140] having an automated ball valve [123]. The photograph in (B) shows a third Port [130] with a tube allowing a flow of gas into the conduit [101] to enhance vMAI ionization of sample on probe end [142]. The numbering is the same as used in FIG. 1-7.

Figure 10:
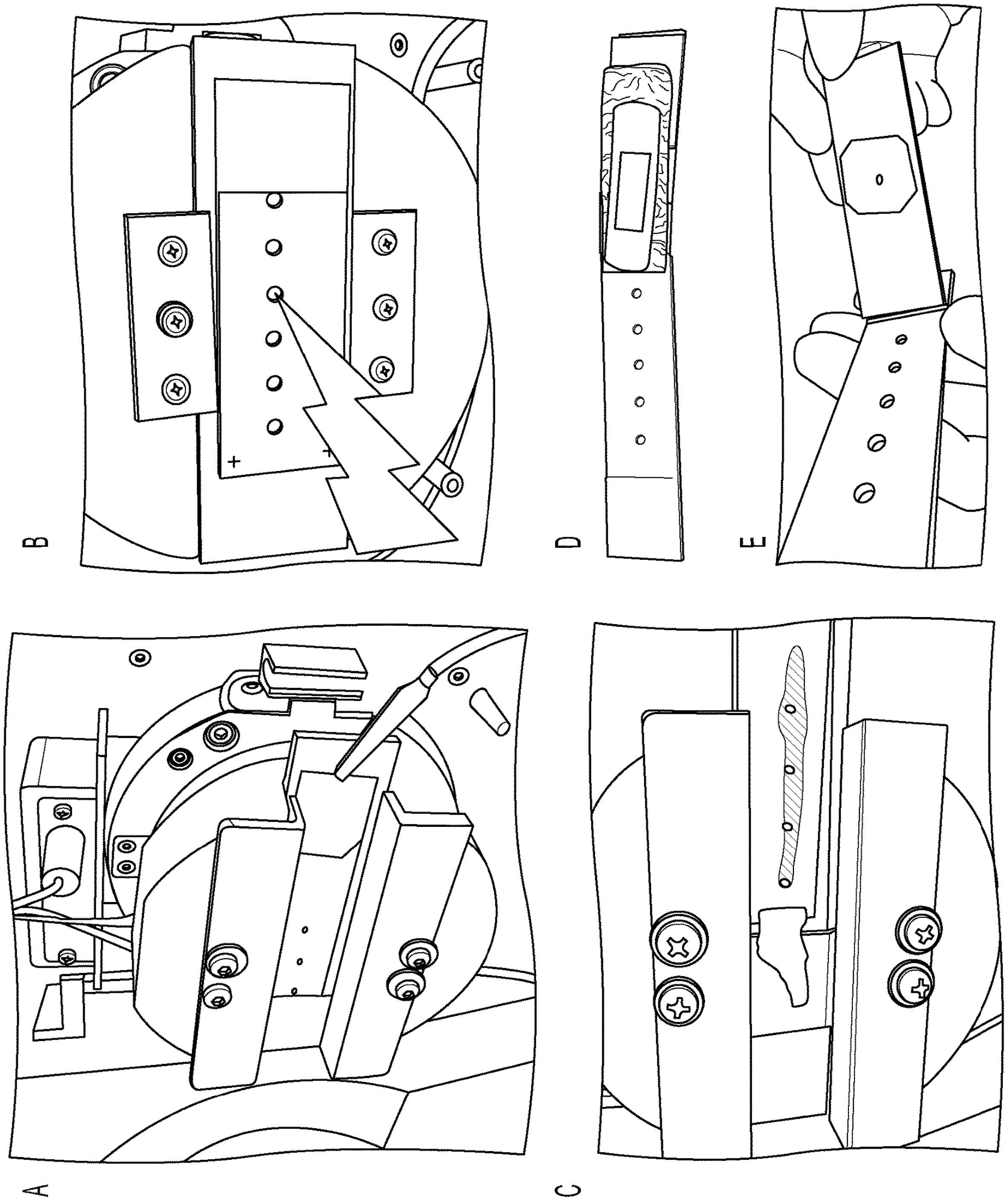
FIG. 10 is a photographic representation of multiport vacuum chamber assembly device with 3-Ports with one Port based on a plate source device.

FIG. 10 shows photographs of other version of configuration and use of a plate based vacuum ionization multiPort source (A,B,C) and various sample plate assemblies (D and E) and uses thereof, for example FIG. 10A for vMAI and 10B for vMALDI. These examples of ionization sources, methods, and sampling devices are based on a plate source introduction system directly from AP for applications with and without the use of a laser. (A) shows a modified version of the 3-Port systems shown in (B and C). In (A), shown by arrows, a tube for restricted gas flow has been added making it the first example of a 3-Port system. A groove is shown holding a spacer plate assembly to which a repulsive voltage is applied. Also visible is the spacer plate covered by a strip of filter paper with samples applied and covered by a glass microscope slide. (B) is an example depicting transmission geometry MALDI where a laser beam penetrates the microscope slide striking the backside of a sample applied directly focused onto the glass slide holding the sample (and facing [100]). (C) shows a sample assembly plate with filter paper that has been used to obtain a rough chromatographic separation of a dye. Adding a vMAI matrix in solution onto the filter paper allows mass spectra to be obtained on the components in the dye. (D and E) show examples of everyday objects from which mass spectra may be obtained by adding matrix solution to the area of interest and covering the object in a manner to prevent excessive gas flow into the analyzer device. In more details, FIG. 10 shows a representative example from the category of vacuum ionization and more specifically, vMAI. This example more specifically shows use of filter paper spotted with the matrix:analyte sample and placed between the spacer plate and in this case a glass microscope slide. Other flat plates such as metal or plastic may be used in place of the microscope slide. Samples are placed on the paper to align with the channels through the spacer plate. When a hole through the spacer plate covers the channel in the flange leading to the instrument vacuum, the sample residing over the spacer plate hole experiences the lower pressure and produces gaseous analyte ions. There are several advantages of this method of exposing samples to vacuum. One is stable and high analyte ion abundance which provides improved means of calibrating the mass spectrometer and quantification, and more.

Among other uses of this approach is analysis of biological fluids such as blood spots or whipping of potential chemical or biological or nuclear threads from surfaces of concern as exemplified below. The gas flow provided by an auxiliary Port and device is less of significance using flow permeable sample holders (substrates), e.g., filter paper, and may be especially beneficial for portable mass spectrometer applications as the vacuum may even be further preserved relative to auxiliary Ports gas flows. In such cases the condition of "auxiliary gas flow" is met within the same Port, ionization source, method, and sampling device. Thin layer chromatography (TLC) plates in which a dot from a permanent ink marker was separated. Either TLC plates that have glass or plastic backing can be used directly over the spacer plate without need of being sandwiched with a nonporous flat plate to maintain the instrument vacuum. A vMAI matrix solution is added to the TLC plate in areas of interest. However, a more useful approach is to use a spacer plate with a narrow slot typically 1 to 3 mm wide and 5 to 30 mm long. The vMAI matrix solution is added along where the slot exposed the TLC plate surface to vacuum. Moving the spacer plate so that the slot travels over the hole in the flange provides a chronogram (sometimes also referred to chromatogram) of the TLC separation. Spatial resolution similar to that achieved by TLC is possible. Again, good analyte ion abundance and a stable signal is observed. This grove type sampling device can be employed with any other separations such as paper and gel chromatography although in the later, additional steps may be necessary to be taken, e.g., transfer to a paper media for more readily accessibility of the intact proteins relative to that of inclusion in a gel media.

Figure 11:
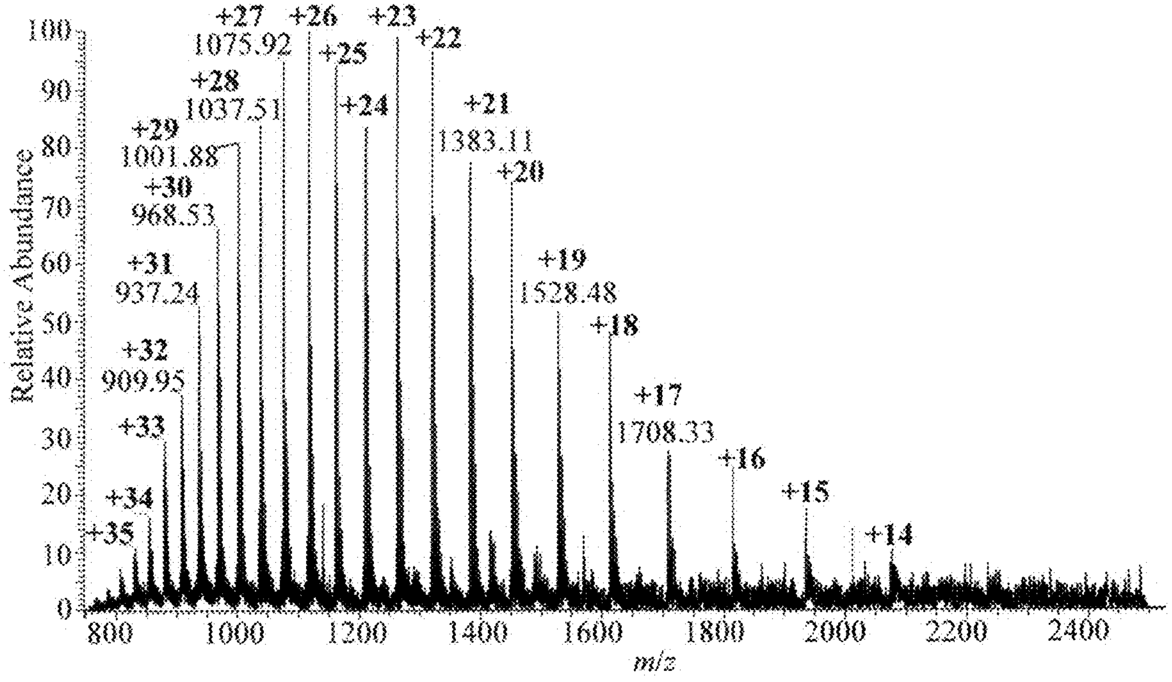
FIG. 11 illustrates a representative example from the category of API using the 4-port device in FIG. 9 and more specifically ESI source and methods and its use for protein analyses (MW~29 kDa)

FIG. 11 shows a representative example from the category of API and more specifically ESI source and methods. The ESI mass spectrum using the heated inlet tube of the prototype multiPort vacuum chamber assembly device shown in FIG. 9A. The ESI mass spectrum of a solution containing 10 pm $\mu L^{-1}$ of carbonic anhydrase, molecular weight (MW) 29,025 obtained on a Thermo Q-Exactive Focus mass spectrometer. The heater device was set at ca.~160 degree Celsius. The mass spectrum shows multiple charge states of the protonated and metal cationized molecular ion. Charge states from positive 14 to positive 35 are observed. Adducts can be in certain cases be suppressed through sample preparation or clean up.

Figure 12:
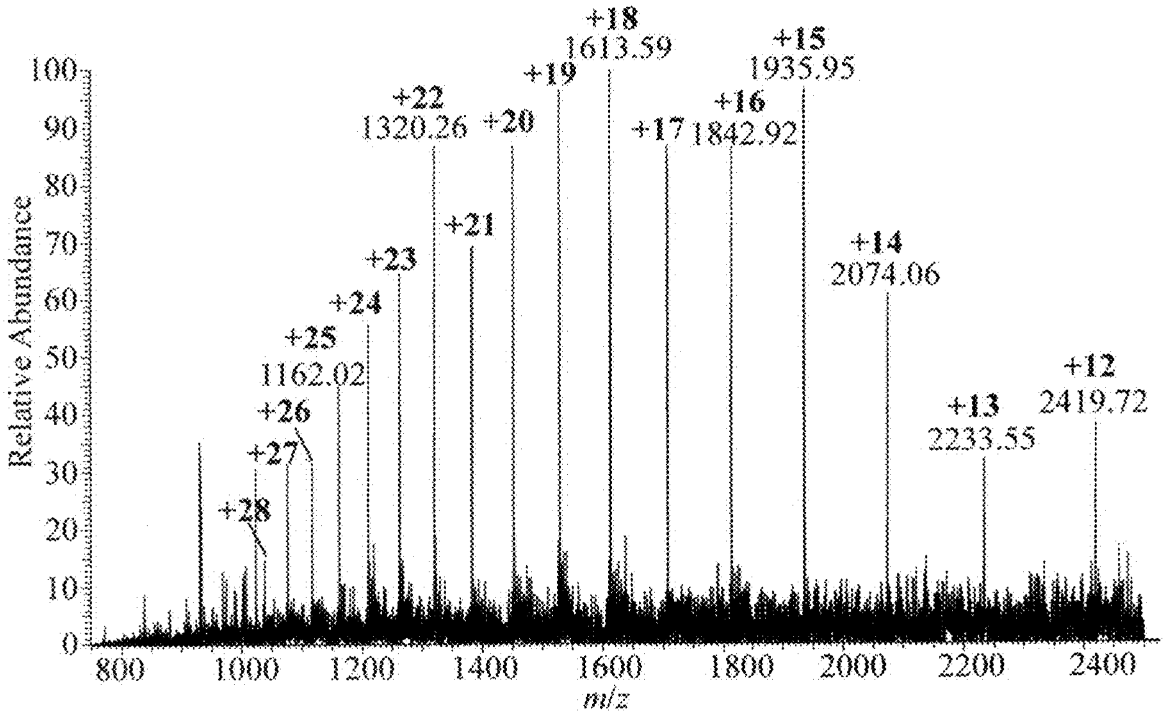
FIG. 12 illustrates a representative example from the category of vacuum ionization and more specifically, vMAI with a probe device shown in FIG. 9, and its use for protein analyses (MW~29 kDa)

FIG. 12 shows a representative example from the category of vacuum ionization and more specifically, vMAI. The vMAI mass spectrum of carbonic anhydrase obtained using the prototype multiPort vacuum ionization device shown in FIG. 9A. Unlike ESI which creates gas phase ions from this protein at AP (see example above), vMAI creates the gas phase ions directly from the tip of the probe device in the sub-AP region of the conduit within the vacuum chamber assembly device. Adduct ions are notably absent from most of the highly charge ions. Charge states ranging from positive 12 to 28 are detected.

Figure 13:
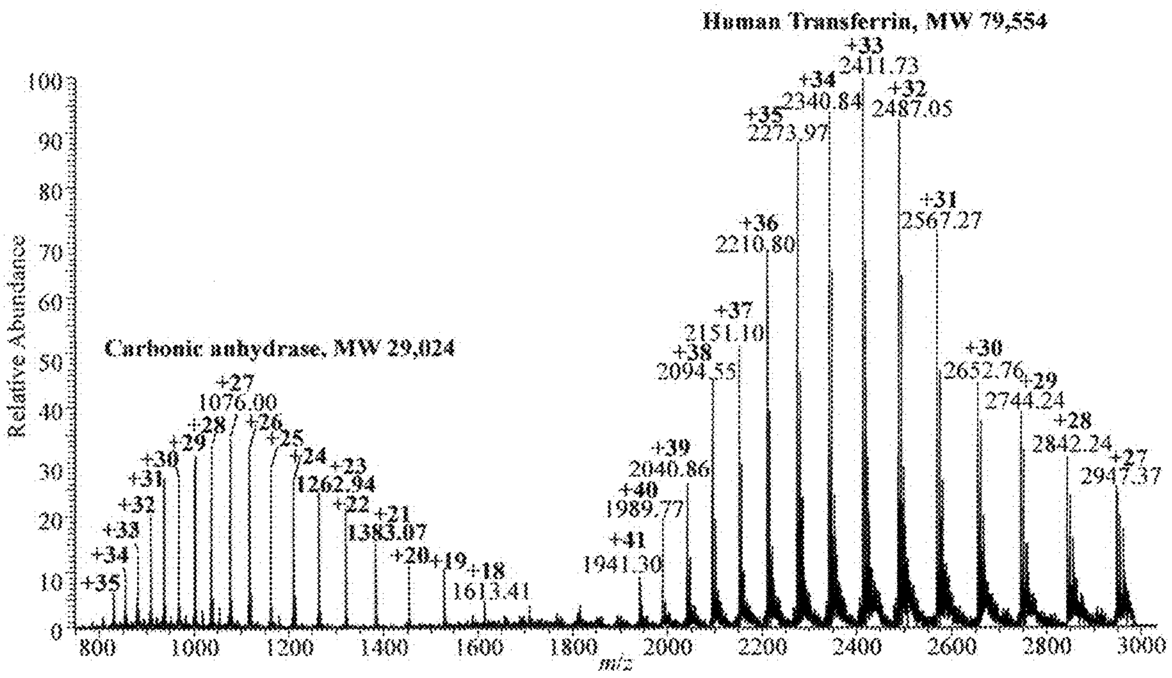
FIG. 13 illustrates a representative example of an ESI mass spectrum of two proteins with a MW~29 and ~80 kDa obtained using the prototype multiPort vacuum assembly device.

FIG. 13 shows a representative example of an ESI mass spectrum obtained using the prototype multiPort vacuum assembly device shown in FIG. 9B. The solution being analyzed contained 10 micromolar each of carbonic anhydrase (MW ca. 29,025) and human transferrin (MW ca. 79,550). The heater device was set at ca. 300 degree Celsius. The mass spectrum of this mixture using the commercial ESI source of the same mass spectrometer was very nearly identical, even in ion abundance, demonstrating the multiPort extension effectively transmits ions, and charged and neutral clusters (particles) through the multiPort vacuum assembly device [100] to the ion optics of the analyzer device. With ESI, $MH^+$, $MNa^+$, and $MK^+$ ions are observed, e.g., protonated aspartame at m/z 295. These adducts unnecessary complicate mass spectra and the interpretation of the signals. The vMAI probe source on the multiPort assembly device has not been optimized, but carbonic anhydrase was observed as demonstrated in FIG. 9B. Primarily MH+ ions are observed with very minor adduct formation with vMAI, a clear advantage. The molecular weights of these proteins can be readily determined using the multiPort device with vacuum ionization sources and method and with some more efforts and knowledge the results obtained with the API source and method are also interpreted.

Figure 14:
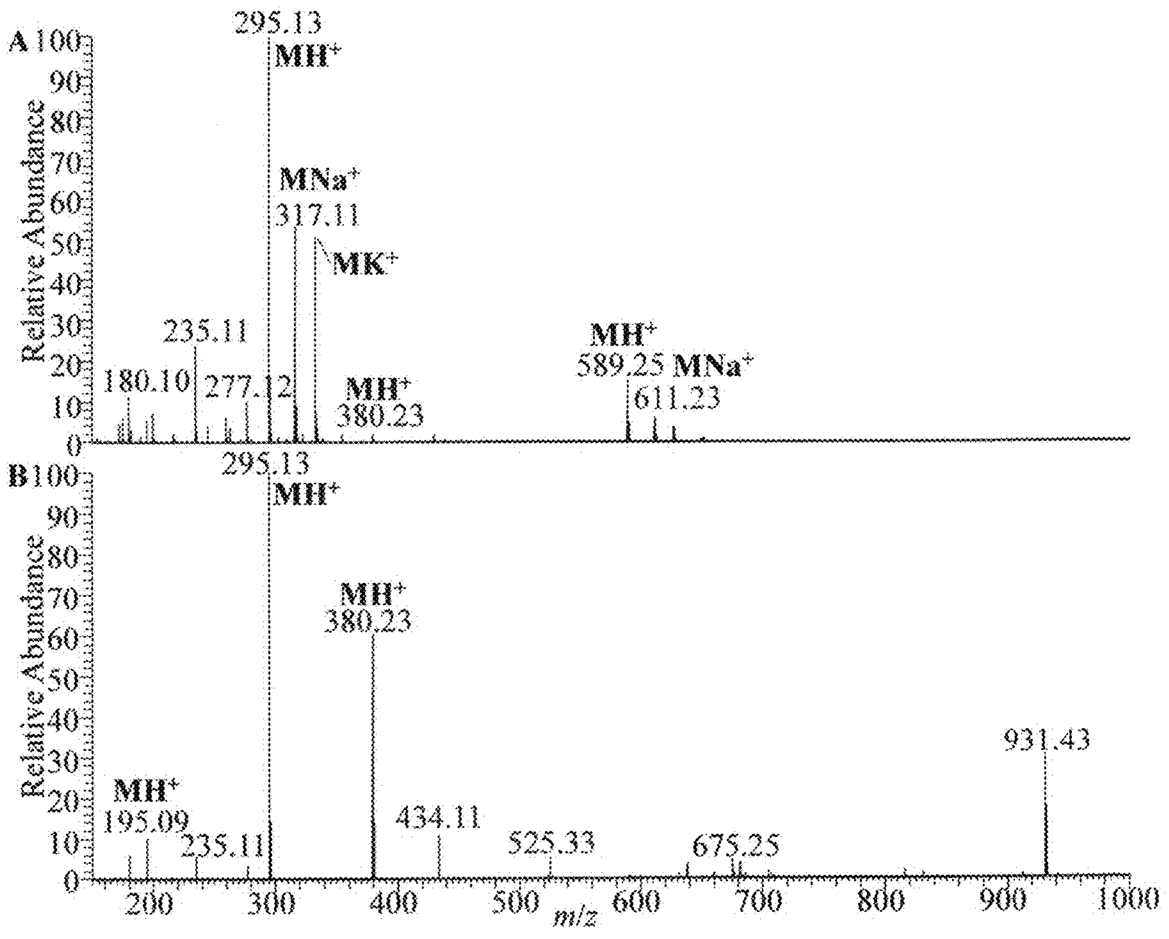
FIG. 14 illustrates a representative example from the category of API, more specifically ESI, and vacuum ionization, more specifically vMAI, using the prototype multiPort vacuum assembly device and its use in analyzing 1-propionyl-lysergic acid diethylamide (1P-LSD), an illicit drug.

FIG. 14 shows a representative example from the category of API and vacuum ionization using the prototype multiPort vacuum assembly device shown in FIG. 9B: (A) displays an ESI mass spectrum of diet coke (containing the artificial sweetener aspartame) spiked with a small quantity of a drug, here, 1-propionyl-lysergic acid diethylamide (1P-LSD) having MW 279 and providing an $MH^+$ ion of mass-to-charge (m/z) 380. As with all the API mass spectra obtained using the device of FIG. 9B, the inlet tube in Port [110] was heated to ca. 160 degree Celsius. Methanol (5%) was added to the solution to facilitate ESI sprayable conditions. (B) is a vMAI mass spectrum of the same solution using the vMAI matrix 3-nitrobenzonitrile (3-NBN) and probe introduction as shown in FIG. 9B with a gas flow being introduced through an API inlet tube in Port [110]. The complementary nature of the two ionization methods, ESI and vMAI, are readily apparent. For example, aspartame ($MH^+$ m/z 295), an artificial sweetener, is clearly ionized much better by ESI, but the 1P-LSD ($MH^+$ m/z 380) stands out better in the vMAI mass spectrum, hence, a more specific, ionization of the drug is observed using vMAI with 3-NBN as matrix. The device is advanced in numerous ways with hardware components being synergistic to each other providing results often in seconds of each other because they are physically present on the multiPort vacuum chamber assembly. A clear advantage of the vacuum ionization sources/methods is robustness to contamination when acquiring complex samples by a direct ionization approach (no prior separations and cleanup) and the gas flow provides stability of the instrument and improvements in sample ionization. The API and vacuum ionization methods were used seamless a few seconds apart from each other and the results are either complementary or reaffirming that using two or more sources and/or methods and obtained just in a few minutes or seconds apart from each other provide a deeper understanding of samples with little additional time, effort, or cost.

Figure 15:
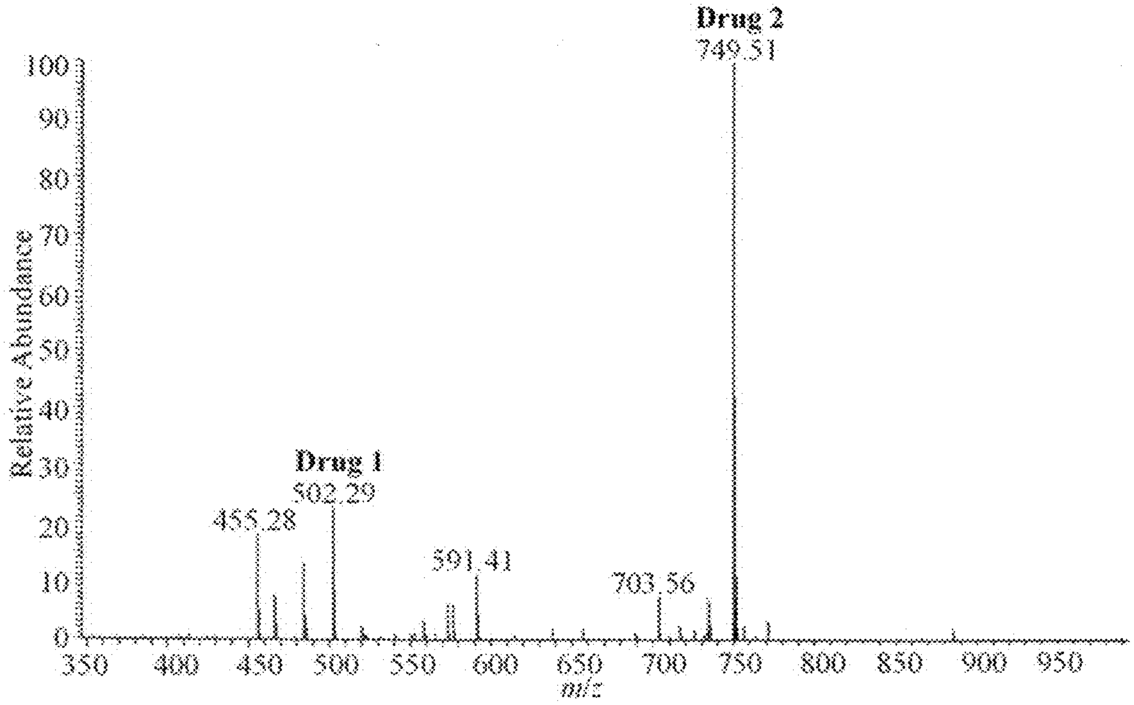
FIG. 15 illustrates a representative example from the category of vacuum ionization and more specifically vMALDI and its use for the analyses of two prescription drugs.

FIG. 15 shows a representative example from the category of vacuum ionization and more specifically vMALDI. Using the prototype multiPort vacuum assembly device shown in FIG. 10B: A mass spectrum of the drugs fexofenadine (m/z 502) and azithromycin (m/z 749) using a proof of principle multiPort vacuum chamber assembly schematically shown in FIG. 10B to obtain the transmission geometry MALDI spectrum using 2,5-DHAP as matrix on a Thermo Q-Exactive Focus mass spectrometer. The plate assembly containing a spacer plate with a glass microscope slide sample plate. Matrix:analyte sample applied to the microscope slide was ablated in transmission geometry to obtain this mass spectrum. The mas spectrum contains few background ions for a MALDI experiment. The API and vacuum ionization sources/methods were used a few seconds apart from each other. The unique concept and system of this invention provides a simple and relatively low-cost means of having multiple ionization methods, including those in which ionization occurs at AP such as ESI, APCI, AP-MALDI, ASAP, DART, DESI, LAESI, MALDESI, and others, as well as those in which ionization occurs directly in vacuum such as vMALDI, vMAI, vLSI, and vLDI. Gas flow is in particularly helpful with vacuum ionization.

Figure 16:
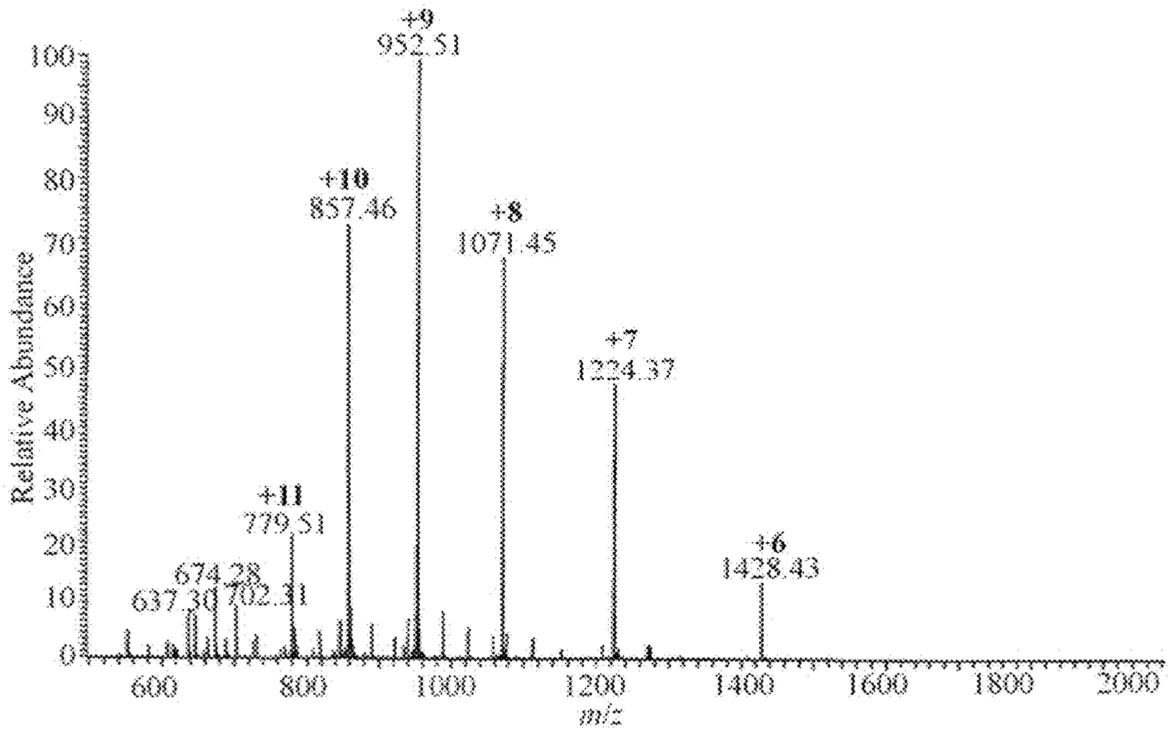
FIG. 16 illustrates a representative example from the category of vacuum ionization using the prototype multiPort vacuum assembly device and its use with filter paper for the analyses of a protein.

FIG. 16 shows a representative example from the category of vacuum ionization using the prototype multiPort vacuum assembly device (FIG. 10A). The mass spectrum is of the protein ubiquitin obtained using the proof of principle plate source and is the first example of the use of filter paper. The matrix used was a 3:1 binary mixture of 3-NBN and CHCA with 2.4 picomoles of ubiquitin in 1 microliter of the saturated matrix solution in 3:1 acetonitrile:water and applied to filter paper before acquisition.

Figure 17:
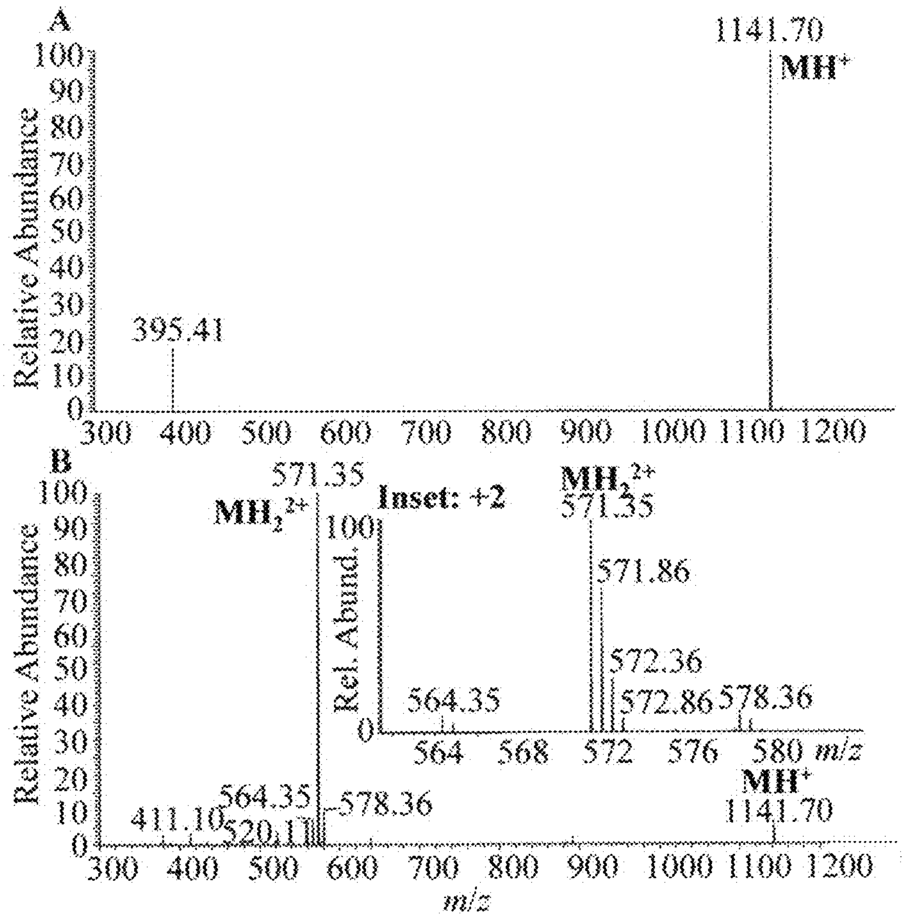
FIG. 17 illustrates a representative example from the category of vacuum ionization and more specifically vMAI using 3-NBN matrix and charge state switching of the analyte based on presence/absence of gas flow.

FIG. 17 shows a representative example from the category of vacuum ionization and more specifically vMAI mass spectra using the plate source introduction (FIG. 10A) of 0.4 picomoles of gramicidin S using NBN/CHCA as matrix mixture. (A) No gas and 400 V applied to spacer plate produces mostly singly charged ions. (B) With gas and 350 V providing mostly doubly charged ions and ca. 10× higher ion abundance than (A). Voltage on the plate with gas can be used to cause fragmentation.

Figure 18:
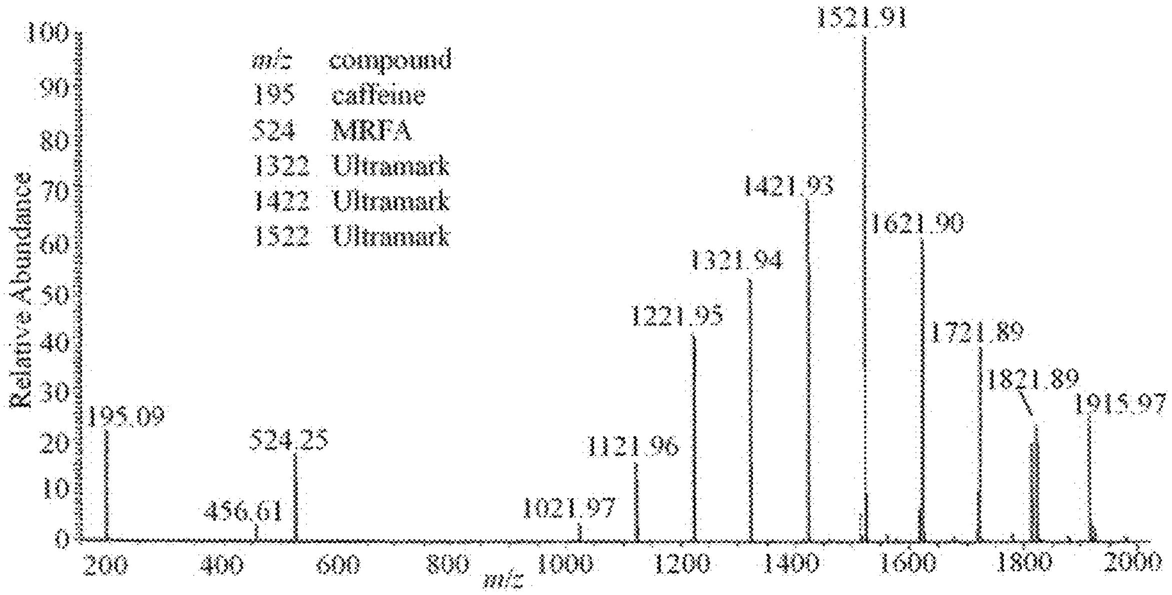
FIG. 18 illustrates a representative example from the category of API and more specifically ESI and its use for calibrating the Thermo Q-Exactive Focus mass spectrometer using the Thermo Cal mix.

FIG. 18 shows a representative example from the category of API and more specifically is the ESI mass spectrum of the Thermo Cal mix used to calibrate the Thermo Q-Exactive Focus mass spectrometer (FIG. 9B). The results of the calibration as is also seen by the quality of the mass spectrum is closely the same as the calibration mass spectra found on the homepage or user manual provided by Thermo for the Cal mix. ESI on the multiPort source/method is readily available and can be used to calibrate the mass spectrometer, although newer advances now allow the Q-Exactive Fusion mass spectrometer to be calibrated faster and easier using vMAI. Applications of ESI and therewith other APCI sources and methods are depicted in other embodiments of this text.

Figure 19:
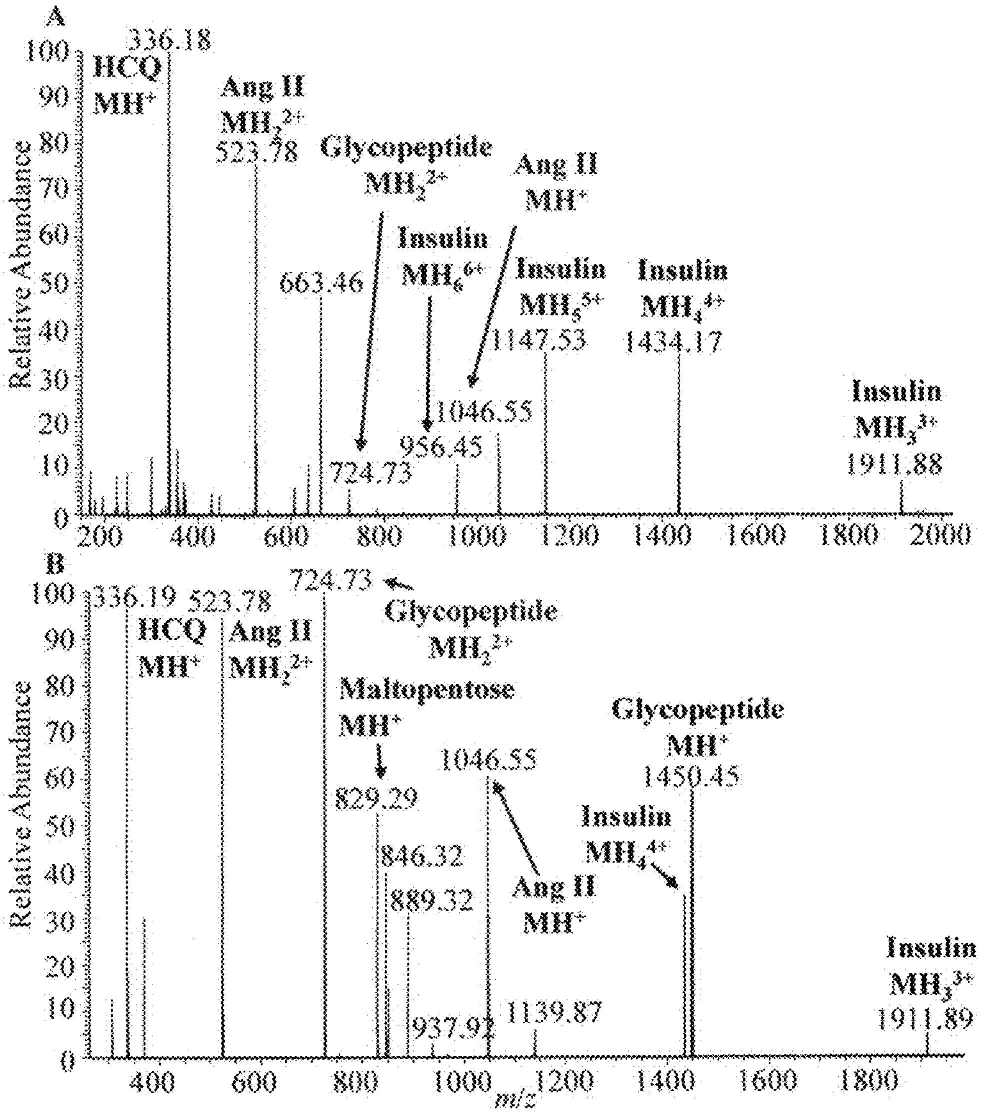
FIG. 19 illustrates a representative example from the category of inlet ionization and vacuum ionization and more specifically, SAI and vMAI, to analyze a mixture of 5 different compounds.

FIG. 19 shows a representative example from the category of inlet ionization and vacuum ionization and more specifically, SAI and vMAI (FIG. 10A). The SAI mass spectrum obtained with the multiPort source/method using a heated inlet tube in which fused-silica tubing has been inserted to a position of high analyte ion abundance. With an inlet tube present and capable of being heated, SAI and VSAI always an option without the need to do more than adjust the exit end of a fused-silica capillary tube (e.g., 100×220 microns) inside an inlet tube that is usually heated. With API including but not limited to ESI, APCI (e.g., DART, ASAP) these adjustments are made outside of the inlet tube (or, e.g., the skimmer) at AP and can be, e.g., 90 degree to the inlet entrance restriction to the sub-AP of the analyzer device. Passing solution through the fused-silica tube into the inlet tube using inlet ionization produces analyte ions in good abundance, in this case of the sugar glycopeptide is detected at m/z 1450 and double charged (+2) at m/z 724 by SAI which is more difficult with vMAI using 3-NBN as matrix and detected doubly charged at m/z 724. SAI was able to detect all compounds in the mixture, but vMAI "missed" 1 of 5. While this not a testimony of poor analytical performance of vMAI, it is included here to show the limitation of any one ionization source/method, as is the case with, e.g., ESI, APCI (including DART and ASAP), and MALDI. vMAI very effectively ionizes drugs, peptides and proteins, and even out of uncleaned complex materials such as tissue or whole blood, compounds that are hydrophilic, and compounds that are less or not hydrophilic vMAI may show difficulties or no detection as are the cases with the glycopeptide and the sugar (maltopentose) in this study. SAI, however, ionizes these compound classes very effectively and, as can be seen, SAI has a tendency, especially with higher inlet tube temperatures to also ionize by sodiation as is observed here. Contrary to many examples in literature, here the appropriate ionization source/sampling device/method is selectable and smoothly used (by as little as a mouse click) to "see" what is truly in a sample. Both positive and negative ions are produced by SAI, ESI, APCI, and vMAI. The methods described are simple, reliable, quick, and safe (avoiding exposure) for operation by personal trying to contain a problem is extremely important.

Figure 20:
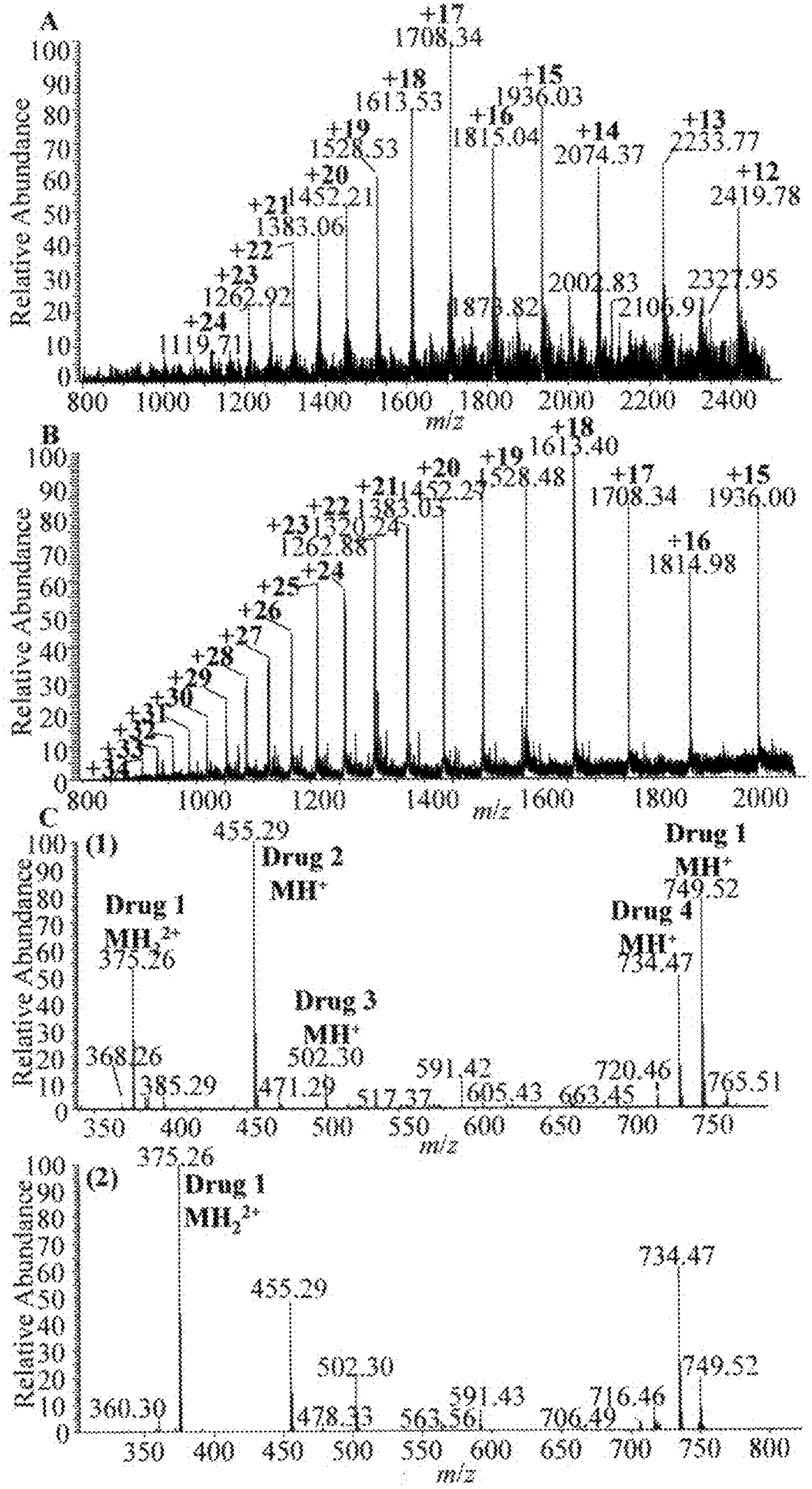
FIG. 20 illustrates representative mass spectra obtained on the multiport vacuum chamber assembly of small and large compounds by SAI and vMAI.

FIG. 20 shows representative mass spectra obtained on the multiport vacuum chamber assembly of small and large compounds by SAI and vMAI. Carbonic anhydrase (MW~29 kDa): (A) SAI 20 pmoles in MeOH:water with 1% propionic acid (B) vMAI 10 pmoles applied to probe tip (1 μL) and mixed on the probe tip with 1 μL of 3-NBN/CHCA (3:1) matrix solution, dried, and inserted into the vacuum chamber in quick succession (few seconds apart), (FIG. 9A). The position of the tip inside the vacuum region can be placed into a position with improved gas flow conditions and with the automated probe introduction into the same position increases the reproducibility of measurements because the sample resides in the same position within the conduit. Contrary with a plate source one does not enjoy this flexibility and adaptability of sample positioning, and instead (guided) gas flow and voltage support these needs, provided either from obtained from the same Port or adjacent Ports. (C) vMAI of a 1 pmol drug mixture (Drug 1 azithromycin, Drug 2 verapamil, Drug 3 fexofenadine, Drug 4 erythromycin) in 100% DMSO, which is considered a difficult sample solvent in traditional MS, however, frequently used in pharma drug development because of its excellent properties. This sample (1 μL) was added in solution to 3-NBN matrix solution (1 μL) and dried before insertion into the vacuum of the mass spectrometer. Data acquired on (1) the 3-Port (FIG. 9A) and (2) the 4-Port vacuum chamber assembly device with the probe source (FIG. 9B) and, in case of (2), with a second added gas flow (fourth Port) using Thermo Q-Exactive Focus instrument. Charge states are assigned. The multiply charged ions can be viewed as a result of effective desolvation of charged particles to give the gaseous analyte ions.

Figure 21:
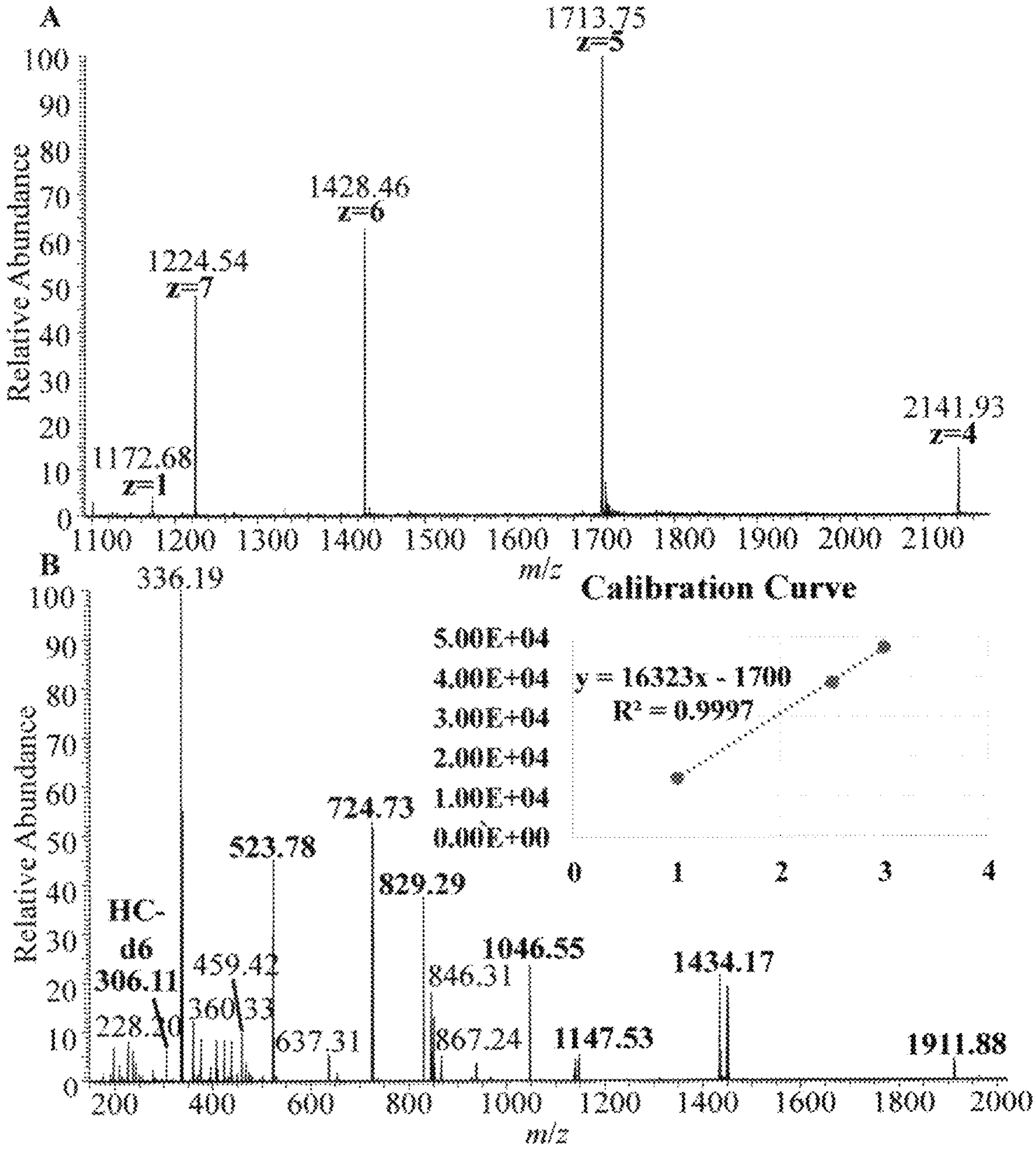
FIG. 21 illustrates SAI mass spectra acquired using 3- and 4-Port vacuum chamber assembly analyzing protein and drugs including quantification.

FIG. 21. SAI mass spectra acquired using 3- and 4-Port vacuum chamber assembly (FIG. 9). (A) Is mass spectrum of 100 fmol of ubiquitin in methanol:water consumed during analysis showing sensitivity of the method and 3-Port source. (B) Quantitation of hydrocodone spiked into a mixture (hydroxychloroquine, angiotensin II, vancomycin, maltopentose, bovine insulin) using hydrocodone-d6 as an internal standard. Inset shows calibration curve. Data acquired on 4-Port source with the additional port used for directed gas flow on Thermo Q-Exactive Focus instrument.

Figure 22:
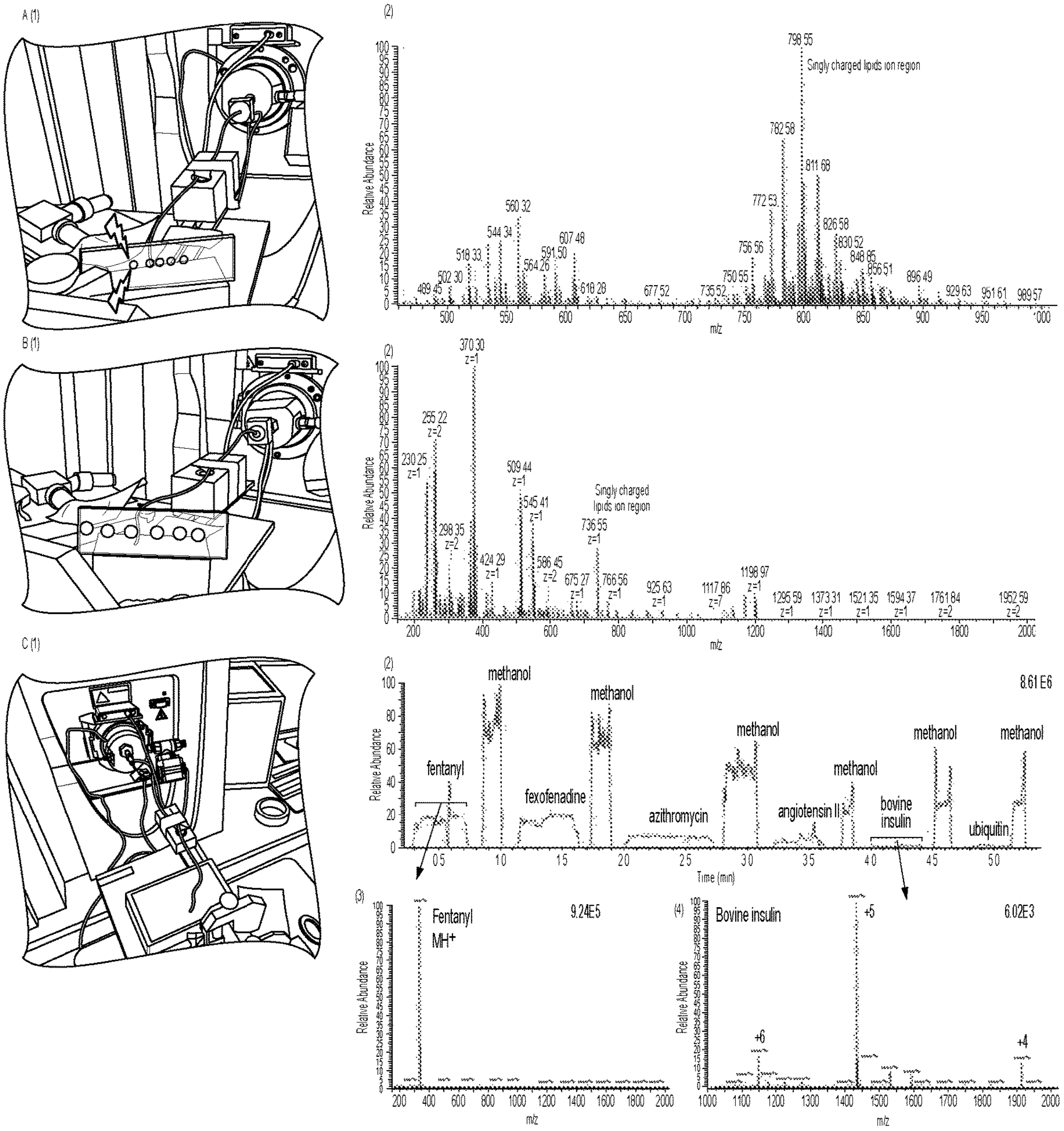
FIG. 22 illustrates an experimental setups for analyses using a liquid junction for tissue and blood spot as well as sampling of solution content contained in well plates, here 96.

FIG. 22 showing (A1, B1, C1) experimental setups for remote sampling using SAI interfaced to the 4-Port vacuum chamber assembly (FIG. 9B). Inlet ionization by SAI with the sampling device configured so that the vacuum of the analyzer device draws the liquid (solvent/matrix) into the inlet tube of the mass spectrometer where ionization commences on the fly by inlet ionization conditions. Liquid junction (A) tissue on glass slide, and (B) blood spot analyses using MeOH as matrix. (1) photographs and (2) mass spectra acquired from remote surface. (C) Sample in solution drawn from well plates, here 96: (1) photograph of setup, (2) total ion chronogram (3) mass spectra of fentanyl, (4) bovine insulin. A laser can be used as is shown here in reflection or transmission geometry and can provide improved spatial resolution measurements; reflection geometry is applicable with in vivo measurements. Inclusion of aqueous and acidic conditions into the transfer line helps with the detection of peptides and proteins in the positive mode.

Figure 23:
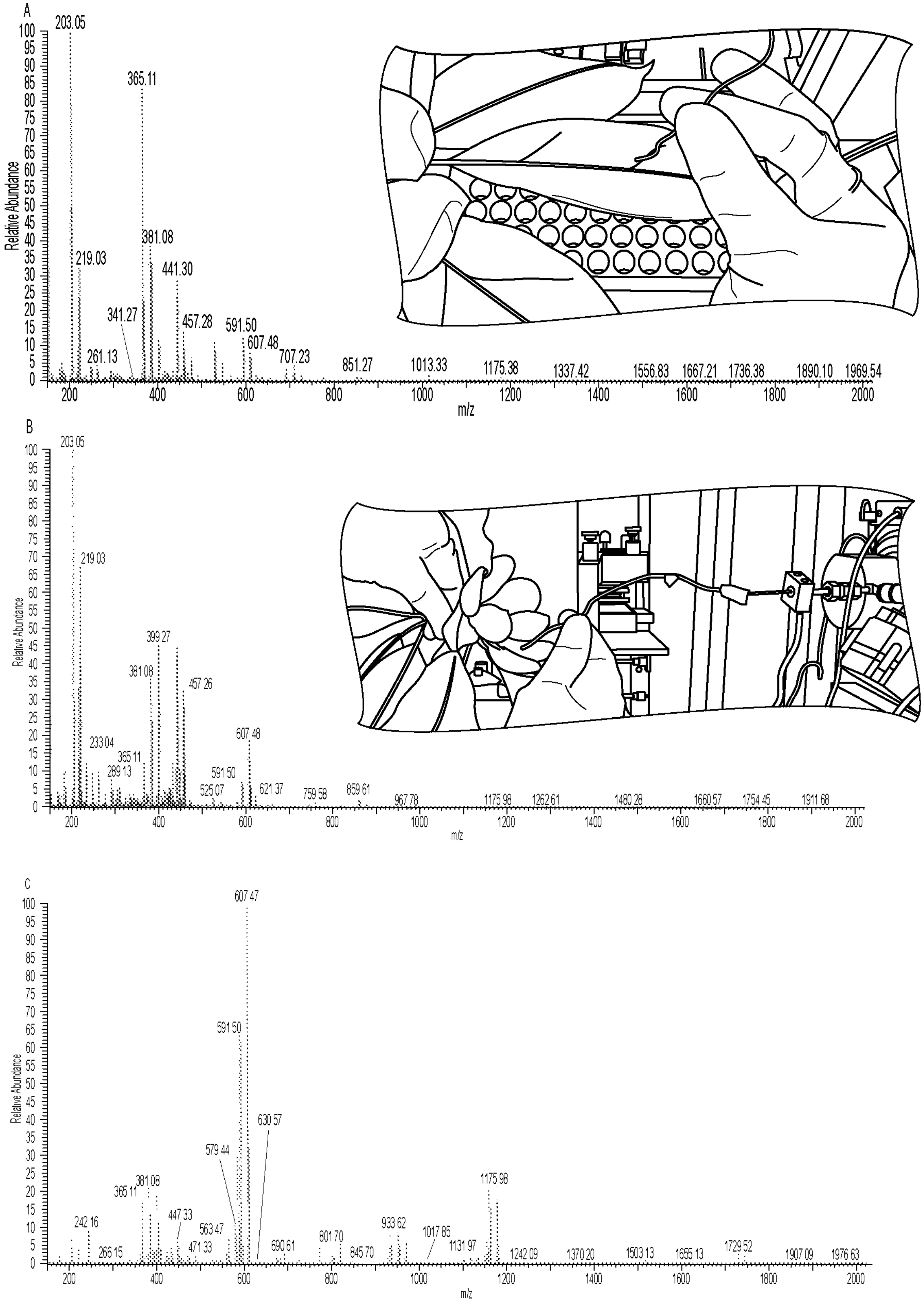
FIG. 23 illustrates an experimental setups for remote sampling using SAI interfaced to the 4-Port vacuum chamber assembly analyzing portions of a flower.

FIG. 23 shows examples of remote sampling in a distance and online analyses of a surface such as flower components using SAI of (A) leaf, (B) fresh flower and (C) dry (old) flower. Methanol (5 L) was added (30 sec) before being 'sucked' (drawn by the vacuum pull created by, e.g., [150]) through the extended fused-silica tube into the inlet tube (FIG. 9B). Photos of the samples provided for illustration purposes. SAI based on extraction of chemicals (sample composition) from surfaces provides quick and easy assessment. With methanol as solvent (matrix) the inlet tube may not need to be heated. Surface SAI may be implemented at a distance (remote) with and without a laser. Sampling options are wide ranging (with, without a laser, in reflection or transmission geometry laser alignment, no matrices purposefully added and various matrices purposefully added (e.g., solids, liquids, and combinations), etc.). The n Ports of the multiport vacuum chamber assembly device are in full support of best/most effective ionization on the fly by appropriate pressure differential, voltages, heat, and collision surfaces. It also overcomes or at least reduces contamination and carryover issues that have been encountered with inlet ionization in the past. The Surface Reader device has been used for this particular aspect of this invention. This example is a stand in for various sampling devices/methods to be used with ionization on the fly.

Figure 24:
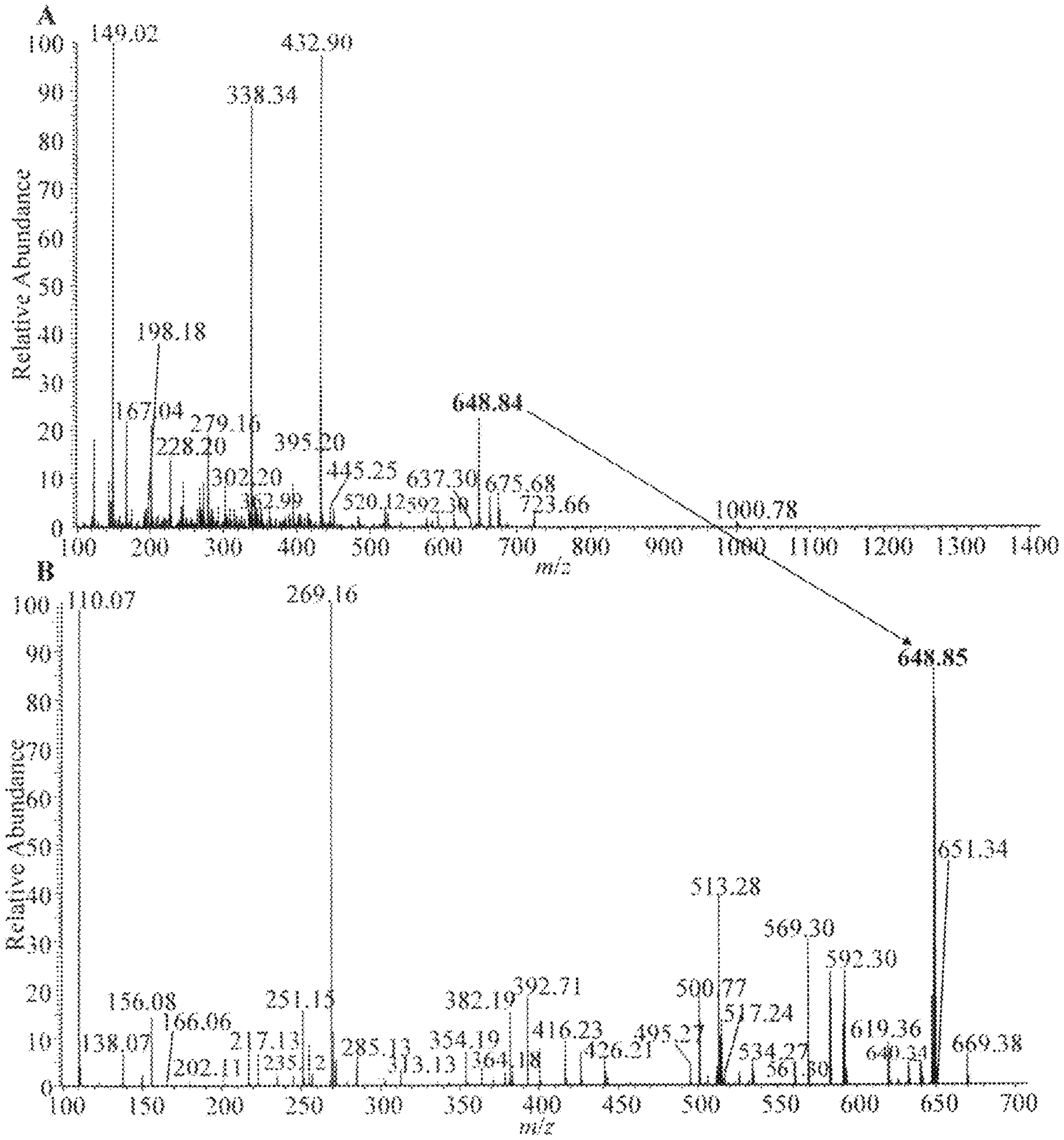
FIG. 24 illustrates MS and MS/MS of a peptide contained in synthetic urine.

FIG. 24 demonstrates that additional information about an analyte (sample composition) is extractable by using advanced functions and methods available with an analyzer device used. Conventional methods such as MS/MS of peptides and small proteins are available on the Q-Exactive Focus mass spectrometer (FIG. 10A) used here. (A) MS and (B) mass selected MS/MS (HCD 25 V) of charge state+2 of angiotensin I in synthetic urine. Such measurements depend on the capabilities of the analyzer device and not on the ionization source, sampling device or method selected. As shown here, the invention [100] can use advanced functions/methods developed for commercial analyzer devices.

Figure 25:
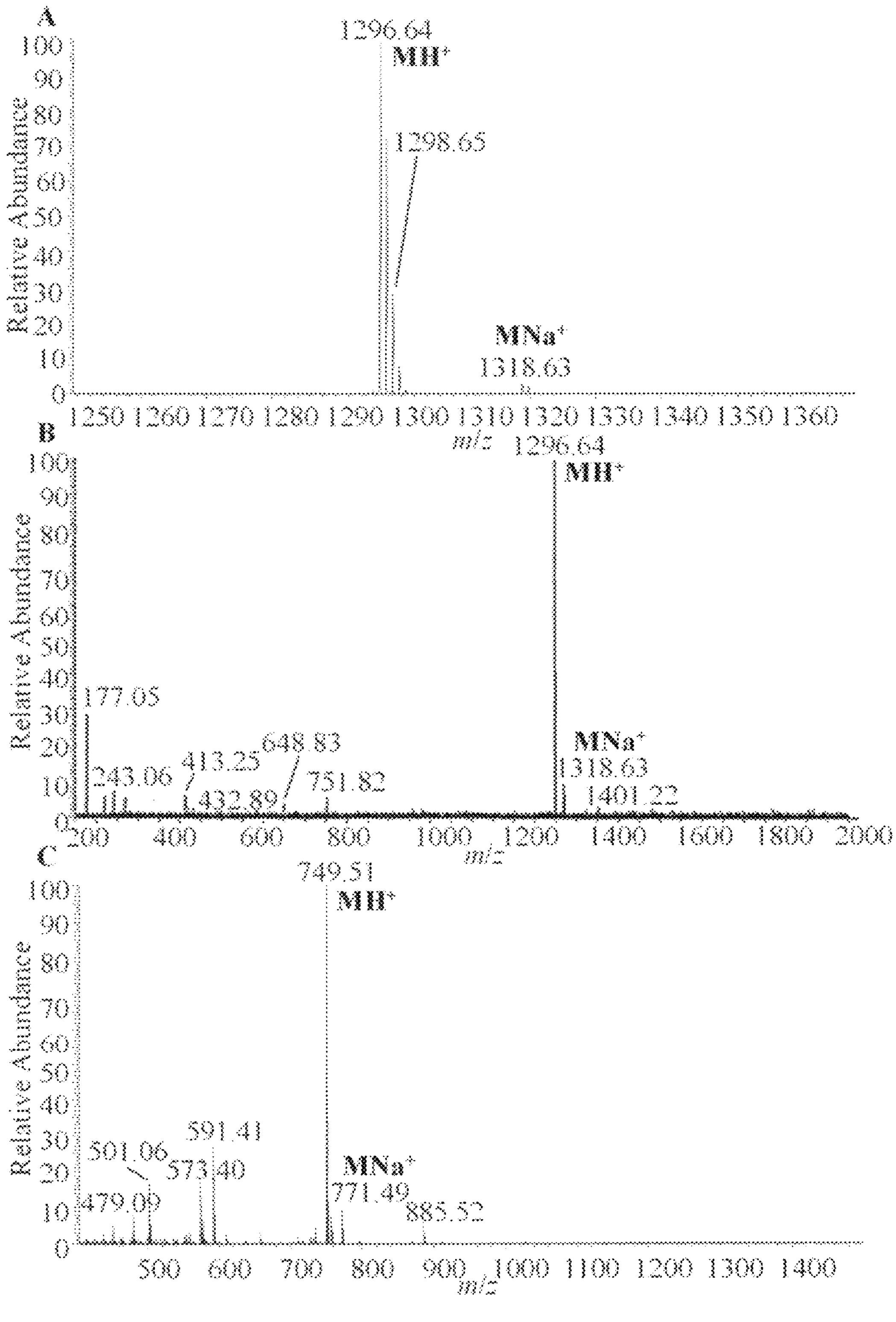
FIG. 25 illustrates of vMALDI on a 3-Port configuration using 2-NPG and CHCA matrices for peptide analyses and a single acquisition of a drug is depicted.

FIG. 25 is a demonstration of vMALDI on a 3-Port configuration (FIG. 10B) (A) using angiotensin I with 2-NPG and (B) CHCA matrix solutions and quickly dried. Data acquired in transmission geometry using nitrogen laser on a Thermo Q-Exactive Focus instrument. The typically singly charged ions are observed with mainly protonation and to some degree metal cation adduction. (C) Depicted here is a single acquisition (scan) mass spectrum of azithromycin m/z 749 using the plate configuration for transmission geometry MALDI with 2,5-dihydroxyacetophenone as matrix and laser ablation at 355 nm. Alternating between vMAI and vMALDI can be done in seconds, but obtaining good results with MALDI, unlike vMAI, can be more challenging as has been documented in the literature for MALDI (e.g., hot spots) and mass range limitations on API mass spectrometers because of the predominant formation of singly charged ions, as well as the tendency of metal cation adduction (e.g., $Na^+$ to give $MNa^+$ instead of $MH^+$). MALDI is known to ionize compounds for which, e.g., ESI, may be more difficult or not applicable. The m/z fingerprints can be used for ID purposes of fungi, bacteria, viruses or other pathogens or compounds of concerns, as has been some in combination with machine learning and library searches and, more recently, artificial intelligence; also see next example.

Figure 26:
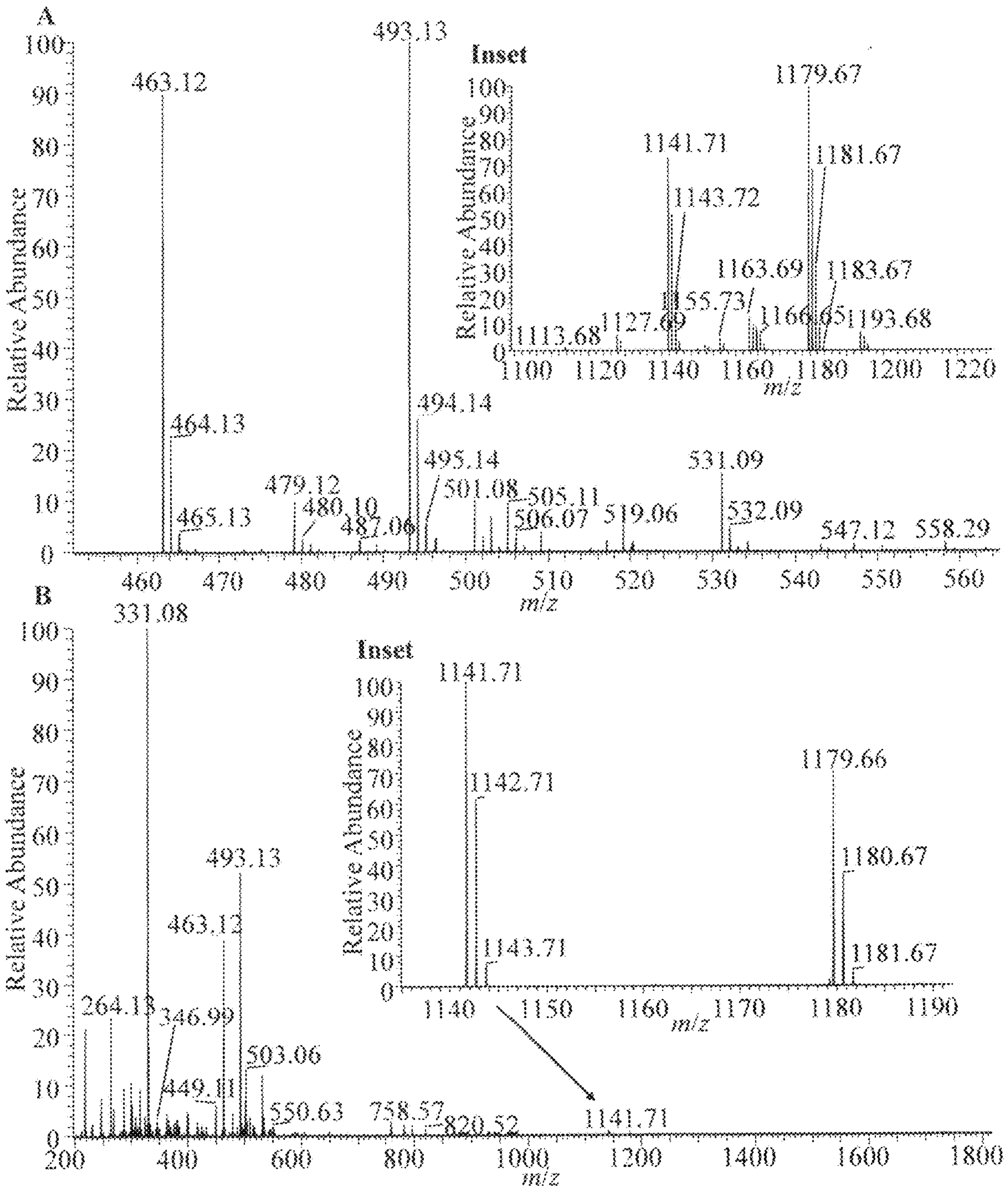
FIG. 26 illustrates of vMALDI mass spectrum using the plate source introduction for blueberry mold.

FIG. 26 vMALDI of blueberry mold with added (A) 2,5-DHAP and (B) 2,5-DHB matrix solutions, respectively. Data acquired in transmission geometry using nitrogen laser on a 3-Port source on Thermo Q-Exactive Focus instrument. The m/z fingerprints of blueberry mold is unknown to us and represents the typical analyses challenge. As is shown here, it is advisable to use different matrices to cover the most of the chemical composition. The individual or combined data can be interpreted by machine learning and artificial intelligence approaches.

Figure 27:
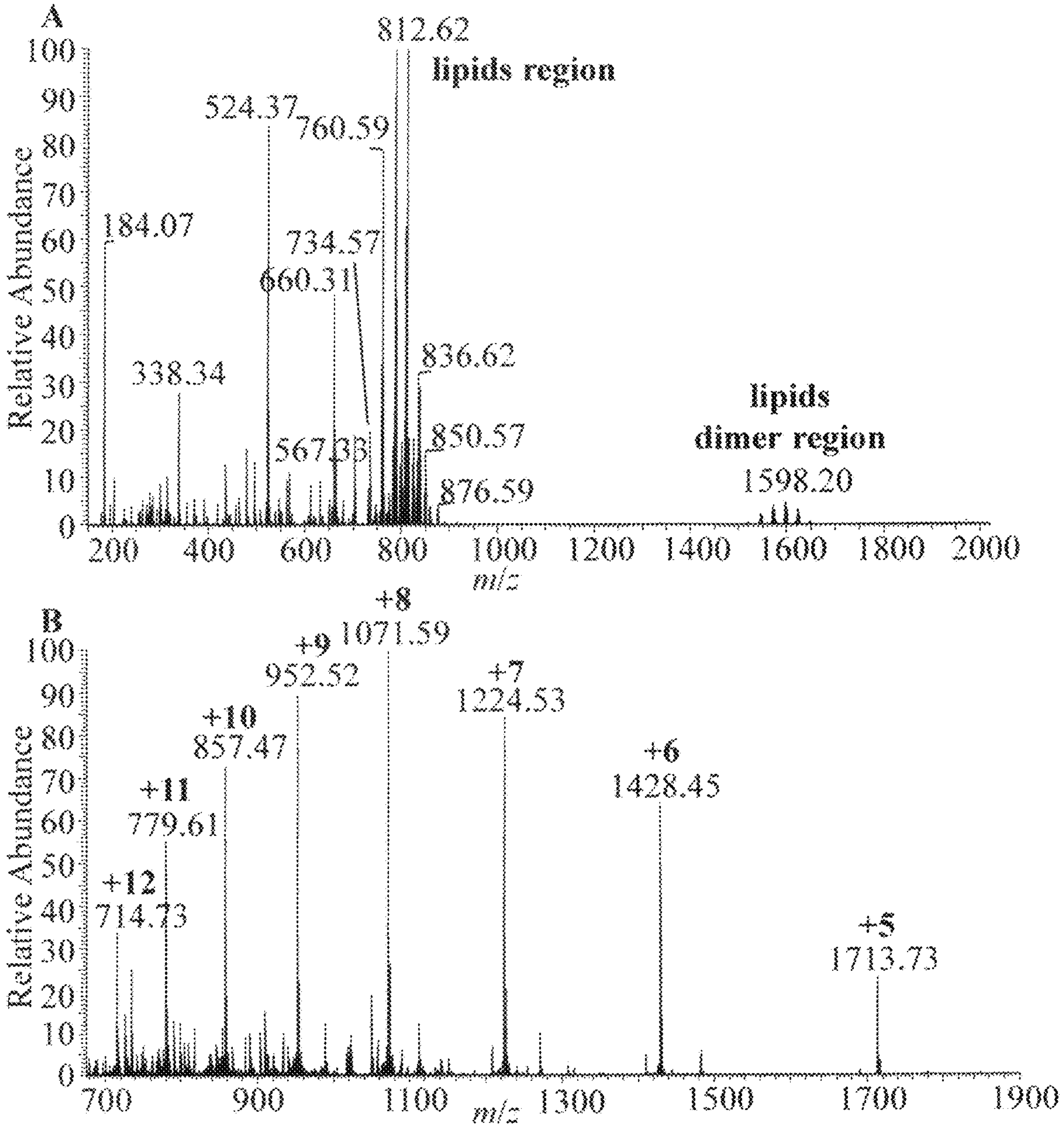
FIG. 27 shows vMAI mass spectra of (A) blood spot and (B) ubiquitin.

FIG. 27 shows vMAI mass spectra of (A) blood spot and (B) ubiquitin. Samples spotted on filter paper, 3-NBN matrix solution was added and dried and the filter paper sandwiched between the metal spacer plate and glass microscope slide (FIG. 10A).

Figure 28:
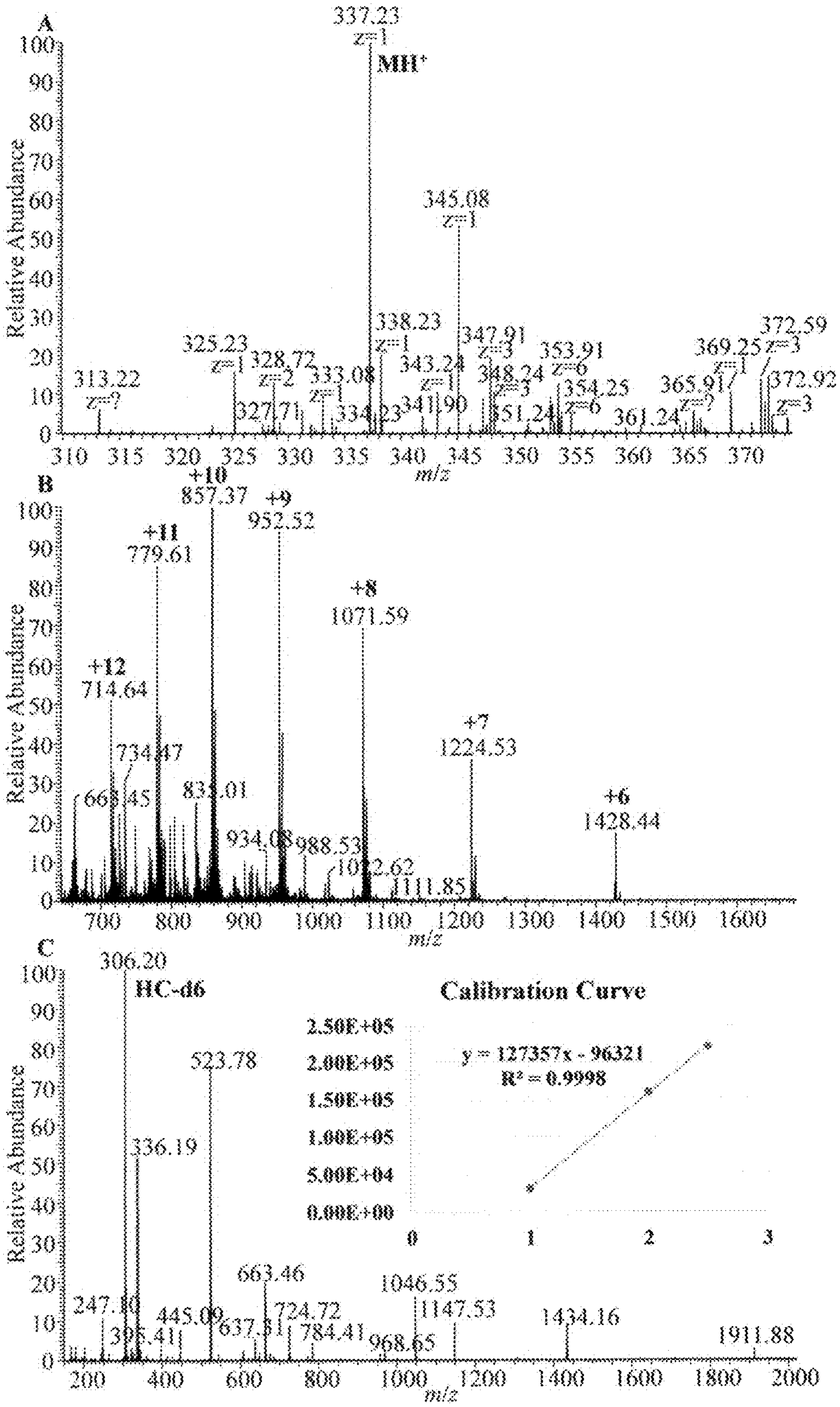
FIG. 28 illustrates sensitivity of this proof of principle of the vMAI plate device without optimization of 25 fmol fentanyl and 25 fmol ubiquitin.

FIG. 28 demonstrates vMAI sensitivity of this proof of principle device without optimization: (A) 25 fmol fentanyl and (B) 25 fmol ubiquitin (1 μL) was applied to a glass microscope slide and 3-NBN matrix solution added and dried. (C) vMAI quantitation of hydrocodone-d6 (HC-d6) 1:1 with mixture (hydroxychloroquine, angiotensin II, vancomycin, maltopentose, bovine insulin). Inset show calibration curve. Data acquired on a 3-Port plate source on Thermo Q-Exactive Focus mass spectrometer (FIG. 10A).

Figure 29:
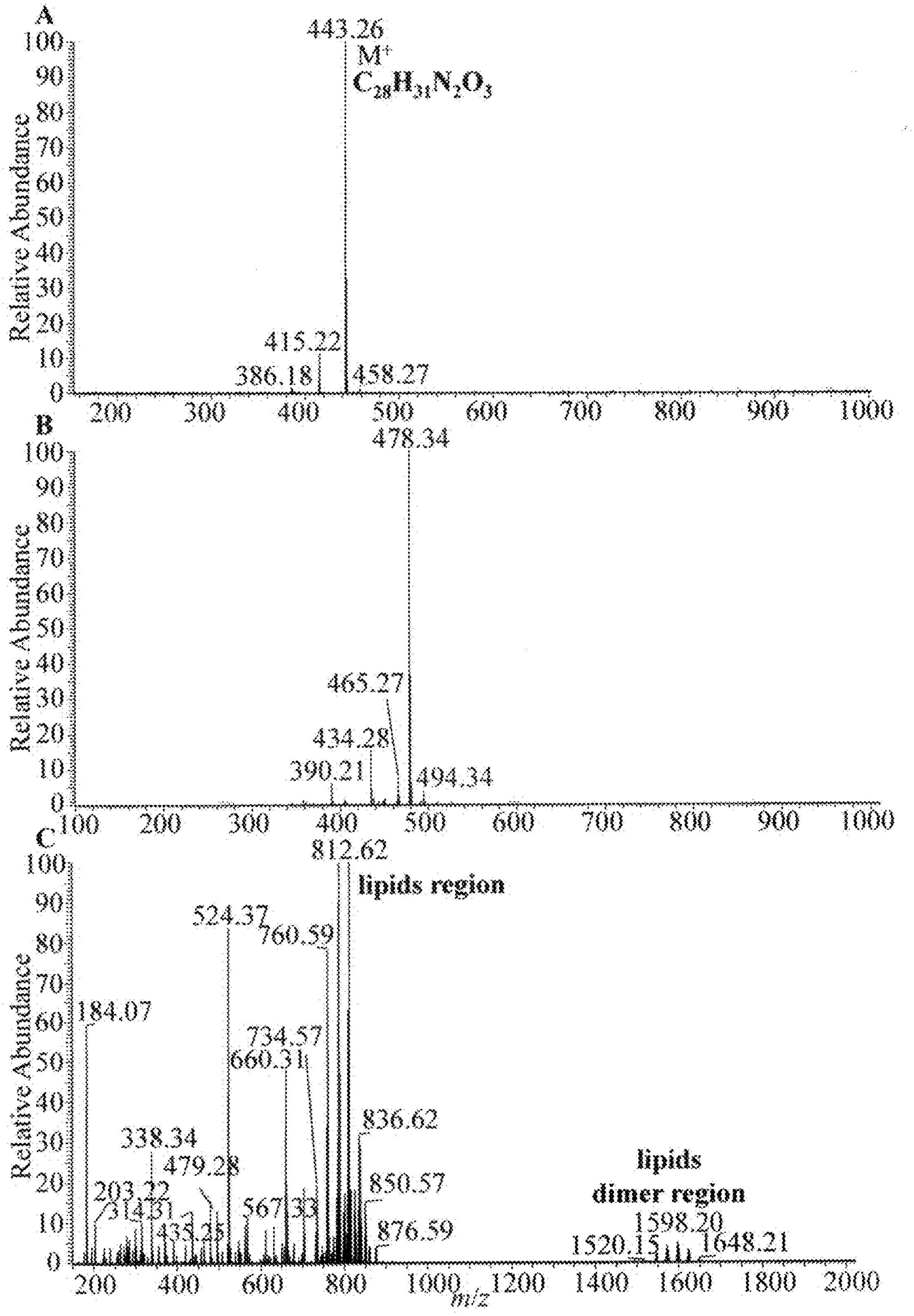
FIG. 29 illustrates analyses of TLC plate by vMAI using 3-NBN matrix for the analyses of rhodamines and ink as well as blood spot analyses from a filter paper acquired on a 3-Port plate source.

FIG. 29 demonstrates vMAI using TLC plates after applying 3-NBN solution and briefly allowed to dry: (A) Rhodamine B and 6G at m/z 443, and (B) ink representing the typical m/z fingerprints of ink. Data acquired on a 3-Port plate source on Thermo Q-Exactive Focus instrument. (C) vMAI mass spectrum using the plate source for blood spot analyses. Sample spotted on filter paper (sandwich between the plates and added with 3-NBN matrix solution). Data acquired on a 3-Port plate source on Thermo Q-Exactive Focus instrument (FIG. 10A).

Figure 30:
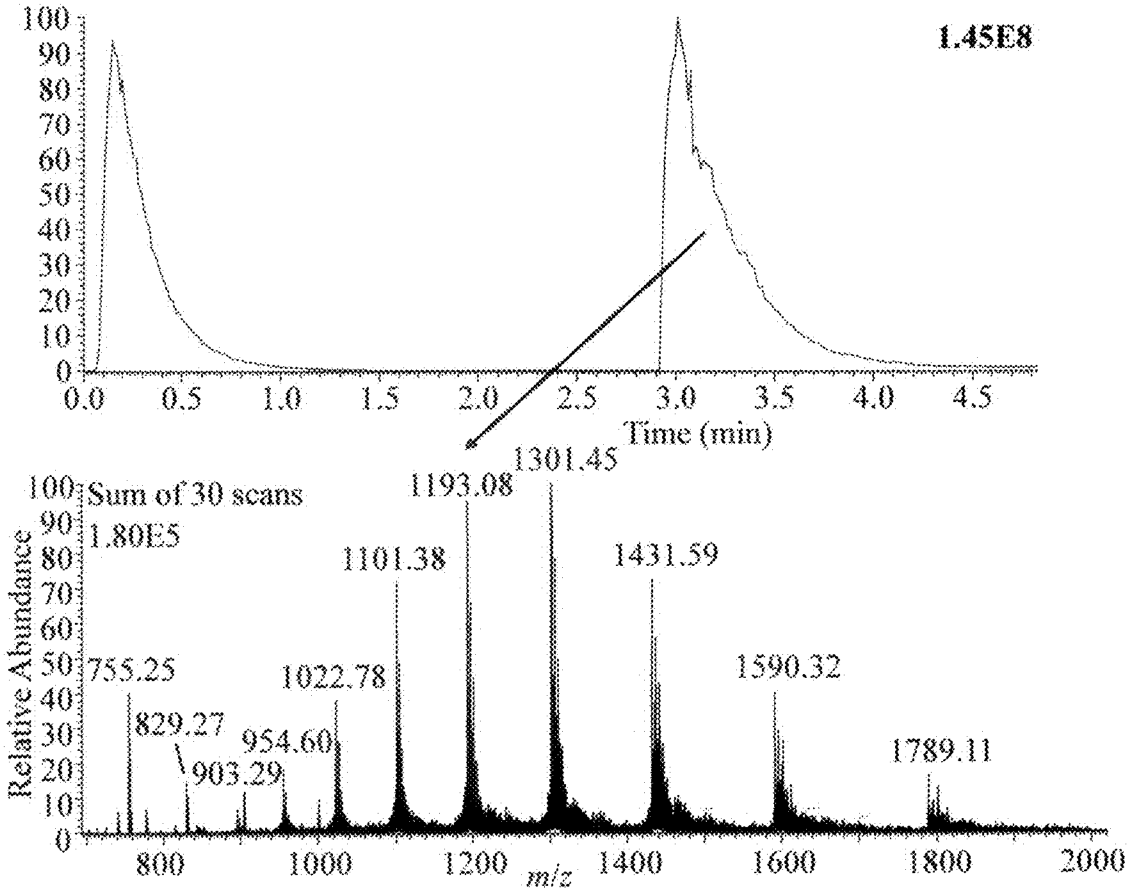
FIG. 30 illustrates analyses of lysozyme (protein with MW~14.3 kDa) from filter paper by vMAI using the binary matrix 3:1 3-NBN and CHCA solution containing 1% formic acid.

FIG. 30 is of lysozyme (protein with MW~14.3 kDa) from filter paper by vMAI using the binary matrix 3:1 3-NBN and CHCA solution containing 1% formic acid. Lysozyme was dissolved in 1:1 methanol:water with ~1% formic acid. The 4-Port plate source (FIG. 10A) was used and +600 V applied to the spacer plate. (A) Chronogram of two positions of sample on filter paper, and (B) mass spectrum of myoglobin showing multiply charged ions with adducts. Paper or other sample substrates with certain functionalities achieved through certain surface modifications may be chosen for certain effects, e.g., removal of sodiation or background ions as has been done for other applications in the past. Filter papers covered with certain surfaces can improve background.

Figure 31:
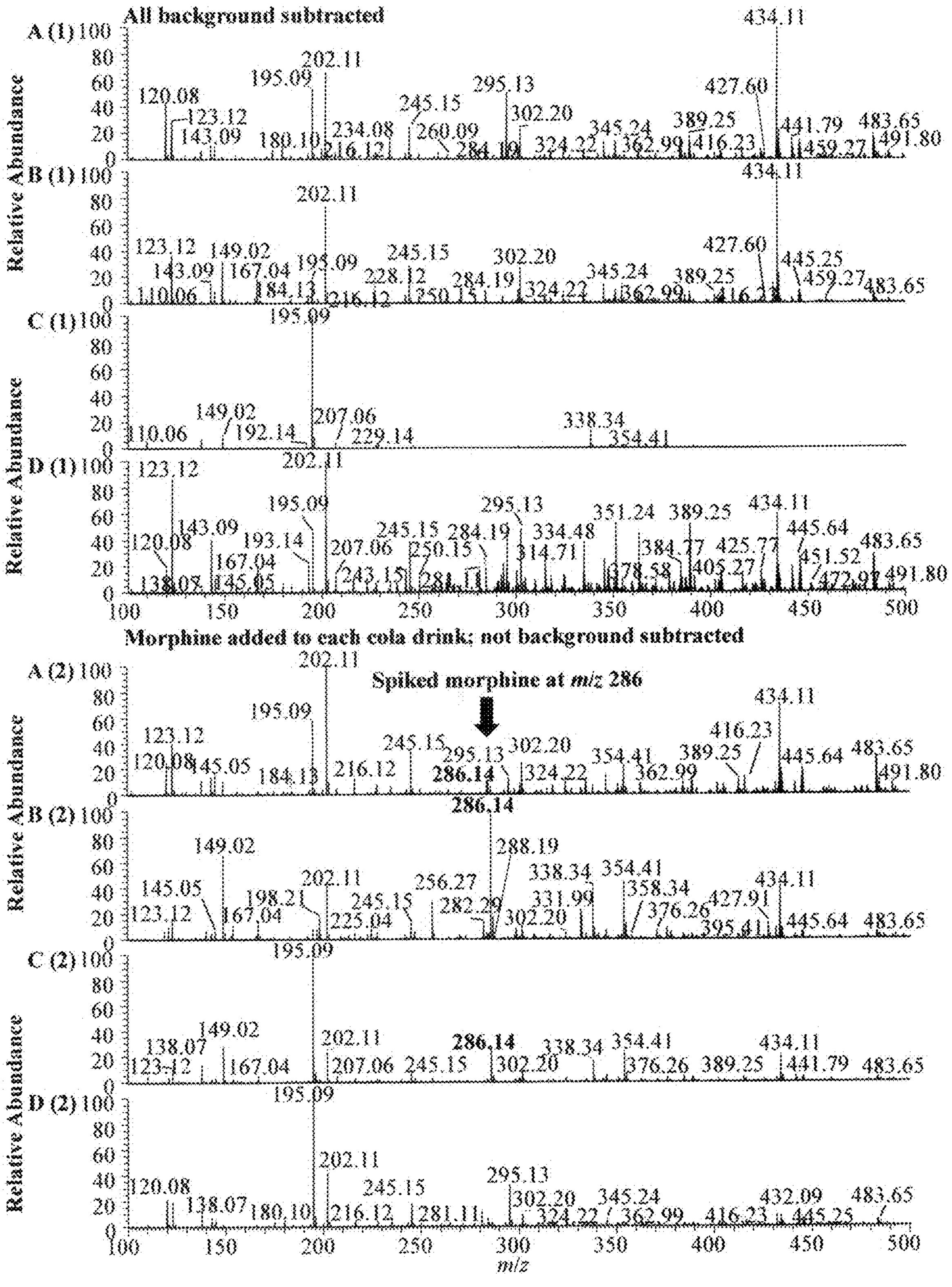
FIG. 31 illustrates different cola drinks having different m/z signatures and when spiked with illicit drug, the drug is detected from each cola drink and directly and without any cleanup.

FIG. 31 shows different cola drinks (left group of mass spectra) and with morphine added in 100 picomolar concentration (right group of mass spectra). Filter paper was used with the 4-Port plate source on a Thermo Q-Exactive Focus (FIG. 10A). The different cola drinks have different m/z signatures and the spiked drug is detected from each cola drink and directly and without any cleanup. Quality, forensics, adulteration general applications are herewith shown.

Figure 32:
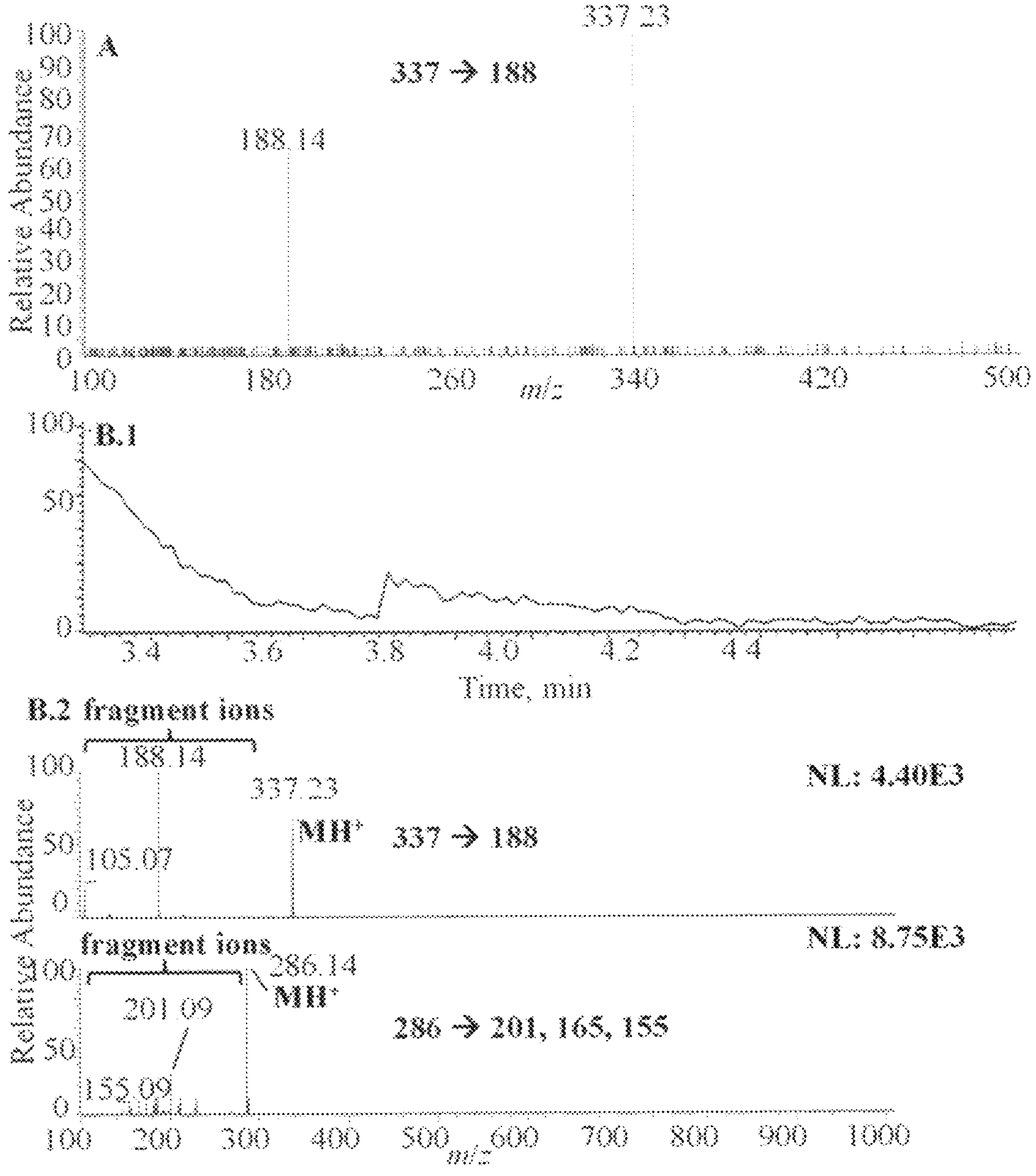
FIG. 32 illustrates fentanyl and morphine from filter paper using 3-NBN as matrix.

FIG. 32 shows (A) mass spectrum of fentanyl and morphine from filter paper using 3-NBN as matrix with analytes applied in sub-picomole amounts (FIG. 10A). (B) Chronogram of ion current. (C) MS/MS of fentanyl. (D) MS/MS fragmentation of morphine. Both illicit drugs the expected fragment ions (compound/structure specific 'transitions') are observed. MS/MS can not only increase the sensitivity of an experiment but also the specificity. Certain reassurance of the identity of a chemical can be obtained by accurate mass but only with mass spectrometers that are sufficiently accurate; this may not be the case with smaller and less expensive mass spectrometers and related devices. Applications of then invention disclosed herein are wide ranging and include, but are not limited to, drugs and more specifically drugs of concern as it has arisen in the substance use disorder (SUD) epidemic including but not limited to opioid use disorder (OUD), e.g., fentanyl and stimulant use disorder (StUD), e.g. cocaine as well as prescription drugs. The Drug Reader device is one of a specific application.

Figure 33:
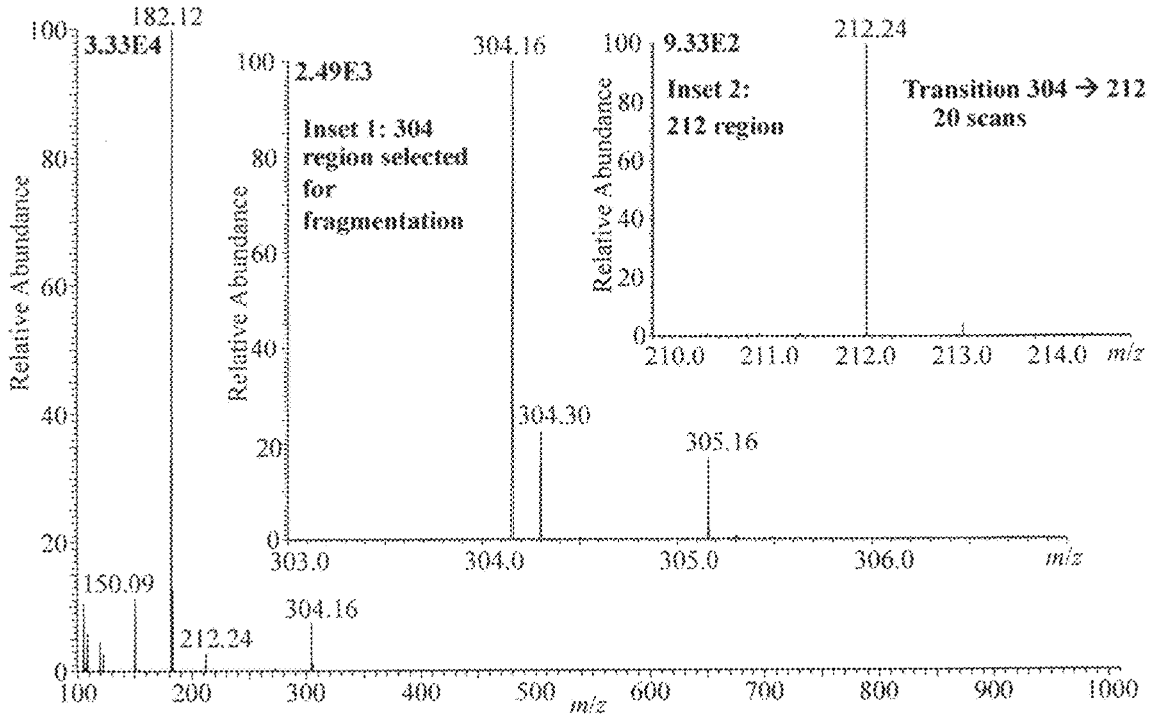
FIG. 33 illustrates cocaine MS and MS/MS analyses using fragment ion transition specific to cocaine prepared directly out of urine using filter paper and analyzed with the 3-Port vacuum chamber assembly device.

FIG. 33 shows a MS/MS mass spectrum from cocaine spiked in urine and added to filter paper together with 3-NBN as matrix (FIG. 10A). Inset 1 depicts the area of the molecular ion selected for MS/MS and Inset 2 depicts the area of the known, distinctive fragment ion at m/z 212 unequivocally identifying the presence of cocaine in this complex and uncleaned sample. As shown here, this is a straightforward means of analyzing for chemical composition even if there are many other compounds present, as is to be expected from urine. MS/MS is useful to differentiate and identify between two closely related ions (isobars) that fragment differently. Otherwise, IMS can differentiate them by differences in cross-sections (or sometimes referred to "mobility", "drift time", or by "shape")

Figure 34:
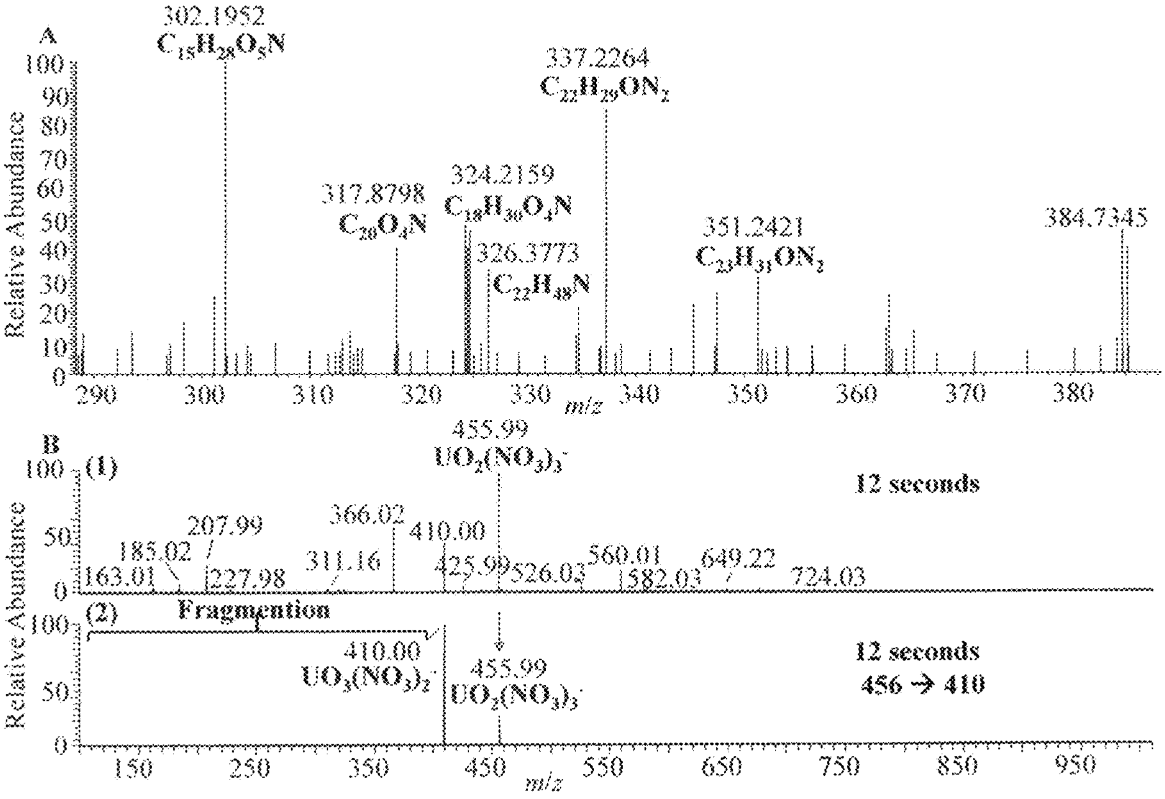
FIG. 34 illustrates the direct analyses of potentially dangerous samples, fentanyl and uranyl nitrate.

FIG. 34 amplify direct analyses of ever dangerous samples for which the operator and instrument shall be protected. In both examples the chemicals were deposited in a fume hood as a safety measure to showcase the analyses (FIG. 10A). In both cases, the chemical was deposited in solution applying 10 nanomole of uranyl nitrate solution and dried and allowed to sit (age) for 5 days. One chemical was analyzed in the positive mode (fentanyl) and the other in the negative mode (uranyl nitrate) both by MS and MS/MS. Each overall measurement took about <40 seconds. No cleanup step was included and everything used was safely disregarded. (A) wiping fentanyl from a countertop with filter paper and adding 3-NBN solution to the visibly "dirty" area of the filter paper, letting it dry and use the "clean" side of the filter paper to face the spacer plate and therewith the sub-AP of the vacuum chamber device [100], this switch of filter paper planes allows to keep the "dirt" away from the instrument, which is highly visible after the wipe of the counter top. Fentanyl was readily identified by the accurate mass and, for additional accuracy, by MS/MS in the positive mode with the m/z 337→188 transition (as was already shown above). (B) the uranyl nitrate was "picked up" (recovered) from the plastic surface in an alternative means, to showcase the many means sampling can occur. Of the ca. 20 microliters of acetone remaining, 20 microliters of a 3-NBN solution was added and 1 microliter was applied to a glass microslide, allowed to air dry and acquired using the 4-Port plate source. Here shown is a negative (1) ion mass spectrum and (2) MS/MS fragmentation spectrum from uranyl nitrate extracted with 50 microliters of acetone/2% formic acid from a plastic surface for each (1) MS and (2) MS/MS requiring ~12 seconds. Some scenarios require minimal sample handling for safety of the operator and preferably as a direct means for monitoring, e.g., directly wiped off from a surface, as is exemplified using the disclosed invention. Ionization occurs inside a closed or semi obstructed device using either vacuum ionization, as shown here, or inlet ionization, although with inlet ionization there is greater risk for carryover and need for cleaning. The Drug Reader device has been used for this particular aspect of this invention.

REFERENCES TO PRIOR ART

Patents, Higher Relevance

Multiconfiguration ionization source, U.S. Pat. No. 3,886,365A, United States, Inventor, William P Kruger, John A Michnowicz, Current Assignee, HP Inc Ion source with capability of changing between operation modes, U.S. Pat. No. 4,037,108A, United States, Inventor, Helmut Jordan, Curt Sivers, Current Assignee Individual.

Multimode ionization source, EP0423454A2, European Patent Office, Inventor Paul C. Goodley, Stuart C. Hansen, Current Assignee HP Inc Multimode ionization source, US20040079881A1, United States, Inventor Steven Fischer, Darrell Gourley, James Bertsch, Current Assignee Agilent Technologies Inc A high speed combination multi-mode ionization source for mass spectrometers. GB2406705A, United Kingdom, Inventor Michael P Balogh, Current Assignee Waters Investments Ltd Patents, related to MSTM, LLC and more specifically Inventors Pophristic, McEwen, Trimpin and the references incorporated within these issues patents and one pending patent.

MULTI-MODE IONIZATION APPARATUS AND USES THEREOF, Publication number: 20210343518, Publication date: Nov. 4, 2021, Applicant: MSTM, LLC, Inventor: Milan Pophristic, System and method for ionization of molecules for mass spectrometry and ion mobility spectrometry, U.S. Pat. No. 10,796,894, Date of Patent: Oct. 6, 2020, Assignees: University Of The Sciences in Philadelphia, Wayne State University, Inventors: Sarah Trimpin, Charles Nehemiah McEwen, Vincent Salvatore Pagnotti System and method for ionization of molecules for mass spectrometry and ion mobility Spectrometry, U.S. Pat. No. 10,128,096, Date of Patent: Nov. 13, 2018, Assignees: University Of The Sciences In Philadelphia, Wayne State University, Inventors: Sarah Trimpin, Charles Nehemiah McEwen, Vincent Salvatore Pagnotti System and method for ionization of molecules for mass spectrometry and ion mobility spectrometry, U.S. Pat. No. 9,552,973, Date of Patent: Jan. 24, 2017, Assignees: University of the Sciences in Philadelphia, Wayne State University, Inventors: Charles Nehemiah McEwen, Sarah Trimpin, Vincent Salvatore Pagnotti Ionization at intermediate pressure for atmospheric pressure ionization mass spectrometers, U.S. Pat. No. 9,305,759, Date of Patent: Apr. 5, 2016, Assignee: University of the Sciences in Philadelphia, Inventors: Charles Nehemiah McEwen, Vincent Salvatore Pagnotti Atmospheric pressure ion source probe for a mass spectrometer, U.S. Pat. No. 7,977,629, Filed: Sep. 3, 2008, Date of Patent: Jul. 12, 2011, Assignee: M&M Mass Spec Consulting, LLC Ion source for a mass spectrometer, U.S. Pat. No. 7,642,510, Date of Patent: Jan. 5, 2010, Assignee: E.I. du Pont de Nemours and Company, Inventor: Charles Nehemiah McEwen Liquid dispersion device, U.S. Pat. No. 6,871,794, Date of Patent: Mar. 29, 2005, Assignee: E. I. du Pont de Nemours and Company, Inventor: Charles Nehemiah McEwen Liquid dispersion device, U.S. Pat. No. 6,729,552, Date of Patent: May 4, 2004, Assignee: E. I. du Pont de Nemours and Company, Inventors: Charles Nehemiah McEwen, William J. Herron, Richard G. McKay System and methods for ionizing compounds using matrix-assistance for mass spectrometry and ion mobility spectrometry, U.S. Pat. No. 11,430,648, Date of Patent: Aug. 30, 2022, Assignee: MSTM, LLC, Inventors: Sarah Trimpin, Ellen dela Victoria Inutan System and methods for ionizing compounds using matrix-assistance for mass spectrometry and ion mobility spectrometry, U.S. Pat. No. 10,679,838, Filed: Oct. 20, 2016, Date of Patent: Jun. 9, 2020, Inventors: Sarah Trimpin, Ellen dela Victoria Inutan Compositions and methods for mass spectometry, U.S. Pat. No. 9,870,909, Date of Patent: Jan. 16, 2018, Inventor: Sarah Trimpin Systems and methods for high throughput solvent assisted ionization inlet for mass spectrometry, U.S. Pat. No. 9,824,872, Date of Patent: Nov. 21, 2017, Assignee: Wayne State University, Inventor: Sarah Trimpin Mass spectometry using laserspray ionization, U.S. Pat. No. 9,202,680, Date of Patent Dec. 1, 2015, Assignee: Wayne State University, Inventor: Sarah Trimpin Systems and methods extending the laserspray ionization mass spectrometry concept from atmospheric pressure to vacuum, U.S. Pat. No. 9,177,773, Date of Patent: Nov. 3, 2015, Assignee: Wayne State University, Inventor: Sarah Trimpin System and methods for ionizing compounds using matrix-assistance for mass spectrometry and ion mobility spectrometry, U.S. Pat. No. 9,105,458, Date of Patent: Aug. 11, 2015, Inventors: Sarah Trimpin, Ellen dela Victoria Inutan Systems and methods extending the laserspray ionization mass spectrometry concept from atmospheric pressure to vacuum, U.S. Pat. No. 8,853,621, Date of Patent: Oct. 7, 2014, Assignee: Wayne State University, Inventor: Sarah Trimpin PATENTS, LOWER RELEVANCE 1. Combined electrophoretic-separation and electrospray method and system, U.S. Pat. No. 4,842,701A, publication date 1989 Jun. 27, R D Smith, JA Olivares
2. Electrospray ionization mass spectrometer with new features, U.S. Pat. No. 4,977,320, Date of Patent: Dec. 11, 1990, Assignee: The Rockefeller University, Inventors: Swapan K. Chowdhury, Viswanatham Katta, Brian T. Chait
3. Detection method for dissociation of multiple-charged ions, U.S. Pat. No. 5,073,713A, publication date 1991 Dec. 17, R D Smith, HR Udseth, A L Rockwood,
4. Mass spectrometer, U.S. Pat. No. 5,077,470, Date of Patent: Dec. 31, 1991, Assignee: JEOL Ltd., Inventors: Robert B. Cody, Andrew N. Tyler
5. Electrospray ion source for mass spectrometry, U.S. Pat. No. 5,245,186, Date of Patent: Sep. 14, 1993, Assignee: The Rockefeller University, Inventors: Brian T. Chait, Swapan K. Chowdhury, Viswanatham Katta, Urooj A. Mirza
6. Supercritical fluid reverse micelle separation, U.S. Pat. No. 5,266,205A, publication date 1993 Nov. 30, J L Fulton, R D Smith
7. Push rod field desorption ion source, DE3531338C2, Publication date: 1994-01-20, Inventor Hans Bernhard Dr Linden, Current Assignee, LINDEN, HANS BERNHARD, DR., 2800 BREMEN, DE
8. Electrospray and atmospheric pressure chemical ionization mass spectrometer and ion source, U.S. Pat. No. 5,756,994, Date of Patent: May 26, 1998, Assignee: Micromass Limited, Inventor: Stevan Bajic
9. Atmospheric pressure matrix assisted laser desorption, U.S. Pat. No. 5,965,884A, Date of Patent: 1999-10-12 Inventor Victor V. Laiko, Alma L. Burlingame, Current Assignee, University of California.
10. Capillary electrophoresis electrospray ionization mass spectrometry interface, U.S. Pat. No. 5,993,633A, publication date 1999 Nov. 30, R D Smith, J C Severs
11. Method and apparatus for directing ions and other charged particles generated at near atmospheric pressures into a region under vacuum, U.S. Pat. No. 6,107,628A, publication date 2000 Aug. 22, R D Smith, SA Shaffer
12. Kinetic energy focusing for pulsed ion desorption mass spectrometry, U.S. Pat. No. 6,130,426, Date of Patent: Oct. 10, 2000, Assignee: Bruker Daltonics, Inc., Inventors: Frank H. Laukien, Melvin A. Park.
13. Method for assessing significance of protein identification, U.S. Pat. No. 6,446,010, Date of Patent: Sep. 3, 2002, Assignee: The Rockefeller University, Inventors: Jan Eriksson, David Fenyó, Brian T. Chait.
14. Systems and method of a gated electrospray interface with variable flow rate for high throughput mass spectrometric analysis, Publication number: 20020190204, Publication date: Dec. 19, 2002, Applicant: Bruker Daltonics, Inc., Inventors: Steven A. Hofstadler, Jared J. Drader, Kristin A. Sannes-Lowery, Richard H. Griffey.
15 Ionization chamber for atmospheric pressure ionization mass spectrometry, U.S. Pat. No. 6,410,914, Date of Patent: Jun. 25, 2002, Assignee: Bruker Daltonics Inc., Inventors: Melvin A. Park, Houle Wang, Frank Laukien.
16. Multi-inlet mass spectrometer for analysis of liquid samples by electrospray or atmospheric pressure ionization, U.S. Pat. No. 6,410,915, Date of Patent: Jun. 25, 2002, Assignee: Micromass Limited, Inventors: Robert H. Bateman, John A. Hickson.
17. Method of determining peptide sequences by mass spectrometry, U.S. Pat. No. 6,489,608, Date of Patent: Dec. 3, 2002, Assignee: Micromass Limited, Inventor: John Skilling.
18. Methods of identifying peptides and proteins by mass spectrometry, U.S. Pat. No. 6,489,121, Date of Patent: Dec. 3, 2002, Assignee: Micromass Limited, Inventor: John Skilling.
19. Systems and methods for inducing infrared multiphoton dissociation with a hollow fiber waveguide, Publication number: 20030016926, Publication date: Jan. 23, 2003, Applicant: Bruker Daltonics, Inc., Inventors: Steven A. Hofstadler, Jared J. Drader.
20. Ultra-sensitive detection systems, Publication number: 20030045694, Publication date: Mar. 6, 2003, Inventors: Brian T. Chait, Darin R. Latimer, Paul M. Lizardi, Eric R. Kershnar, Jon S. Morrow, Matthew E. Roth, Martin J. Mattessich, Kevin J. McConnell.
21. Maldi sample plate, Publication number: 20030116707, Publication date: Jun. 26, 2003, Applicant: Micromass Limited, Inventors: Jeff Brown, Dominic Gostick, Edouard S. P. Bouvier, John Charles Gebler, Peter Jeng Jong Lee, James Ian Langridge, Emmanuelle Claude, Weibin Chen
22. Method and apparatus for improved signal-to-noise ratio in mass spectrometry, U.S. Pat. No. 6610976, Date of Patent: Aug. 26, 2003, Assignee: The Rockefeller University, Inventors: Brian T. Chait, Andrew N. Krutchinsky.
23. Mass spectrometers and methods of mass spectrometry, U.S. Pat. No. 6,642,514, Date of Patent: Nov. 4, 2003, Assignee: Micromass Limited, Inventors: Robert Harold Bateman, Kevin Giles.
24. Atmospheric pressure photoionization source in mass spectrometry, U.S. Pat. No. 6,646,256B2, Publication Date: Nov. 11, 2003, Inventor Darrell L. Gourley, Steven M. Fischer, Current Assignee Agilent Technologies Inc.

25. Means and method for multiplexing sprays in an electrospray ionization source, U.S. Pat. No. 6,657,191, Date of Patent: Dec. 2, 2003, Assignee: Bruker Daltonics Inc., Inventor: Melvin A. Park.
26. IONIZATION APPARATUS AND METHOD FOR MASS SPECTROMETER SYSTEM, United States Patent, U.S. Pat. No. 6,707,036 B2 Makarov et al., Date of Patent: Mar. 16, 2004, Inventors: Alexander A. Makarov, Cheshire (GB); Pavel V. Bondarenko, Santa Clara, CA (US), Assignee: Thermo Finnigan LLC, San Jose, CA.
27. IONIZATION APPARATUS AND METHOD FOR MASS SPECTROMETER SYSTEM, United States Patent, U.S. Pat. No. 6,707,040 Makarov et al., Date of Patent: Mar. 16, 2004, Inventors: Alexander A. Makarov, Cheshire (GB); Pavel V. Bondarenko, Thousand Oaks, CA (US), Assignee: Thermo Finnigan LLC, San Jose, CA.
28. Means and method for a quadrupole surface induced dissociation quadrupole time-of-flight mass spectrometer, U.S. Pat. No. 6,744,040, Date of Patent: Jun. 1, 2004, Assignee: Bruker Daltonics, Inc., Inventor: Melvin A. Park.
29. Method and apparatus for a nanoelectrosprayer for use in mass spectrometry, U.S. Pat. No. 6,753,521, Date of Patent: Jun. 22, 2004, Assignee: Bruker Daltonics, Inc., Inventors: Melvin A. Park, Houle Wang.
30. Method and apparatus for a multiple part capillary device for use in mass spectrometry, U.S. Pat. No. 6,777,672, Date of Patent: Aug. 17, 2004, Assignee: Bruker Daltonics, Inc., Inventor: Melvin A. Park.
31. Method for increasing the dynamic range of mass spectrometers, U.S. Pat. No. 6,787,760B2, publication date 2004 Sep. 7, M Belov, R D Smith, HR Udseth.
32. Method and apparatus for automating a matrix-assisted laser desorption/ionization (MALDI) mass spectrometer, U.S. Pat. No. 6,787,764, Date of Patent: Sep. 7, 2004, Assignee: Bruker Daltonics, Inc., Inventor: Melvin A. Park.
33. Ionization source utilizing a multi-capillary inlet and method of operation, U.S. Pat. No. 6,803,565B2, publication date 2004 Oct. 12, R D Smith, T Kim, HR Udseth.
34. Ionization source chamber and ion beam delivery system for mass spectrometry, U.S. Pat. No. 6,809,312, Date of Patent: Oct. 26, 2004, Assignee: Bruker Daltonics, Inc., Inventors: Melvin A. Park, Houle Wang.
35. High performance ion mobility spectrometry using hourglass electrodynamic funnel and internal ion funnel, U.S. Pat. No. 6,967,325B1, publication date 2004 Nov. 16, R D Smith, K Tang, AA Shvartsburg.
36. Method and apparatus for multispray emitter for mass spectrometry, U.S. Pat. No. 6,831,274B2, publication date 2004 Dec. 14, R D Smith, K Tang, Y Lin.
37. Naturally processed measles virus peptides eluted from class II HLA molecules, Publication number: 20060034859, Filed: Apr. 28, 2005, Publication date: Feb. 16, 2006, Inventors: Gregory Poland, Inna Ovsyannikova, David Muddiman, Kenneth Johnson.
38. Chemical analysis method for multiplexed samples, U.S. Pat. No. 6,902,938, Date of Patent: Jun. 7, 2005, Assignee: Jeol USA, Inc. Inventor: Robert B. Cody.
39. Means and method for guiding ions in a mass spectrometer, U.S. Pat. No. 6,956,205, Date of Patent: Oct. 18, 2005, Assignee: Bruker Daltonics, Inc., Inventor: Melvin A. Park.
40. Atmospheric pressure ion source, U.S. Pat. No. 6,949,741, Date of Patent: Sep. 27, 2005, Assignee: Jeol USA, Inc., Inventors: Robert B. Cody, James A. Laramee.
41. Multi-source ion funnel, U.S. Pat. No. 6,979,816B2, publication date 2005 Dec. 27, K Tang, MB Belov, AV Tolmachev, HR Udseth, R D Smith
42. Means and method for analyzing samples by mass spectrometry, Publication number: 20070224697, Type: Application, Filed: Mar. 24, 2006, Publication date: Sep. 27, 2007, Applicant: Bruker Daltonics, Inc., Inventor: Melvin Park
43. Method and apparatus for an electrospray needle for use in mass spectrometry, U.S. Pat. No. 7,049,582, Date of Patent: May 23, 2006, Assignee: Bruker Daltonics, Inc., Inventor: Melvin A. Park
44. Laser desorption ion source, Inventor Ross Willoughby, Edward Sheehan, Craig Whitehouse, U.S. Pat. No. 7,087,898B2, Publication date 2006-08-08, Current Assignee Chem Space Associates Inc, Revvity Health Sciences Inc
45. Means and method for multiplexing sprays in an electrospray ionization source, U.S. Pat. No. 7,098,451, Date of Patent: Aug. 29, 2006, Assignee: Bruker Daltonics, Inc., Inventor: Melvin A. Park
46. Method and apparatus for automating an atmospheric pressure ionization (API) source for mass spectrometry, U.S. Pat. No. 7,109,478, Date of Patent: Sep. 19, 2006, Assignee: Bruker Daltonics, Inc., Inventor: Melvin A. Park
47. Method for atmospheric pressure analyte ionization, U.S. Pat. No. 7,112,785, Date of Patent: Sep. 26, 2006, Assignee: JEOL USA, Inc., Inventors: James A. Laramee, Robert B. Cody.
48. Method and apparatus for multiple frequency multipole, U.S. Pat. No. 7,126,118, Date of Patent: Oct. 24, 2006, Assignee: Bruker Daltonics, Inc., Inventor: Melvin A. Park
49. Method and apparatus for a nanoelectrosprayer for use in mass spectrometry, U.S. Pat. No. 7,126,115, Date of Patent: Oct. 24, 2006, Assignee: Bruker Daltonics, Inc., Inventors: Melvin A. Park, Houle Wang.
50. Method and apparatus for a multiple part capillary device for use in mass spectrometry, U.S. Pat. No. 7,265,349, Date of Patent: Sep. 4, 2007, Assignee: Bruker Daltonics, Inc., Inventor: Melvin A. Park
51. Ionization chamber for atmospheric pressure ionization mass spectrometry, U.S. Pat. No. 7,315,020, Date of Patent: Jan. 1, 2008, Assignee: Bruker Daltonics, Inc., Inventors: Melvin A. Park, Houle Wang, Frank Laukien
52. Method and system for desorption electrospray ionization, U.S. Pat. No. 7,335,897, Date of Patent: Feb. 26, 2008, Assignee: Purdue Research Foundation, Inventors: Zoltán Takáts, Bogdan Gologan, Justin Michael Wiseman, Robert Graham Cooks
53. Ionizable isotopic labeling reagents for relative quantification by mass spectrometry, Publication number: 20080050833, Publication date: Feb. 28, 2008, Inventors: Lloyd Smith, Michael Shortreed, Brian Frey, Margaret Phillips, Joshua Coon, Shane Lamos, Casey Krusemark, Peter Belshaw, Madhusudan Patel, Neil Kelleher
54. Method for detecting post-translation modifications of peptides, U.S. Pat. No. 7,341,874, Date of Patent: Mar. 11, 2008, Assignees: The Rockefeller University, The Scripps Research Institute, Inventors: Brian T. Chait, Ronald Beavis, Rong Wang, Stephen B. H. Kent.
55. Protein Microscope, Publication number: 20080149822, Filed: Jan. 26, 2006, Publication date: Jun. 26, 2008, Inventors: Akos Vertes, Mark E. Reeves, Fatah Kashanchi 56. Enclosed desorption electrospray ionization, Publication number: 20080156985, Filed: Dec. 27, 2007, Publication date: Jul. 3, 2008, Inventors: Andre Venter, Robert Graham Cooks.

57. Laser Ablation Electrospray Ionization (LAESI) for Atmospheric Pressure, In Vivo, and Imaging Mass Spectrometry, Publication number: 20090272892, Filed: Jul. 18, 2008, Publication date: Nov. 5, 2009, Inventors: Akos Vertes, Peter Nemes 58. Ion source combining esi-, fi-, fd- lifdi- and maldi elements, GB2418774B, Publication date: 2008-09-24, Inventor Bernhard Hans Linden, Current Assignee Individual 59. System and method for the preparation of arrays of biological or other molecules, Publication number: 20080227657, Filed: Mar. 12, 2008, Publication date: Sep. 18, 2008, Inventors: Robert Graham Cooks, Zheng Ouyang.

60. Three-Dimensional Molecular Imaging By Infrared Laser Ablation Electrospray Ionization Mass Spectrometry, Publication number: 20100012831, Filed: Nov. 25, 2008, Publication date: Jan. 21, 2010, Inventors: Akos Vertes, Peter Nemes.

61. Ion guide for mass spectrometers, U.S. Pat. No. 7,459, 693B2, Date of Publication 2008-12-02, Inventor Melvin A. Park, Taeman Kim, Catherine Stacey, Christian Berg, Current Assignee Bruker Scientific LLC.

62. Method of making tapered capillary tips with constant inner diameters, U.S. Pat. No. 7,491,341B2, publication date 2009 Feb. 17, R T Kelly, J S Page, K Tang, R D Smith 63. Ion guide for mass spectrometers, U.S. Pat. No. 7,495, 212, Date of Patent: Feb. 24, 2009, Assignee: Bruker Daltonics, Inc., Inventors: Taeman Kim, Melvin Andrew Park 64. Method and apparatus for selective filtering of ions, U.S. Pat. No. 7,514,676B1, publication date 2009 Apr. 7, J S Page, K Tang, R D Smith 65. Method of multiplexed analysis using ion mobility spectrometer, U.S. Pat. No. 7,541,576B2, publication date 2009 Jun. 2, ME Belov, R D Smith 66. METHOD FOR DETECTING BACTERIAL SPORES, Publication number: 20090155839, Filed: May 31, 2002, Publication date: Jun. 18, 2009, Inventors: James A. Laramee, Robert B. Cody.

67. LASER DESORPTION IONIZATION AND PEPTIDE SEQUENCING ON LASER INDUCED SILICON MICROCOLUMN ARRAYS, Publication number: 20090321626, Filed: Feb. 14, 2007, Publication date: Dec. 31, 2009, Inventors: Akos Vertes, Yong Chen 68. NANOPHOTONIC PRODUCTION, MODULATION AND SWITCHING OF IONS BY SILICON MICROCOLUMN ARRAYS, Publication number: 20100207021, Filed: Jan. 19, 2010, Publication date: Aug. 19, 2010, Inventors: Akos Vertes, Bennett N. Walker 69. Laser ionization mass spectrometry and its apparatus, JP4442924B2, date of publication 2010 Mar. 31, Inventor Kunio Awazu, 粟津邦男, Yasuhide Naito, 内藤康秀, Current Assignee Jeol Ltd 70. Flexible open tube sampling system for use with surface ionization technology, 2010-04-27, Publication of U.S. Pat. No. 7,705,297B2, Current Assignee Bruker Scientific LLC, Inventor Brian D. Musselman.

71. Radial arrays of nano-electrospray ionization emitters and methods of forming electrosprays, U.S. Pat. No. 7,816,645B2, publication date 2010 Oct. 19, RT Kelly, K Tang, R D Smith 72. Methods for Detecting Metabolic States by Laser Ablation Electrospray Ionization Mass Spectrometry, Publication number: 20100285446, Filed: May 5, 2010, Publication date: Nov. 11, 2010, Inventors: Akos Vertes, Fatah Kashanchi, Prabhakar Sripadi, Kylene Kehn-Hall 73. Method of Inorganic Analysis by Mass Spectrometry, Publication number: 20100291704, Publication date: Nov. 18, 2010, Applicant: JEOL USA, INC., Inventor: Robert B. Cody 74. TAILORED NANOPOST ARRAYS (NAPA) FOR LASER DESORPTION IONIZATION IN MASS SPECTROMETRY, Publication number: 20100323917, Filed: Apr. 7, 2010, Publication date: Dec. 23, 2010, Inventors: Akos VERTES, Bennett N. Walker, Jessica A. Stolee, Scott T. Retterer 75. Ion funnel ion trap and process, U.S. Pat. No. 7,888, 635B2, publication date 2011 Feb. 15, M E Belov, Y M Ibrahim, B H Clowers, D C Prior, R D Smith.

76. Multideflector, U.S. Pat. No. RE42111, Date of Patent: Feb. 8, 2011, Assignee: Bruker Daltonics, Inc., Inventors: Melvin A. Park, Claus Koester.

77. Sampling system for containment and transfer of ions into a spectroscopy system Patent, U.S. Pat. No. 7,928, 364B2, publication date 2011 Apr. 19, Current Assignee Bruker Scientific LLC, Inventor Brian D. Musselman.

78. SUBCELLULAR ANALYSIS BY LASER ABLATION ELECTROSPRAY IONIZATION MASS SPECTROMETRY, Publication number: 20110215233, Filed: Mar. 10, 2011, Publication date: Sep. 8, 2011, Inventors: Akos Vertes, Jessica A. Stolee, Bindesh Shrestha.

79. METHOD OF SURFACE IONIZATION WITH SOLVENT SPRAY AND EXCITED-STATE NEUTRALS, Publication number: 20120006983, Publication date: Jan. 12, 2012, Applicant: Jeol USA Inc., Inventor: Robert B. Cody.

80. Low pressure electrospray ionization system and process for effective transmission of ions, U.S. Pat. No. 8,173, 960B2, publication date 2012 May 8, K Tang, J S Page, RT Kelly, R D Smith 81. Atmospheric Pressure Charge-Exchange Analyte Ionization, Publication number: 0120112051, Publication date: May 10, 2012, Applicant: JEOL USA, INC., Inventor: Robert B. Cody 82. Electron transfer dissociation device, U.S. Pat. No. 8,283,626B2, Publication date 2012-10-09, Inventor Jeffery Mark Brown, Martin Raymond Green, Current Assignee Micromass UK Ltd.

83. Microchip and wedge ion funnels and planar ion beam analyzers using same, U.S. Pat. No. 8,299,443B1, publication date 2012 Oct. 30, AA Shvartsburg, GA Anderson, R D Smith.

84. Ambient pressure matrix-assisted laser desorption ionization (MALDI) apparatus and method of analysis, U.S. Pat. No. 8,338,780B2, Publication date: 2012-12-25 Inventors: Bai, Jian, Fischer, Steven M. Flanagan, Michael J., Ser. No. 10/806,829, Assignee: Agilent Technologies, Inc.

85. MULTIPOLE ASSEMBLY HAVING A MAIN MASS FILTER AND AN AUXILIARY MASS FILTER, Publication number: 20130015340, Type: Application, Filed: Feb. 6, 2012, Publication date: Jan. 17, 2013, Applicant: BRUKER DALTONICS, INC., Inventor: Urs STEINER.

86. Plume Collimation for Laser Ablation Electrospray Ionization Mass Spectrometry, Publication number: 20130015345, Publication date: Jan. 17, 2013, Applicant: THE GEORGE WASHINGTON UNIVERSITY, Inventors: Akos Vertes, Jessica A. Stolee 87. Apparatus and methods for analyzing ions, U.S. Pat. No. 8,362,420, Date of Patent: Jan. 29, 2013, Assignee: Indiana University Research and Technology Corporation, Inventors: David E. Clemmer, Samuel I. Merenbloom, Stormy L. Koeniger, Stephen J. Valentine.
88. Radio frequency voltage temperature stabilization, U.S. Pat. No. 8,455,815, Date of Patent: Jun. 4, 2013, Assignee: Bruker Daltonics, Inc., Inventors: Urs Steiner, Lawrence B Jones.
89. Lens free collision cell with improved efficiency, U.S. Pat. No. 8,481,929, Date of Patent: Jul. 9, 2013, Assignee: Bruker Daltonics, Inc., Inventors: Urs Steiner, Felician Muntean, Roy P Moeller, Thinh M Ha
90. ION GUIDE AND ELECTRODE FOR ITS ASSEMBLY, Publication number: 20130175441, Type: Application, Filed: Jan. 11, 2012, Publication date: Jul. 11, 2013, Applicant: BRUKER DALTONICS, INC., Inventors: Stephen ZANON, Maurizio A. SPLENDORE.
91. Method and apparatus for transmitting ions in a mass spectrometer maintained in a sub-atmospheric pressure regime, U.S. Pat. No. 8,525,106, Date of Patent: Sep. 3, 2013, Assignee: Bruker Daltonics, Inc., Inventor: Felician Muntean.
92. Mass spectrometer with precisely aligned ion optic assemblies, U.S. Pat. No. 8,618,473, Date of Patent: Dec. 31, 2013, Assignee: Bruker Daltonics, Inc., Inventor: Urs Steiner.
93. HIGH FIELD ASYMMETRIC ION MOBILITY SPECTROMETRY (FAIMS) METHODS AND DEVICES WITH VOLTAGE-GAS COMPOSITION LINK ED SCAN S, Publication number: 20130320205, Filed: May 31, 2012, Publication date: Dec. 5, 2013, Inventors: Gary Glish, Mark Ridgeway, Alice Pilo
94. Sampling system for use with surface ionization spectroscopy. Patent number: U.S. Pat. No. 8,525,109B2, publication date 2013 Sep. 3. Inventor. Brian D. Musselman. Current Assignee. Bruker Scientific LLC.
95. ASSEMBLY FOR AN ELECTROSPRAY ION SOURCE, Publication number: 20140014747, Type: Application, Filed: Jul. 16, 2012, Publication date: Jan. 16, 2014, Applicant: BRUKER DALTONICS, INC., Inventors: Roy P. MOELLER, Rohan THAKUR, Felician MUNTEAN, Maurizio A. SPLENDORE, Stephen ZANON.
96. Serum markers for type II diabetes mellitus, U.S. Pat. No. 8,673,644B2, publication date 2014 Mar. 18, TO Metz, WJ Qian, J M Jacobs, AD Polpitiya, IIDG Camp, R D Smith.
97. Curved heated ion transfer optics, U.S. Pat. No. 8,680,462, Date of Patent: Mar. 25, 2014, Assignee: Bruker Daltonics, Inc., Inventors: Stephen Zanon, Roy P Moeller, Urs Steiner, Felician Muntean
98. Gas chromatograph-mass spectrometer transfer line, U.S. Pat. No. 8,759,758, Date of Patent: Jun. 24, 2014, Assignee: Bruker Daltonics, Inc., Inventors: Urs Steiner, Felician Muntean, Bert D. Egley
99. Assembly for an electrospray ion source, U.S. Pat. No. 8,772,709, Date of Patent: Jul. 8, 2014, Assignee: Bruker Daltonics, Inc., Inventors: Roy P Moeller, Rohan Thakur, Felician Muntean, Maurizio A Splendore, Stephen Zanon
100. METHOD AND APPARATUS FOR IMPROVING ION TRANSMISSION INTO A MASS SPECTROMETER, Publication number: 20140217281, Publication date: Aug. 7, 2014, Applicant: THE ROCKEFELLER UNIVERSITY, Inventors: Andrew N. Krutchinsky, Julio Padovan, Herbert Cohen, Brian T. Chait.
101. Ion manipulation device, U.S. Pat. No. 8,835,839B1, publication date 2014 Sep. 16, GA Anderson, R D Smith, Y M Ibrahim, E M Baker.
102. Atmospheric pressure ion source with exhaust system, U.S. Pat. No. 8,841,607, Sep. 23, 2014, Assignee: Bruker Daltonics, Inc., Inventors: Zicheng Yang, Roy P Moeller, Stephen Zanon.
103. Ion manipulation device with electrical breakdown protection, U.S. Pat. No. 8,901,490B1, publication date 2014 Dec. 2, TC Chen, K Tang, Y M Ibrahim, R D Smith, GA Anderson, E M Baker.
104. Vacuum chamber for ion manipulation device, U.S. Pat. No. 8,907,273B1, publication date 2014 Dec. 9, TC Chen, K Tang, Y M Ibrahim, R D Smith, GA Anderson, E M Baker.
105. Systems and methods for sample analysis, U.S. Pat. No. 8,932,875, Date of Patent: Jan. 13, 2015, Assignee: Purdue Research Foundation, Inventors: Robert Graham Cooks, Guangtao Li, Xin Li, Zheng Ouyang
106. Mass spectrometry analysis of microorganisms in samples, U.S. Pat. No. 8,937,288, Date of Patent: Jan. 20, 2015, Assignee: Purdue Research Foundation, Inventors: Robert Graham Cooks, Ahmed Mohamed Hamid, Alan Keith Jarmusch, Zheng Ouyang
107. DISCONTINUOUS ATMOSPHERIC PRESSURE INTERFACE, Publication number: 20150034818, Filed: Sep. 5, 2014, Publication date: Feb. 5, 2015, Inventors: ZHENG OUYANG, LIANG GAO, ROBERT GRAHAM COOKS
108. ION GENERATION USING MODIFIED WETTED POROUS MATERIALS, Publication number: 20150041638, Filed: Oct. 13, 2014, Publication date: Feb. 12, 2015, Inventors: Robert Graham Cooks, Zheng Ouyang, Zhiping Zhang
109. Systems and methods for transfer of ions for analysis, U.S. Pat. No. 8,963,079, Date of Patent: Feb. 24, 2015, Assignee: Purdue Research Foundation, Inventors: Zheng Ouyang, Robert Graham Cooks, Sandilya Venkata Garimella, Jason David Harper, Nicholas Alan Charipar
110. Ion manipulation device to prevent loss of ions, U.S. Pat. No. 8,969,800B1, publication date 2015 Mar. 3, A Tolmachev, R D Smith, Y M Ibrahim, GA Anderson, E M Baker.
111. SYSTEMS AND METHODS FOR SAMPLE ANALYSIS, Publication number: 20150102218, Filed: Dec. 11, 2014, Publication date: Apr. 16, 2015, Inventors: Robert Graham Cooks, Guangtao Li, Xin Li, Zheng Ouyang
112. Method and apparatus for compressing ions, U.S. Pat. No. 9,063,086B1, publication date 2015 Jun. 23, SVB Garimella, Y M Ibrahim, G A Anderson, R D Smith.
113. REMOTE LASER ABLATION ELECTROSPRAY IONIZATION MASS SPECTROMETRY, Publication number: 20160203966, Publication date: Jul. 14, 2016, Applicants: Protea Biosciences, Inc., The George Washington University, Inventors: Akos VERTES, Lame COMPTON, Matthew POWELL, Brent RESCHKE, Jordan FRIEND
114. Device for separating non-ions from ions, U.S. Pat. No. 9,558,925B2, publication date 2017 Jan. 31, Y M Ibrahim, R D Smith.
115. Biomarkers for liver fibrosis, U.S. Pat. No. 9,651,563B2, publication date 2017 May 16, J M Jacobs, K E Burnum-Johnson, E M Baker, R D Smith, MA Gritsenko, D. Orton.
116. Method and device for ion mobility separations, U.S. Pat. No. 9,704,701B2, publication date 2017 Jul. 11, Y M Ibrahim, SVB Garimella, R D Smith.

117. Multi inlet for solvent assisted inlet ionization, U.S. Pat. No. 9,761,428B2, Publication date 2017-09-12, Inventor, Jeffery Mark Brown, Martin Raymond Green, Jason Lee Wildgoose, Current Assignee Micromass UK Ltd.
118. Ion manipulation method and device, U.S. Pat. No. 9,812,311B2, publication date 2017 Nov. 7, GA Anderson, E M Baker, R D Smith, Y M Ibrahim.
119. Ion funnel device, U.S. Pat. No. 9,824,874B2, publication date 2017 Nov. 21, Y M Ibrahim, TC Chen, MB Harrer, K Tang, R D Smith.
120. Dopant-assisted direct analysis in real time mass spectrometry, U.S. Pat. No. 9,899,196, Date of Patent: Feb. 20, 2018, Assignee: JEOL USA, INC., Inventor: Robert B. Cody
121. Method of transmitting ions through an aperture, U.S. Pat. No. 9,947,523B2, 2018-04-17, Inventor Jeffrey Mark Brown, Paul Murray, Current Assignee Micromass UK Ltd
122. Device to manipulate ions of same or different polarities, U.S. Pat. No. 10,224,194B2, publication date 2019 Mar. 5, Y M Ibrahim, R D Smith.
123. SYSTEM AND METHOD FOR LASER DESORPTION IONIZATION-MASS SPECTROMETRY ANALYSIS OF BIOMOLECULES IN CELLULAR COMPARTMENTS CAPTURED ON FUNCTIONALIZED SILICON NANOPOST ARRAYS, Publication number: 20190162734, Publication date: May 30, 2019, Inventors: Akos VERTES, Andrew KORTE, Brian DAVIS, Sean DINN
124. Method of introducing ions into a vacuum region of a mass spectrometer, U.S. Ser. No. 10/319,575B2, Publication date 2019-06-11, Inventor Jeffery Mark Brown, Martin Raymond Green, Current Assignee Micromass UK Ltd
125. DEVICES AND METHODS FOR MAI IONIZATION, U.S. Pat. No. 10,535,508 B2, Publication date Jan. 14, 2020, Inventors: Kermit King Murray, Baton Rouge, LA; Bijay Kumar Banstola, Baton Rouge, LA, Assignee: BOARD OF SUPERVISORS OF LOUISIANA STATE UNIVERSITY AND AGRICULTURAL AND MECHANICAL COLLEGE, Baton Rouge, LA.
126. Methods and systems for integrating ion manipulation devices, U.S. Pat. No. 10,804,089B2, publication date 2020 Oct. 13, Y M Ibrahim, R D Smith.
127. Method and apparatus for spatial compression and increased mobility resolution of ions, U.S. Pat. No. 10,018,592B2, publication date 2021 Apr. 13, Y M Ibrahim, S Garimella, R D Smith.
128. Sample introduction system for spectrometers, U.S. Ser. No. 10/991,560B2, Publication date 2021-04-27, Inventor Jeffery Mark Brown, Steve Bajic, Steven Derek Pringle, Current Assignee Micromass UK
129. Devices and methods for deep UV laser ablation, U.S. Ser. No. 11/094,518B2, Publication date 2021-08-17, Inventor Kermit King Murray, Fabrizio Donnarumma, Oluwaremilekun Lawai, Current Assignee Louisiana State University and Agricultural and Mechanical College.
130. Nanoscale biochemical sample preparation and analysis, Patent Publication Number: 20180169657, Date of Patent: Sep. 21, 2021, RT Kelly, Y Zhu, R D Smith.
131. Methods for analyzing stability of an active pharmaceutical ingredient, U.S. Pat. No. 11,209,411, Date of Patent: Dec. 28, 2021, Assignee: Purdue Research Foundation, Inventors: Robert Graham Cooks, Roy Helmy, Yangjie Li, Yong Liu
132. REACTION MONITORING, Publication number: 20220199383, Filed: Mar. 10, 2022, Publication date: Jun. 23, 2022, Inventors: Robert Graham Cooks, Xin Yan, Christopher Pulliam, Ryan M. Bain, Tawnya Flick
133. Methods of analyzing crude oil, U.S. Pat. No. 11,300,555, Date of Patent: Apr. 12, 2022, Assignee: Purdue Research Foundation, Inventors: Robert Graham Cooks, Fred Paul Mark Jjunju, Anyin Li, Iman S. Roqan
134. Identification of sample subspecies based on particle mass and charge over a range of sample temperatures. Inventor Clemmer, D. E., Jarrold, M. F., El-Baba, T. J., Lutomski, C. A. US Patent Office. US20220216047A1 date of publication 2022 Jul. 7.
135. Instrument and method for energizing molecules in charged droplets. Inventor Clemmer, D. E., El-Baba, T. J., Fuller, D. R., Woodall, D. W., Russell, D. H., Williams, E. R. US Patent Office. U.S. Ser. No. 11/420,205B2, date of publication 2022 Aug. 23, 136. CONDUCTING REACTIONS IN LEIDENFROST-LEVITATED DROPLETS, Publication number: 20220411373, Filed: Aug. 23, 2022, Publication date: Dec. 29, 2022, Inventors: Robert Graham Cooks, Christopher Pulliam, Ryan M. Bain.
137. Desorption ion source with dopant-gas assisted ionization, U.S. Pat. No. 11,527,397, Filed: Aug. 3, 2021, Date of Patent: Dec. 13, 2022, Inventors: Christoph Hauke Manfred Bookmeyer, Jens Soltwisch, Klaus Dreisewerd
138. Ion focusing device, U.S. Ser. No. 11/605,531B2, publication date 2023-03-14, Y M Ibrahim, R D Smith.
139. Process for ultra-sensitive quantification of target analytes in complex biological systems, U.S. Ser. No. 11/619,635B2, publication date 2023 Apr. 4, T Shi, W Qian, TL Fillmore, X Sun, R D Smith.
140. Multiplexed inductive ionization systems and methods, U.S. Pat. No. 11,715,633, Date of Patent: Aug. 1, 2023, Assignee: Purdue Research Foundation, Inventors: Robert Graham Cooks, Zhenwei Wei, David G. McLaren
141. HIGH-THROUGHPUT LABEL-FREE ENZYMATIC BIOASSAYS USING DESI-MS, Publication number: 20230324335, Filed: Dec. 20, 2022, Publication date: Oct. 12, 2023, Inventors: Robert Graham Cooks, Nicolás M. Morato, Dylan T. Holden
142. Ion focusing, U.S. Pat. No. 11,830,717, Date of Patent: Nov. 28, 2023, Assignee: Purdue Research Foundation, Inventors: Robert Graham Cooks, Zane Baird, Wen-Ping Peng
143. Mass spectrometry analysis of microorganisms in samples, U.S. Pat. No. 11,830,716, Date of Patent: Nov. 28, 2023, Assignee: Purdue Research Foundation, Inventors: Robert Graham Cooks, Ahmed Mohamed Hamid, Alan Keith Jarmusch, Zheng Ouyang
144. SYSTEMS AND METHODS FOR SAMPLE ANALYSIS USING SWABS, Publication number: 20230386816, Filed: Jun. 9, 2023, Publication date: Nov. 30, 2023, Inventors: Robert Graham Cooks, Alan Keith Jarmusch, Valentina Pirro
145. Sample analysis systems and methods of use thereof, U.S. Pat. No. 11,837,455, Date of Patent: Dec. 5, 2023, Assignee: Purdue Research Foundation, Inventors: Robert Graham Cooks, Zane Baird, Pu Wei
146. Systems and methods for increasing reaction yield, U.S. Pat. No. 11,833,487, Date of Patent: Dec. 5, 2023, Assignee: Purdue Research Foundation, Inventors: Robert Graham Cooks, Michael Stanley Wleklinski, David Logsdon
147. ELECTROPHORETIC MASS SPECTROMETRY PROBES AND SYSTEMS AND USES THEREOF, Publication number: 20240087866, Filed: Nov. 16, 2023, Publication date: Mar. 14, 2024, Inventors: Robert Graham Cooks, Tawnya Flick 148. SYNCHRONIZATION OF ION GENERATION WITH CYCLING OF A DISCONTINUOUS ATMOSPHERIC INTERFACE, Publication number: 20230420236, Filed: Jun. 13, 2023, Publication date: Dec. 28, 2023, Inventors: Robert Graham Cooks, Guangtao Li, Guangming Huang, Jason Duncan, Xin Li, Ewa Sokol, Xin Yan
149. Mass spectral tissue analysis, U.S. Pat. No. 11,860,172, Date of Patent: Jan. 2, 2024, Assignee: Purdue Research Foundation, Inventors: Robert Graham Cooks, Livia Schiavinato Eberlin, Christina Ramires Ferreira, Allison Lisa Dill, Demian R. Ifa
150. Instrument, including an electrostatic linear ion trap with charge detector reset or calibration, for separating ions, U.S. Pat. No. 11,862,448, Date of Patent: Jan. 2, 2024, Assignee: THE TRUSTEES OF INDIANA UNIVERSITY, Inventors: Martin F. Jarrold, Andrew W. Alexander, Aaron R. Todd
151. Methods for resolving lipoproteins with mass spectrometry, U.S. Pat. No. 11,867,700, Date of Patent: Jan. 9, 2024, Assignee: THE TRUSTEES OF INDIANA UNIVERSITY, Inventors: Martin F. Jarrold, Corrine A. Lutomski
152. Sample dispenser including an internal standard and methods of use thereof, U.S. Pat. No. 11,867,684, Date of Patent: Jan. 9, 2024, Assignee: Purdue Research Foundation, Inventors: Zheng Ouyang, He Wang, Nicholas E. Manicke, Robert Graham Cooks, Qian Yang, Jiangjiang Liu
153. SYSTEMS AND METHODS FOR CONDUCTING REACTIONS AND SCREENING FOR REACTION PRODUCTS, Publication number: 20240038523, Filed: Oct. 10, 2023, Publication date: Feb. 1, 2024, Inventor: Robert Graham Cooks.
154. SYSTEM AND METHOD FOR IDENTIFYING, SELECTING AND PURIFYING PARTICLES, Publication number: 20240050895, Publication date: Feb. 15, 2024, Inventors: Brooke A. BROWN, David E. CLEMMER, Martin F. JARROLD.
155. Enclosed desorption electrospray ionization probes and method of use thereof, U.S. Pat. No. 11,903,707, Date of Patent: Feb. 20, 2024, Assignee: Purdue Research Foundation, Inventors: Robert Graham Cooks, Zheng Ouyang, Chien-hsun Chen, Ziqing Lin, Livia Schiavinato Eberlin. Ion generation using modified wetted porous materials, U.S. Pat. No. 11,913,924, Date of Patent: Feb. 27, 2024, Assignee: Purdue Research Foundation, Inventors: Robert Graham Cooks, Zheng Ouyang
156. METHOD OF CONTROLLING A MULTI-POLE DEVICE TO REDUCE OMISSION OF EXITING CHARGED PARTICLES FROM DOWNSTREAM ANALYSIS, Publication number: 20240087868, Filed: Sep. 8, 2023, Publication date: Mar. 14, 2024, Inventors: Martin F. JARROLD, Peyton SAYASITH, Kevin GILES, David BRUTON
157. RADIALLY SEGMENTED ION GUIDE AND EXAMPLE APPLICATIONS THEREOF, Publication number: 20240087875, Publication date: Mar. 14, 2024, Inventors: Martin F. JARROLD, David W. Reitenbach

RESEARCH PAPERS, REVIEWS, AND BOOK CHAPTERS

1. High sensitivity mass spectrometric methods for obtaining intact molecular weights from gel-separated proteins, Joseph A. Loo, Jeffrey Brown, Glenn Critchley, Charles Mitchell, Philip C. Andrews, Rachel R. Ogorzalek Loo, Electrophoresis, Volume 20, Issue 4-5, 1 Jan. 1999, Pages 743-748.
2. Impact desolvation of electrosprayed microdroplets—a new ionization method for mass spectrometry of large biomolecules, Sergei A. Aksyonov, Peter Williams, Volume 15, Issue 21, 15 Nov. 2001, Pages 2001-2006.
3. A multicapillary inlet jet disruption electrodynamic ion funnel interface for improved sensitivity using atmospheric pressure ion sources, T Kim, K Tang, HR Udseth, R D Smith, Analytical Chemistry 73 (17), 4162-4170, 2001.
4. Dual-micro-ESI source for precise mass determination on a quadrupole time-of-flight mass spectrometer for genomic and proteomic applications, J. Flora, A. P. Null, D. Muddiman, Analytical and Bioanalytical Chemistry Volume 373, pages 538-546, 2002.
5. Atmospheric pressure matrix-assisted laser desorption/ionization in transmission geometry, Marsha C Galicia, Akos Vertes, John H Callahan, Anal Chem. 2002 Apr. 15; 74(8):1891-5.
6. Mass spectrometry sampling under ambient conditions with desorption electrospray ionization, Zoltán Takáts, Justin M Wiseman, Bogdan Gologan, R Graham Cooks, Science, 2004 Oct. 15; 306(5695):471-3.
7. Electrospray ion beam deposition of clusters and biomolecules, Stephan Rauschenbach, Frank L Stadler, Eugenio Lunedei, Nicola Malinowski, Sergei Koltsov, Giovanni Costantini, Klaus Kern, Small, Volume 2, Issue 4, p. 540-547, 2006.
8. Dual-source mass spectrometer with MALDI-LIT-ESI configuration, Scott A Smith, Thomas A Blake, Demian R Ifa, R Graham Cooks, Zheng Ouyang, J Proteome Res. 2007, February; 6(2):837-45.
9. Surface-Induced Dissociation of Small Molecules, Peptides, and Non-Covalent Protein Complexes Vicki H. Wysocki, Karen E. Joyce, Christopher M. Jones, and Richard L. Beardsley Department of Chemistry, University of Arizona, Tucson, Arizona, USA. J Am Soc Mass Spectrom 2008, 19, 190-208.
10. Dual Polarity Accurate Mass Calibration for ESI and MALDI Mass Spectrometry Using Maltooligosaccharides, Brian H. Clowers, Eric D. Dodds, Richard R. Seipert, Carlito B. Lebrilla, Anal Biochem. 2008 Oct. 15; 381(2): 205-213.
11. A Dual Source Ion Mobility-Mass Spectrometer for Direct Comparison of ESI and MALDI Collision Cross Section Measurements, Sevugarajan Sundarapandian, Jody C. May, John A. McLean, Anal Chem. 2010 Apr. 15; 82(8): 3247-3254.
12. Chapter 13: ESI, APCI, and MALDI a Comparison of the Central Analytical Figures of Merit: Sensitivity, Reproducibility, and Speed, Thomas R. Covey, Bradley B. Schneider, Hassan Javaheri, J. C. Yves LeBlanc, Gordana Ivosev, Jay J. Corr, Peter Kovarik, Book Editor(s): Richard B. Cole, Electrospray and MALDI Mass Spectrometry: Fundamentals, Instrumentation, Practicalities, and Biological Applications, Second Edition, First published: 9 Apr. 2010
13. Electrospray Post-Ionization Mass Spectrometry of Electrosurgical Aerosols Sabine Guenther, Karl-Christian Schafer, Júlia Balog, Júlia Dénes, Tamás Majoros, Katalin Albrecht, Miklós Tóth, Bernhard Spengler, Zoltán Takáts. J. Am. Soc. Mass Spectrom. (2011) 22:2082-2089.
14. Application of high-resolution ESI and MALDI mass spectrometry to metabolite profiling of small interfering RNA duplex. Hisao Shimizu, Fumihiro Jinno, Akio Morohashi, Yuzo Yamazaki, Masaki Yamada, Takahiro Kondo, Satoru Asahi, J Mass Spectrom. 2012 August; 47(8): 1015-22.
15. Biomolecular Imaging with a C60-SIMS/MALDI Dual Ion Source Hybrid Mass Spectrometer: Instrumentation, Matrix Enhancement, and Single Cell Analysis. Eric J. Lanni, Sage J. B. Dunham, Peter Nemes, Stanislav S. Rubakhin, Jonathan V. Sweedler, J. Am. Soc. Mass Spectrom. 2014, 25, 11, 1897-1907.
16. Pakanová, Z., Nemčovic, M., Bystrický, P. et al. Comparative ESI FT-MS and MALDI-TOF structural analyses of representative human N-linked glycans. Chem. Pap. 69, 1633-1638 (2015).
17. Zero volt paper spray ionization mass spectrometry for direct analysis of samples on filter paper substrate, Akira Motoyama, Keishi Kihara, Rapid Communications in Mass Spectrometry Volume 29, Issue 20, 2015, Pages 1905-1916. First published: 9 Sep. 2015
18. Zero Volt Paper Spray Ionization and Its Mechanism, Michael Wleklinski, Yafeng Li, Soumabha Bag, Depanjan Sarkar, Rahul Narayanan, T Pradeep, R Graham Cooks, Anal Chem. 2015 Jul. 7; 87(13):6786-93.
19. MALDI versus ESI: The Impact of the Ion Source on Peptide Identification, Wiebke Maria Nadler, Dietmar Waidelich, Alexander Kerner, Sabrina Hanke, Regina Berg, Andreas Trumpp, Christoph Rösli, J. Proteome Res. 2017, 16, 3, 1207-1215.
20. Droplet assisted inlet ionization for online analysis of airborne nanoparticles, AJ Horan, MJ Apsokardu, MV Johnston. Analytical Chemistry 89(2), 1059-1062, 2017.
21. Nondestructive tissue analysis for ex vivo and in vivo cancer diagnosis using a handheld mass spectrometry system. JIALING ZHANG, JOHN RECTOR, JOHN Q. LIN, JONATHAN H. YOUNG, MARTA SANS, NITESH KATTA, NOAH GIESE, WENDONG YU, CHANDANDEEP NAGI, JAMES SULIBURK, JINSONG LIU, ALENA BENSUSSAN, RACHEL J. DEHOOG, KYANA Y. GARZA, BENJAMIN LUDOLPH, ANNA G. SORACE, ANUM SYED, AYDIN ZAHEDIVASH, THOMAS E. MILNER, LIVIA S. EBERLIN, SCIENCE TRANSLATIONAL MEDICINE, 6 Sep. 2017, Vol 9, Issue 406, DOI: 10.1126/scitranslmed.aan3968
22. Vibrating Sharp-edge Spray Ionization (VSSI) for voltage-free direct analysis of samples using mass spectrometry, Xiaojun Li, Kushani Attanayake, Stephen J. Valentine, Peng Li, Rapid Communications in Mass Spectrometry, Volume 35, Issue S1 e8232, First published: 11 Jul. 2018, https://doi.org/10.1002/rcm.8232.
23. Remote Atmospheric Pressure Infrared Matrix-Assisted Laser Desorption-Ionization Mass Spectrometry (Remote IR-MALDI MS) of Proteins, Benoit Fatou, Michael Ziskind, Philippe Saudemont, Jusal Quanico, Cristian Focsa, Michel Salzet, and Isabelle Fournier, Molecular & Cellular Proteomics 17.8 1637-1649, 2018.
24. Real-Time Molecular Diagnosis of Tumors Using Water-Assisted Laser Desorption/Ionization Mass Spectrometry Technology, Philippe Saudemont, Jusal Quanico, Yves-Marie Robin, Anna Baud, Julia Balog, Benoit Fatou, Dominique Tierny, Quentin Pascal, Kevin Minier, Mélissa Pottier, Cristian Focsa, Michael Ziskind, Zoltan Takats, Michel Salzet, Isabelle Fournier, Cancer Cell Volume 34, Issue 5, 12 Nov. 2018, Pages 840-851.
25. Transmission-mode MALDI-2 mass spectrometry imaging of cells and tissues at subcellular resolution, M Niehaus, J Soltwisch, M E Belov, K Dreisewerd, Nat Methods 2019 September; 16(9):925-931.
26. Water-assisted laser desorption/ionization mass spectrometry for minimally invasive in vivo and real-time surface analysis using SpiderMass, Nina Ogrinc, Philippe Saudemont, Julia Balog, Yves-Marie Robin, Jean-Pascal Gimeno, Quentin Pascal, Dominique Tierny, Zoltan Takats, Michel Salzet, Isabelle Fournier, Nature Protocols Volume 14, pages 3162-3182 (2019).
27. Matrix Assisted Rapid Evaporative Ionization Mass Spectrometry, Emrys A. Jones, Daniel Simon, Tamas Karancsi, Julia Balog, Steven D. Pringle, Zoltan Takats, Anal. Chem. 2019, 91, 15, 9784-9791.
28. Atmospheric Pressure MALDI Mass Spectrometry Imaging Using In-Line Plasma Induced Postionization, Efstathios A. Elia, Marcel Niehaus, Rory T. Steven, Jan-Christoph Wolf, Josephine Bunch, Anal. Chem. 2020, 92, 23, 15285-15290.
29. Low-Pressure Photoionization in a Dual-Ion Funnel Injector Coupled to an Orbitrap Mass Spectrometer for Direct Analysis of Human Breath and Head-Space Sampled Coffee Roasts, Christoph Bookmeyer, Jens Soltwisch, Ulrich Röhling, Klaus Dreisewerd, ChemPlusChem, Volume 85, Issue 7, July 2020, Pages 1559-1563.
30. Development of a fast-switching dual (ESI/APCI) ionization source for liquid chromatography/mass spectrometry. Dominik Brecht, Florian Uteschil, Oliver J. Schmitz, Rapid Communications in Mass Spectrometry, Volume 34, Issue 17, 15 Sep. 2020, e8845.
31. Integrating the MasSpec Pen to the da Vinci Surgical System for In Vivo Tissue Analysis during a Robotic Assisted Porcine Surgery, Michael F. Keating, Jialing Zhang, Clara L. Feider, Sascha Retailleau, Robert Reid, Alexander Antaris, Bradley Hart, Gina Tan, Thomas E. Milner, Kyle Miller, Livia S. Eberlin. Anal. Chem. 2020, 92, 17, 11535-11542.
32. Laser-assisted rapid evaporative ionisation mass spectrometry (LA-REIMS) as a metabolomics platform in cervical cancer screening, Maria Paraskevaidi, Simon J. S. Cameron, Eilbhe Whelan, Sarah Bowden, Menelaos Tzafetas, Anita Mitra, Anita Semertzidou, Antonis Athanasiou, Phillip R. Bennett, David A. MacIntyre, Zoltan Takats, and Maria Kyrgioua, EBioMedicine. 2020 October; 60: 103017.
33. Ambient mass spectrometry using desorption electrospray ionization (DESI): instrumentation, mechanisms and applications in forensics, chemistry, and biology. Zoltán Takáts, Justin M. Wiseman, R. Graham Cooks. First published: 19 Oct. 2005. https://doi.org/10.1002/jms.922
34. Matrix-Assisted Ionization of Molecular Uranium Species, Danielle R Mannion, Joseph M Mannion, Wendy W Kuhne, Matthew S Wellons, J. Am. Soc. Mass Spectrom. 2021; 32(1):8-13.
35. Extending the Reach: Non-Proximate Sampling for Mass Spectrometry Analysis of Large Objects and Surfaces, Oct. 1, 2021. G. Asher Newsome, LCGC Supplements Hot Topics in Mass Spectrometry, Volume 39, Issue s10, Pages: 14-16, 2021.
36. Integrating the MasSpec Pen with Sub-Atmospheric Pressure Chemical Ionization for Rapid Chemical Analysis and Forensic Applications, Clara L. Feider, Abigail N. Gatmaitan, Tim Hooper, Ashish Chakraborty, Prajwal Gowda, Emily Buchanan, Livia S. Eberlin, Anal. Chem. 2021, 93, 21, 7549-7556
37. Rapid Screening of COVID-19 Directly from Clinical Nasopharyngeal Swabs Using the MasSpec Pen, Kyana Y. Garza, Alex Ap. Rosini Silva, Jonas R. Rosa, Michael F. Keating, Sydney C. Povilaitis, Meredith Spradlin, Pedro H. Godoy Sanches, Alexandre Varão Moura, Junier Marrero Gutierrez, John Q. Lin, Jialing Zhang, Rachel J. DeHoog, Alena Bensussan, Sunil Badal, Danilo Cardoso de Oliveira, Pedro Henrique Dias Garcia, Lisamara Dias de Oliveira Negrini, Marcia Ap. Antonio, Thiago C. Canevari, Marcos N. Eberlin, Robert Tibshirani, Livia S. Eberlin, Andreia M. Porcari, Anal. Chem. 2021, 93, 37, 12582-12593.

38. Streamlined Multimodal DESI and MALDI Mass Spectrometry Imaging on a Singular Dual-Source FT-ICR Mass Spectrometer. Kevin J. Zemaitis, Alexandra M. Izydorczak, Alexis C. Thompson, Troy D. Wood, Metabolites. 2021 April; 11(4): 253.

39. Advances in MALDI Mass Spectrometry Imaging Single Cell and Tissues, Xiaoping Zhu, Tianyi Xu, Chen Peng, Shihua Wu, Front Chem. 2021; 9: 782432.

40. MODERN PLASMA-BASED DESORPTION/IONIZATION: FROM ATOMS AND MOLECULES TO CHEMICAL SYNTHESIS. Brian T. Molnar, Jacob T. Shelley, Mass Spectrometry Reviews, 40, 2021, pp.609-627.

41. Effects of solvent composition on ionization and fragmentation within the solution-cathode glow discharge. Courtney L. Walton, Andrew J. Schwartz, Jacob T. Shelley, Journal of Applied Physics, 130, 2021.

42. Unsupervised Reconstruction of Analyte-Specific Mass Spectra Based on Time-Domain Morphology with a Modified Cross-Correlation Approach. Yi You, Linxia Song, Montwaun D. Young, Matthew Van Der Wielen, Theresa Evans-Nguyen, Jens Riedel, Jacob T. Shelley. Analytical Chemistry, 93, 2021, pp.5009-5014.

43. Optical and mass-spectral characterization of mixed-gas flowing atmospheric-pressure afterglow sources. Sunil P. Badal, Paul B. Farnsworth, George C. Y. Chan, Brian T. Molnar, Jessica R. Hellinger, Jacob T. Shelley, Spectrochimica Acta—Part B Atomic Spectroscopy, 176, 2021

44. Robot-Assisted SpiderMass for In Vivo Real-Time Topography Mass Spectrometry Imaging, Nina Ogrinc, Alexandre Kruszewski, Paul Chaillou, Philippe Saudemont, Chann Lagadec, Michel Salzet, Christian Duriez, and Isabelle Fourier, Anal. Chem. 2021, 93, 14383-14391.

45. Applications of MALDI-MS/MS-Based Proteomics in Biomedical Research, Laura Darie-Ion, Danielle Whitham, Madhuri Jayathirtha, Yashveen Rai, Anca-Narcisa Neagu, Costel C. Darie, Brîndușa Alina Petre, Molecules. 2022 October; 27(19): 6196.

46. FT-ICR Mass Spectrometry Imaging at Extreme Mass Resolving Power Using a Dynamically Harmonized ICR Cell with 1ω or 2ω Detection, Mathieu Tiquet, Raphaël La Rocca, Stefan Kirnbauer, Samuele Zoratto, Daan Van Kruining, Loïc Quinton, Gauthier Eppe, Pilar Martinez-Martinez, Martina Marchetti-Deschmann, Edwin De Pauw, Johann Far, Anal. Chem. 2022, 94, 26, 9316-9326.

47. A preparative mass spectrometer to deposit intact large native protein complexes, Paul Fremdling, Tim K. Esser, Bodhisattwa Saha, Alexander Makarov, Kyle Fort, Maria Reinhardt-Szyba, Joseph Gault, Stephan Rauschenbach, ACS Nano 2022, 16, 9, 14443-14455.

48. Liquid extraction surface analysis-mass spectrometry: An advanced and environment-friendly analytical tool in modern analysis. Shibam Das, Rohit Bhatia, J Sep Sci. 2022 July; 45(14): 2746-2765.

49. Deeper Understanding of Solvent-Based Ambient Ionization Mass Spectrometry: Are Molecular Profiles Primarily Dictated by Extraction Mechanisms?. Monica Lin, Molly S. Blevins, Marta Sans, Jennifer S. Brodbelt, Livia S. Eberlin. Anal. Chem. 2022, 94, 42, 14734-14744.

50. Differential mobility spectrometry improves uranium isotope ratio measurements on an ion trap mass spectrometer. Ifeoluwa Ayodeji, Alexandra Keidel, Nelson Perdomo, Jacob Shelley, Theresa Evans-Nguyen. International Journal of Mass Spectrometry, 472, 2022.

51. Characterization of a Low-Temperature Plasma (LTP) Ambient Ionization Source Using Temporally Resolved Monochromatic Imaging Spectrometry. George C. Y. Chan, Carsten Engelhard, Joshua S. Wiley, Ayanna U. Shoulds, R. Graham Cooks, Gary M. Hieftje, Jacob T. Shelley. Applied Spectroscopy, 77, 2023, pp.940-956.

52. Advances and Emerging Medical Applications of Direct Mass Spectrometry Technologies for Tissue Analysis, Mary E. King, Monica Lin, Meredith Spradlin, Livia S. Eberlin, ANNUAL REVIEW OF ANALYTICAL CHEMISTRY, Volume 16, 2023, Vol. 16:1-25.

53. Ambient Mass Spectrometry Imaging by Water-Assisted Laser Desorption/Ionization for Ex Vivo and in Vivo Applications, Nina Ogrinc, Paul Chaillou, Alexandre Kruszewski, Cristian Duriez, Michel Salzet, Isabelle Fournier, Series: Methods In Molecular Biology, Book: Imaging Mass Spectrometry, Springer Protocols (2023).

54. Ambient Mass Spectrometry Imaging by Water-Assisted Laser Desorption/Ionization for Ex Vivo and in Vivo Applications, Nina Ogrinc, Paul Chaillou, Alexandre Kruszewski, Cristian Duriez, Michel Salzet, Isabelle Fournier. Methods Mol Biol 2023:2688:83-94.

55. Trimpin, S., A Tutorial: Laserspray Ionization and Related Laser-based Ionization Methods for Use in Mass Spectrometry, Mass Spectrom. Rev. 2023, https://doi.org/10.1002/mas.21762.

56. S. Trimpin, F. S. Yenchick, C. Lee, K. Hoang, M. Pophristic, S. Karki, D. D. Marshall, I-C. Lu, C. A. Lutomski, T. J. El-Baba, B. Wang, V. S. Pagnotti, A. K. Meher, S. Chakrabarty, L. F. Imperial, S. Madarshahian, A. L. Richards, C. B. Lietz, A. Moreno-Pedraza, S. M. Leach, S. C. Gibson, E. A. Elia, S. M. Thawoos, D. W. Woodall, D. R. Jarois, E. T. J. Davis, G. Liao, N. S. Muthunayake, M. J. Redding, C. A. Reynolds, T. M. Anthony, S. M. Vithanarachchi, P. DeMent, A. O. Adewale, L. Yan, J. Wager-Miller, Y.-H. Ahn, T. H. Sanderson, K. Przyklenk, M. L. Greenberg, A. G. Suits, M. J. Allen, S. B. Narayan, J. A. Caruso, P. M. Stemmer, H. M. Nguyen, S. M. Weidner, K. J. Rackers, A. Djuric, V. Shulaev, T. L. Hendrickson, C. S. Chow, M. K. H. Pflum, S. M. Grayson, V. V. Lobodin, Z. Guo, C.-K. Ni, J. M. Walker, K. Mackie, E. D. Inutan, C. N. McEwen. New ionization processes for ionizing nonvolatile compounds in mass spectrometry: the road of discovery to current state-of-the-art. J. Am. Soc. Mass Spectrom. 2023, doi.org/10.1021/jasms.3c00122.

57. Direct Sub-Atmospheric Pressure Ionization Mass Spectrometry: Evaporation/Sublimation-Driven Ionization is Amazing, Fundamentally and Practically, Sarah Trimpin, Ellen D. Inutan, Vincent S. Pagnotti, Santosh Karki, Darrell D. Marshall, Khoa Hoang, Beixi Wang, Christopher B. Lietz, Alicia L. Richards, Frank S. Yenchick, Chuping Lee, I-Chung Lu, Madeleine Fenner, Sara Madarshahian, Sarah Sailer, Nicolas D. Chubatyi, Teresa Zimmerman, Abigail Moreno-Pedraza,a Tongwen Wang, Adetoun Adeniji-Adele, Anil K. Meher, Hasini Madagedara, Zachary Owczarzak, Ahmed Musavi, Tamara L. Hendrickson, Patricia M. Peacock, John W. Tomsho, Barbara S. Larsen, Laszlo Prokai, Vladimir Shulaev, Milan Pophristic, Charles N. McEwen, Journal of Mass Spectrometry Manuscript #JMS-23-0111, accepted for publication.

58. MALDI-MSI-LC-MS/MS Workflow for Single-Section Single Step Combined Proteomics and Quantitative Lipidomics, Tim F. E. Hendriks, Kasper K. Krestensen, Ronny Mohren, Michiel Vandenbosch, Steven De Vleeschouwer, Ron M. A. Heeren, Eva Cuypers, Anal. Chem. 2024, 96, 10, 4266-4274.

What is claimed is:

1. A vacuum chamber assembly device for transferring the at least one of gas phase analyte ions and charged particles, through use of one or more of a plurality of ports, into an analyzer device for purposes of analysis of one or more samples, said samples comprising analyte, and wherein;

the said gas phase ions and the said charged particles comprise one of excess positive or excess negative charges, and whereby the said charged particles also comprise the at least one of said analyte and a matrix molecule, and wherein;

the said vacuum chamber assembly device comprises a wall having an interior surface and exterior surface, the said interior surface resides at sub-atmospheric pressure and defines a conduit having a first end and a second end, and wherein the said sub-atmospheric pressure is higher than that of the first vacuum region of the said analyzer device to which the said vacuum chamber assembly is interfaced through a port, such that the said sub-atmospheric pressure within the said analyzer device is in fluid communication with the said conduit, and wherein the said exterior surface resides substantially at atmospheric pressure, and wherein;

the said vacuum chamber assembly device also comprises additional ports, wherein the said additional ports provide a means of communicating between the interior of the said conduit residing at the said sub-atmospheric pressure and the substantially atmospheric pressure external to the said vacuum chamber assembly device, and wherein;

the said ions and the charged particles produced in at least one of atmospheric pressure and sub-atmospheric pressure are transferred therefrom through one or more of the said ports and through the said conduit and into the said analyzer device aided by one or more of gas flow and electrical fields, and wherein;

the said gas phase charged particles undergo loss of the said matrix molecules during transfer from the point of origin into the said analyzer device to release additional gas phase bare ions before separation by one of mass-to-charge in a mass analyzer or mobility in an ion mobility analyzer, and wherein;

the said vacuum chamber assembly device comprising the said plurality of ports is capable of transferring one or more of the gas phase ions and the said charged particles produced by one or more of atmospheric pressure ionization, inlet ionization, and vacuum ionization methods, as well as means to facilitate gas phase ion and charged particle formation and transfer through at least one of the said ports.

2. The vacuum chamber assembly device of claim 1, wherein the passageway of the said Port, providing fluid communication between the said conduit within the said vacuum chamber assembly and the interior of the analyzer device has an inner diameter greater than 1.5 millimeters and less than 30 millimeters, and preferably >3 millimeters and <9 millimeters.

3. The vacuum chamber assembly device of claim 1, wherein the at least one port is configured to receive at least one of the said gaseous ions, gaseous charged particles, and neutral particles from one of atmospheric pressure and near atmospheric pressure and transfer the said ions, the said charged particles, and the said neutrals into the interior of the said conduit.

4. The vacuum chamber assembly device of claim 1, wherein the pressure within the said conduit is between 100 (needs to be higher millibar and $e^{-3}$ millibar, and preferably between 10 mbar and $e^{-2}$ mbar in order to maintain the said analyzer device operational.

5. The vacuum chamber assembly device of claim 1, wherein the combination of all the said ports interfaced with the said conduit, and connected associated devices, maintain the pressure within the said conduit and the said analyzer device in a range sufficient for operation of the said analyzer device.

6. The vacuum chamber assembly device of claim 1, wherein the said ports provide a means of interfacing the interior of the said conduit with the exterior of the said vacuum chamber assembly to provide one or more of; a controlled flow of gas from the said higher pressure region exterior to the said vacuum chamber assembly to the lower pressure within the said conduit; a controlled type of gas reaction gas to cause a chemical reaction; a means to insert a physical obstruction into the said conduit for purposes of removing the said matrix molecules from the said charged particles by collisions of the said charged particles with the said obstruction, and as a means to control gas flow from the said conduit into the said analyzer device; as a means to apply voltage to lens elements residing in the lower pressure region to aid transmission and focusing of the said gas phase ions and the said charged particles; as a means for transmitting a laser beam for one or more of producing the said gas phase ions from the said sample, of removing the said matrix molecules from the said charged particles, and for providing energy to fragment the said gaseous ions, and as a means to measure the pressure within the said conduit.

7. The vacuum chamber assembly device of claim 1, wherein the plurality of Ports is preferably between three and eight, in part confined by the internal diameter, length, and shape of the said vacuum chamber assembly conduit and the arrangement at various positions and at various angles relative to the one Port of the said vacuum chamber assembly conduit interfacing with the said analyzer device.

8. The vacuum chamber assembly device of claim 1, wherein the said gas phase ions and the charged particles within the said sub-atmospheric pressure of the said conduit are guided by the said gas flow and the said voltages into the ion transfer elements of the said analyzer device for transmission to a detector device.

9. The vacuum chamber assembly device of claim 1, wherein the at least one port having the functions of transferring at least one of a laser beam, a voltage from a voltage source, and a gas into the at least one of a channel in the said port to facilitate one or more of creating the gas phase ions and the said gas phase charged particles, and transmission into the said conduit.

10. The vacuum chamber assembly device of claim 1, wherein the said ports which provide fluid communication between the said substantially atmospheric pressure and the said sub-atmospheric pressure in the interior of the said conduit are one or more of ionization sources and a device to regulate the flow of gas and fluid or a combination of the two.

11. The vacuum chamber assembly device of claim 1, wherein the at least two of the said plurality of ports are associated with at least one of atmospheric pressure ionization, inlet ionization, and vacuum ionization methods.

12. The vacuum chamber assembly device of claim 1, wherein the said ionization sources are configured to receive at least one of said sample in one of a gaseous, liquid, or solid state.

13. The vacuum chamber assembly device of claim 12, wherein the said ionization sources operational from atmospheric pressure and near atmospheric pressure, and the said ionization sources operational from sub-atmospheric pressure may be configured to be available for near immediate use.

14. The vacuum chamber assembly device of claim 13, wherein the said ionization source operational from the said sub-atmospheric pressure comprises one or more of vacuum matrix-assisted laser desorption/ionization, vacuum matrix-assisted ionization, vacuum laserspray ionization, and vacuum laser desorption ionization using one or more of sample introduction on the end of a probe device for single sample analysis, and on a plate device for single or multiple sequential sample analyses.

15. The vacuum chamber assembly device of claim 14, wherein the said gas phase analyte ions are produced by vacuum matrix-assisted ionization by exposure to the said sub-atmospheric pressure of the said sample mixed in solution with a vMAI matrix and dried on a substrate.

16. The vacuum chamber assembly device of claim 15, wherein the said substrate consists of one of a glass, metal, polymeric material, paper, TLC plates, and a porous substrate with a gas and fluid impermeable backing.

17. The vacuum chamber assembly device of claim 14, wherein the said gas phase analyte ions from a sample, consisting of one or more of the said analytes and the said matrix, are produced by one of atmospheric pressure ionization and inlet ionization methods through application of one or more of voltage, heat, gas flow, and a pressure drop region.

18. The vacuum chamber assembly device of claim 14, wherein the said plurality of ports consist of port supporting auxiliary devices to enhance one or more of the said gaseous ion and the said charged particle formation, transmission into the said analyzer device, reactions reactive gases; loss of matrix from the said charged particles to release the said bare analyte ions, closure of the said conduit to flow of gas between substantially atmospheric pressure and the sub-atmospheric pressure of the analyzer device, and fragmentation of gas-phase analyte ions.

19. The vacuum chamber assembly device of claim 14, wherein the said plurality of ports is arranged to interact synergistically to improve the breadth and depth of the analysis of said samples.

20. The vacuum chamber assembly device of claim 14, wherein the said plurality of ports is arranged to minimize contamination of the said analyzer device.

* * * * *